(12) United States Patent
Yoshida et al.

(10) Patent No.: US 9,806,375 B2
(45) Date of Patent: Oct. 31, 2017

(54) NONAQUEOUS ELECTROLYTIC SOLUTION AND NONAQUEOUS ELECTROLYTIC SOLUTION SECONDARY BATTERY USING SAME

(71) Applicant: MITSUBISHI CHEMICAL CORPORATION, Chiyoda-ku (JP)

(72) Inventors: Hiroaki Yoshida, Ibaraki (JP); Yasuyuki Shigematsu, Kanagawa (JP); Minoru Kotato, Mie (JP)

(73) Assignee: MITSUBISHI CHEMICAL CORPORATION, Chiyoda-ku (JP)

( * ) Notice: Subject to any disclaimer, the term of this patent is extended or adjusted under 35 U.S.C. 154(b) by 185 days.

(21) Appl. No.: 14/468,123

(22) Filed: Aug. 25, 2014

(65) Prior Publication Data
US 2014/0363735 A1 Dec. 11, 2014

Related U.S. Application Data

(63) Continuation of application No. 13/955,373, filed on Jul. 31, 2013, which is a continuation of application No. PCT/JP2012/052017, filed on Jan. 30, 2012.

(30) Foreign Application Priority Data

Jan. 31, 2011 (JP) ................................. 2011-018561
Feb. 8, 2011 (JP) ................................. 2011-024873

(51) Int. Cl.
*H01M 10/0567* (2010.01)
*H01M 10/0525* (2010.01)
*H01M 10/052* (2010.01)
*H01M 10/056* (2010.01)
*H01M 4/38* (2006.01)
*H01M 4/505* (2010.01)
*H01M 4/525* (2010.01)
*H01M 4/587* (2010.01)
*H01M 10/0568* (2010.01)
*H01M 10/0569* (2010.01)

(52) U.S. Cl.
CPC ..... *H01M 10/0567* (2013.01); *H01M 10/052* (2013.01); *H01M 10/056* (2013.01); *H01M 10/0525* (2013.01); *H01M 4/386* (2013.01); *H01M 4/505* (2013.01); *H01M 4/525* (2013.01); *H01M 4/587* (2013.01); *H01M 10/0568* (2013.01); *H01M 10/0569* (2013.01); *H01M 2300/004* (2013.01)

(58) Field of Classification Search
CPC .......... H01M 10/0567; H01M 10/052; H01M 10/056; H01M 10/0525; H01M 2300/004; H01M 4/386; H01M 4/505; H01M 4/525; H01M 4/587; H01M 10/0568; H01M 10/0569; Y02E 60/122
See application file for complete search history.

(56) References Cited

U.S. PATENT DOCUMENTS

| | | | |
|---|---|---|---|
| 6,506,524 B1 * | 1/2003 | McMillan | H01M 4/1393 429/324 |
| 6,919,145 B1 | 7/2005 | Kotato et al. | |
| 2002/0076619 A1 | 6/2002 | Yamada et al. | |
| 2006/0269843 A1 | 11/2006 | Usami et al. | |
| 2008/0166637 A1 | 7/2008 | Inagaki et al. | |
| 2008/0206650 A1 | 8/2008 | Kim et al. | |
| 2009/0286155 A1 | 11/2009 | Takehara | |
| 2010/0015514 A1 | 1/2010 | Miyagi et al. | |
| 2010/0028762 A1 * | 2/2010 | Yokoyama | H01M 2/22 429/94 |
| 2010/0119956 A1 | 5/2010 | Tokuda et al. | |
| 2010/0159336 A1 * | 6/2010 | Kim | H01M 4/485 429/331 |
| 2013/0011728 A1 | 1/2013 | Tokuda et al. | |
| 2013/0022861 A1 | 1/2013 | Miyagi et al. | |
| 2013/0071733 A1 | 3/2013 | Abe et al. | |
| 2013/0216918 A1 | 8/2013 | Tokuda et al. | |
| 2013/0337343 A1 | 12/2013 | Tokuda et al. | |

FOREIGN PATENT DOCUMENTS

| | | |
|---|---|---|
| CN | 101652894 A | 2/2010 |
| EP | 1 205 997 A1 | 5/2002 |
| JP | 62-211873 A | 9/1987 |
| JP | 10-50342 A | 2/1998 |
| JP | 11-185804 A | 7/1999 |
| JP | 2001-6729 A | 1/2001 |
| JP | 2001-217006 A | 8/2001 |
| JP | 2002-83628 A | 3/2002 |
| JP | 2002-134169 A | 5/2002 |

(Continued)

OTHER PUBLICATIONS

Machine translation of JP 2010-116475, retrieved from <https://www4.j-platpat.inpit.go.jp/eng/tokujitsu/tkbs_en/TKBS_EN_GM101_Top.action> on Jan. 31, 2017.*
Combined Chinese Office Action and Search Report dated Nov. 4, 2015 in Patent Application No. 201410520752.0 (with English language translation and English translation of categories of cited documents).
International Search Report dated Apr. 17, 2012, in PCT/JP2012/052017.
Combined Office Action and Search Report dated Jun. 3, 2015 in Chinese Patent Application No. 201280006906.3 (with English translation).
Office Action dated Jul. 14, 2015 in Japanese Patent Application No. 2012-015466 (with English translation).

(Continued)

*Primary Examiner* — Cynthia K Walls
(74) *Attorney, Agent, or Firm* — Oblon, McClelland, Maier & Neustadt, L.L.P.

(57) ABSTRACT

The present invention relates to a nonaqueous electrolytic solution for use in a nonaqueous electrolytic solution secondary battery that comprises a negative electrode and a positive electrode capable of storing and releasing metal ions, and a nonaqueous electrolytic solution, wherein the nonaqueous electrolytic solution contains the specific compounds (A) and (B).

11 Claims, No Drawings

(56) References Cited

FOREIGN PATENT DOCUMENTS

| JP | 2002-329528 A | 11/2002 |
|---|---|---|
| JP | 2003-173816 A | 6/2003 |
| JP | 2003-323915 A | 11/2003 |
| JP | 2007-12595 A | 1/2007 |
| JP | 2007-141830 A | 6/2007 |
| JP | 2007-165292 A | 6/2007 |
| JP | 2007-242411 | 9/2007 |
| JP | 2008-16422 A | 1/2008 |
| JP | 2008-021517 | 1/2008 |
| JP | 2008-140683 | 6/2008 |
| JP | 2008-140767 A | 6/2008 |
| JP | 2008-186803 | 8/2008 |
| JP | 2008-210767 | 9/2008 |
| JP | 2008-293813 | 12/2008 |
| JP | 2010-9940 A | 1/2010 |
| JP | 2010-62164 A | 3/2010 |
| JP | 2010-116475 A | 5/2010 |
| JP | 2010-272376 | 12/2010 |
| JP | 2010-282761 | 12/2010 |
| WO | WO 2011/152534 A1 | 12/2011 |

OTHER PUBLICATIONS

Office Action dated Jul. 14, 2015 in Japanese Patent Application No. 2012-015467 (with English translation).
Office Action dated Mar. 9, 2017, in European Patent Application No. 12741672.5 (English Translation).
Extended European Search Report dated Jan. 9, 2015 in the corresponding European Application No. 12741672.5.

* cited by examiner

NONAQUEOUS ELECTROLYTIC SOLUTION AND NONAQUEOUS ELECTROLYTIC SOLUTION SECONDARY BATTERY USING SAME

CROSS REFERENCE TO RELATED APPLICATION(S)

This application is a continuation of U.S. application Ser. No. 13/955,373, filed on Jul. 31, 2013, which is a continuation of international patent application PCT/JP2012/052017, filed on Jan. 30, 2012, the text of which is incorporated by reference, and claims foreign priority to JP 2011-018561 filed on Jan. 31, 2011 and JP 2011-024873 filed on Feb. 8, 2011, the entire content of which is incorporated herein by reference.

TECHNICAL FIELD

The present invention relates to nonaqueous electrolytic solutions, and nonaqueous electrolytic solution secondary batteries using same, specifically to nonaqueous electrolytic solutions containing specific components and for use in lithium secondary batteries, and to lithium secondary batteries using such nonaqueous electrolytic solutions.

BACKGROUND ART

There has been increasing demands for higher capacity secondary batteries in response to miniaturization of electronic devices driven by rapidly advancing development in the industry. This has prompted development of the lithium secondary batteries having higher energy density than nickel-cadmium batteries and nickel-hydrogen batteries. There has also been repeated effort for improving performance.

Against the background of increasing global challenges such as environmental and energy problems, there are high expectations for the application of lithium secondary batteries to large power supplies such as car power supplies and stationary power supplies. However, because such batteries are generally intended for use in environments exposed to ambient air, battery characteristics, particularly low-temperature discharge characteristics under low-temperature environment such as below freezing point are considered important in battery development. Further, because of its use, such batteries are required to have better life performance than conventional lithium secondary batteries.

The main components of the lithium secondary batteries are the positive electrode, the negative electrode, the separator, and the electrolytic solution. The electrolytic solution is typically a nonaqueous electrolytic solution produced by dissolving an electrolyte such as $LiPF_6$, $LiBF_4$, $LiClO_4$, $LiCF_3SO_3$, $LiAsF_6$, $LiN(CF_3SO_2)_2$, and $LiCF_3(CF_2)_3SO_3$ in a nonaqueous solvent such as cyclic carbonate (ethylene carbonate, propylene carbonate, and the like), chain carbonate (dimethyl carbonate, diethyl carbonate, ethylmethyl carbonate, and the like), cyclic ester (γ-butyrolactone, γ-valerolactone, and the like), and chain ester (methyl acetate, methyl propionate, and the like).

There are various studies of nonaqueous solvent and electrolyte to improve the low-temperature discharge characteristics and the cycle characteristics of the lithium secondary batteries. For example, Patent Document 1 describes using a vinyl ethylene carbonate compound-containing electrolytic solution to minimize degradation of the electrolytic solution and produce a battery of excellent storage characteristics and cycle characteristics. Patent Document 2 describes using a propane sultone-containing electrolytic solution to increase the recover capacity after storage.

Patent Document 3 discloses using an electrolytic solution that contains a cyclic sulfonic acid ester having an unsaturated bond to fabricate a battery that can suppress degradation of the electrolytic solution even under high-temperature environment.

However, while containing these compounds provides some effect of improving storage characteristics and cycle characteristics, they form a high-resistance coating on the negative electrode side and lower the low-temperature discharge characteristics.

In an effort to improve the low-temperature discharge characteristics of the lithium secondary batteries, there have been efforts to suppress the reaction resistance of the system in a low-temperature discharge state by addition of a specific compound.

In Patent Document 4, there is a report of adding a silicone-based defoaming agent to the electrolytic solution to improve the low-temperature discharge capacity.

In Patent Documents 5 to 7, there are reports of suppressing the low-temperature internal resistance by using a technique whereby a silicon compound having an unsaturated bond is added to the electrolytic solution.

In Patent Document 8, there is a report of using a negative electrode containing Si, Sn, and the like as a main component, and adding an ethylene carbonate derivative and a predetermined Si-containing compound to the electrolytic solution to suppress battery swelling and improve cycle life.

Patent Documents 9 and 10 introduce techniques whereby hexamethyldisilane is added as an additive to reduce the irreversible capacity at the negative electrode, and suppress the degradation reaction of the electrolytic solution at the negative electrode.

In Patent Documents 11 and 12, there are reports of adding a phosphazene derivative to the electrolytic solution to suppress the interface resistance of the electrolytic solution and improve low-temperature discharge characteristics.

In Patent Documents 13 to 15, there are reports of improving low-temperature discharge characteristics by using a technique whereby a predetermined phosphoric acid compound is added to the electrolytic solution.

CITATION LIST

Patent Documents

Patent Document 1: JP-A-2001-006729
Patent Document 2: JP-A-10-050342
Patent Document 3: JP-A-2002-329528
Patent Document 4: JP-A-11-185804
Patent Document 5: JP-A-2002-134169
Patent Document 6: JP-A-2003-173816
Patent Document 7: JP-A-2003-323915
Patent Document 8: US Patent Application 2010/159336
Patent Document 9: JP-A-2010-116475
Patent Document 10: JP-A-2010-9940
Patent Document 11: JP-A-2001-217006
Patent Document 12: JP-A-2002-83628
Patent Document 13: JP-A-2007-141830

Patent Document 14: JP-A-2007-165292
Patent Document 15: JP-A-2010-62164

As described above, despite the efforts to improve low-temperature discharge characteristics and cycle characteristics, the results are insufficient to achieve sufficient battery characteristics, and further improvements are needed.

SUMMARY OF THE INVENTION

Problems that the Invention is to Solve

In Patent Documents 5 to 7, a technique is reported whereby a compound containing a predetermined Si—Si bond is added to the electrolytic solution to improve low-temperature characteristics.

According to Patent Documents 5 to 7, the technique, with the use of a silane compound having an unsaturated bond that easily undergoes self-polymerization, causes a polymerization reaction at the electrode interface at the initial stage of a cycle to form a stable coating and thereby suppress an increase of interface resistance associated with the cycle.

However, while the use of a compound that easily undergoes self-polymerization can stabilize the coating, it may form the coating in excess, which may lead to high resistance at initial use.

With regard to the technique reported in Patent Document 8 whereby a predetermined Si-containing compound is added to the electrolytic solution, the technique is limited to negative electrodes that contain elements such as Si and Sn as a main component. Further, the technique is described as involving poor cycle characteristics.

With regard to the technique introduced in Patent Documents 9 and 10 whereby hexamethyldisilane is added for the purpose of forming a coating on a negative electrode surface, the publications merely introduce the compound as an example of large numbers of additives, and do not describe a technique related to combining these additives. Further, the publications do not specifically test the effect of combining such additives.

Further, in Patent Documents 9 and 10, adding hexamethyldisilane to the electrolytic solution is described as being effective in reducing irreversible capacity and suppressing the degradation reaction of the electrolytic solution at the negative electrode. It is not known how the addition of hexamethyldisilane to the electrolytic solution affects the low-temperature discharge characteristics and/or cycle characteristics.

The present invention has been made over the foregoing backgrounds, and it is an object of the present invention to provide a nonaqueous electrolytic solution of excellent low-temperature discharge characteristics and/or cycle characteristics for use in secondary batteries, and secondary batteries using such nonaqueous electrolytic solutions.

Means for Solving the Problems

The present inventors focused on substituents of relatively low self-polymerizing ability, and found that the low-temperature internal resistance can be suppressed, and the low-temperature characteristics of a battery can be improved with the use of compounds that do not have unsaturated bond-containing aliphatic substituents but have Si—Si bonds, without increasing the degree of polymerization of the coating. The present inventors also found that adding other specific compounds can greatly improve low-temperature discharge characteristics while maintaining the cycle characteristics comparative to the cycle characteristics of conventional batteries. The present invention has been completed on the basis of these findings.

Specifically, the present invention provides the following nonaqueous electrolytic solutions.

<1>

A nonaqueous electrolytic solution for use in a nonaqueous electrolytic solution secondary battery that comprises a negative electrode and a positive electrode capable of storing and releasing metal ions, and a nonaqueous electrolytic solution, wherein the nonaqueous electrolytic solution contains the following (A) and (B):

(A) a compound that does not have an aliphatic substituent having an unsaturated bond but has a Si—Si bond;

(B) at least one compound selected from the group consisting of a carbonate ester having an unsaturated bond, a compound represented by the following general formula (1), a compound having a S=O group, a compound having an NCO group, monofluorophosphate, difluorophosphate, fluorosulfonate, and an imide salt,

[Chemical Formula 1]

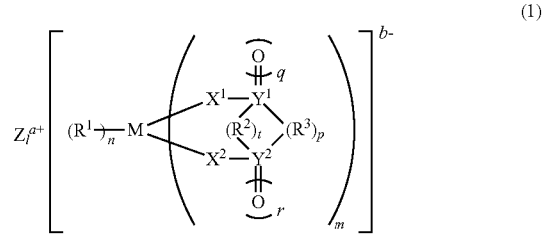

[wherein M represents a transition metal, an element of group 13, 14, or 15 of the periodic table, or a hydrocarbon group of 1 to 6 carbon atoms that may have a heteroatom, where when M represents a transition metal, or an element of group 13, 14, or 15 of the periodic table, $Z^{a+}$ is a metal ion, a proton, or an onium ion, a represents 1 to 3, b represents 1 to 3, l represents b/a, m represents 1 to 4, n represents 1 to 8, t represents 0 to 1, p represents 0 to 3, q represents 0 to 2, and r represents 0 to 2, and where when M is a hydrocarbon group of 1 to 6 carbon atoms that may have a heteroatom, $Z^{a+}$ does not exist, and a=b=l=n=0, m=1, t represents 0 to 1, p represents 0 to 3, q represents 0 to 2, and r represents 0 to 2, $R^1$ represents a halogen atom, a hydrocarbon group of 1 to 20 carbon atoms that may have a heteroatom, or $X^3R^4$ (where $R^1$ that exists in number n may bind to one another to form a ring), $R^2$ represents a direct bond, or a hydrocarbon group of 1 to 6 carbon atoms that may have a heteroatom, $X^1$, $X^2$, and $X^3$ each independently represents O, S, or $NR^5$, and $R^3$, $R^4$, and $R^5$ each independently represent hydrogen, a hydrocarbon group of 1 to 10 carbon atoms that may have a heteroatom (a plurality of $R^3$ and $R^4$ may bind to one another to form a ring), and $Y^1$ and $Y^2$ each independently represent C, S, or Si, wherein, when $Y^1$ or $Y^2$ is C or Si, q or r is 0 or 1, and, when $Y^1$ or $Y^2$ is S, q and r each are 2].

<2>

The nonaqueous electrolytic solution according to the item <1> above, wherein the compound having a S=O group is a compound represented by the following general formula (2),

[Chemical Formula 2]

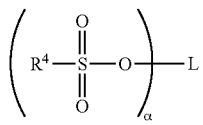
(2)

(wherein L represents an optionally substituted organic group with valence number α, R⁴ represents a halogen atom, a hydrocarbon group of 1 to 4 carbon atoms, or an alkoxy group, α is an integer of 1 or more, and, when α is 2 or more, a plurality of R⁴ may be the same or different, and wherein R⁴ and L may bind to each other to form a ring.

<3>

The nonaqueous electrolytic solution according to the item <1> above, wherein the compound having an NCO group is a compound represented by the following general formula (3),

[Chemical Formula 3]

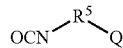
(3)

(wherein R⁵ represents an organic group of 1 to 20 carbon atoms that may have a branched structure or an aromatic group, and Q represents a hydrogen atom or an NCO group).

<4>

The nonaqueous electrolytic solution according to the item <2> or <3> above, wherein at least one compound selected from the group consisting of the carbonate ester having an unsaturated bond, the compound represented by the general formula (1), the compound represented by the general formula (2), and the compound represented by the general formula (3) is at least one compound selected from the group consisting of vinylene carbonate, vinylethylene carbonate, ethynylethylene carbonate, methylpropargyl carbonate, dipropargyl carbonate, lithium bis(oxalate)borate, lithium difluorooxalateborate, lithium tris(oxalate)phosphate, lithium difluorobis(oxalate)phosphate, lithium tetrafluorooxalatephosphate, ethynylethylene sulfate, propynyl vinyl sulfonate, and hexamethylene diisocyanate.

<5>

The nonaqueous electrolytic solution according to the item <1> above, wherein at least one compound selected from the group consisting of the monofluorophosphate, the difluorophosphate, the fluorosulfonate, and the imide salt is at least one compound selected from the group consisting of lithium monofluorophosphate, lithium difluorophosphate, lithium fluorosulfonate, LiN(FSO₂)₂, LiN(CF₃SO₂)₂, and LiN(C₂F₅SO₂)₂.

<6>

A nonaqueous electrolytic solution for use in a nonaqueous electrolytic solution secondary battery that comprises a positive electrode capable of storing and releasing metal ions, a negative electrode that contains a carbonaceous material, and a nonaqueous electrolytic solution, wherein the nonaqueous electrolytic solution contains a compound that does not have an aliphatic substituent having an unsaturated bond but has a Si—Si bond, and a carbonate ester having a halogen atom.

<7>

The nonaqueous electrolytic solution according to the item <6>, wherein the carbonate ester having a halogen atom is at least one compound selected from monofluoroethylene carbonate, 4,4-difluoroethylene carbonate, and 4,5-difluoroethylene carbonate.

<8>

The nonaqueous electrolytic solution according to any one of the items <1> to <7> above, wherein the compound that does not have an aliphatic substituent having an unsaturated bond but has a Si—Si bond is a compound represented by the following general formula (4).

[Chemical Formula 4]

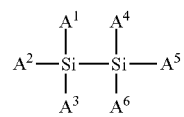
(4)

(wherein A¹ to A⁶ may be the same or different, and represent a hydrogen atom, a halogen atom, a hydrocarbon group of 1 to 10 carbon atoms that may have a heteroatom, or an optionally substituted hydrogen silicide group of 1 to 10 silicon atoms, and wherein A¹ to A⁶ may bind to one another to form a ring, where none of A¹ to A⁶ is an aliphatic substituent having an unsaturated bond).

<9>

The nonaqueous electrolytic solution according to any one of the items <1> to <8> above, wherein the compound that does not have an aliphatic substituent having an unsaturated bond but has a Si—Si bond is at least one selected from the group consisting of hexamethyldisilane, hexaethyldisilane, 1,2-diphenyltetramethyldisilane, and 1,1,2,2-tetraphenyldisilane.

<10>

The nonaqueous electrolytic solution according to any one of the items <1> to <9> above, which comprises the compound that does not have an aliphatic substituent having an unsaturated bond but has a Si—Si bond in an amount of 0.01 mass % or more and 10 mass % or less.

<11>

A nonaqueous electrolytic solution secondary battery that comprises a carbon-based negative electrode and a positive electrode capable of storing and releasing metal ions, and a nonaqueous electrolytic solution, wherein the nonaqueous electrolytic solution is the nonaqueous electrolytic solution of any one of the items <1> to <10>.

Advantage of the Invention

The present invention can provide a nonaqueous electrolytic solution of desirable characteristics, particularly low-temperature discharge characteristics and/or cycle characteristics, and nonaqueous electrolytic solution secondary batteries using such nonaqueous electrolytic solutions.

MODE FOR CARRYING OUT THE INVENTION

An embodiment of the present invention is described below in detail. The explanations of the constituent features of the invention described below are one example (a representative example) of the embodiment of the invention, and the invention should not be construed as being specified to the content described below. Various modifications of the invention are possible within the gist of the present invention.

As used herein, "mass %" and "weight %", "ppm by mass" and "ppm by weight", and "parts by mass" and "parts by weight" are synonymous to each other. Further, the unit "ppm" used alone means "ppm by weight".

Compounds represented by formula (X) also refer to "compounds (X)".

<1-0. Estimated Mechanism of Advantages of the Present Invention>

The advantages of the present invention include adding a compound that does not have an unsaturated bond-containing aliphatic substituent but has a Si—Si bond to a nonaqueous electrolytic solution (a first addition), and adding at least one selected from the group consisting of a carbonate ester having an unsaturated bond, a compound of the following general formula (1), a compound having a S=O group, and a compound containing an NCO group (a second addition). It is believed that these additions provide a low-temperature discharge characteristic improving effect through the effect of the first addition suppressing the battery internal resistance, while maintaining the stability of a negative electrode coating and the resulting improvement of cycle characteristics at conventional levels by the second addition, as described in Examples 1-1 to 1-9 below. It was also found that the present invention has the advantage of improving cycle characteristics over conventional levels, as described in Examples 1-10 and 1-11.

[Chemical Formula 5]

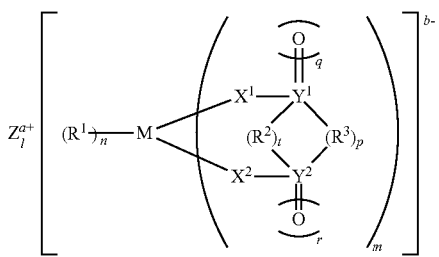

(M represents a transition metal, an element in group 13, 14, or 15 of the periodic table, or a hydrocarbon group of 1 to 6 carbon atoms that may have a heteroatom. When M is a transition metal or an element in group 13, 14, or 15 of the periodic table, $Z^{a+}$ is a metal ion, a proton, or an onium ion, a represents 1 to 3, b represents 1 to 3, l represents b/a, m represents 1 to 4, n represents 1 to 8, t represents 0 to 1, p represents 0 to 3, q represents 0 to 2, and r represents 0 to 2. When M is a hydrocarbon group of 1 to 6 carbon atoms that may have a heteroatom, $Z^{a+}$ does not exist, and a=b=l=n=0, m=1, t represents 0 to 1, p represents 0 to 3, q represents 0 to 2, and r represents 0 to 2. $R^1$ represents a halogen atom, a hydrocarbon group of 1 to 20 carbon atoms that may have a heteroatom, or $X^3R^4$ ($R^1$ that exists in number n may bind to one another to form a ring), $R^2$ represents a direct bond, or a hydrocarbon group of 1 to 6 carbon atoms that may have a heteroatom, $X^1$, $X^2$, $X^3$ each independently represent O, S, or $NR^5$, $R^3$, $R^4$, and $R^5$ each independently represent hydrogen, a hydrocarbon group of 1 to 10 carbon atoms that may have a heteroatom (a plurality of $R^3$ and $R^4$ may bind to one another to form a ring), and $Y^1$ and $Y^2$ each independently represent C, S, or Si. When $Y^1$ or $Y^2$ is C or Si, q or r is 0 or 1, and when Y1 or Y2 is S, q and r are each 2.)

In the present invention, it is believed that the use of the compound that does not have an unsaturated bond-containing aliphatic substituent but has a Si—Si bond improves battery low-temperature characteristics by way of suppressing low-temperature internal resistance without increasing the degree of polymerization of the coating.

Presumably, this is due to the formation of a coating by the compound that does not have an unsaturated bond-containing aliphatic substituent but has a Si—Si bond, not through self-polymerization, but by a chemical interaction or chemical reaction with the surface functional groups of the carbon-based negative electrode.

Further, the present invention successfully improves the cycle characteristics and the low-temperature discharge characteristics at the same time from the conventional levels with the use of a negative electrode containing a carbonaceous material and with the nonaqueous electrolytic solution that contains a compound that does not have an unsaturated bond-containing aliphatic substituent but has a Si—Si bond, and a carbonate ester having a halogen atom, as described in Examples 1-12 and 1-13 below.

It is speculated that this effect develops by the following mechanism. The carbonate ester having a halogen atom undergoes reaction at the edge portions of the carbonaceous negative electrode where the intercalation/deintercalation of Li ions in and out of the negative electrode takes place. The decomposed product of the reaction originating from the carbonate ester having a halogen atom promotes a reaction of the compound that does not have an unsaturated bond-containing aliphatic substituent but has a Si—Si bond, and selectively forms a coating, originating from the compound that does not have an unsaturated bond-containing aliphatic substituent but has a Si—Si bond, at the edge portions of the carbonaceous negative electrode. Note that it was confirmed in Reference Example 1-14 that the effect obtained by the present invention does not exhibit with a Si negative electrode.

Further, as described in Example 2-1 or 2-2, the present invention, adding hexafluorophosphate and the compound that does not have an unsaturated bond-containing aliphatic substituent but has a Si—Si bond to the nonaqueous electrolytic solution, and adding at least one compound selected from the group consisting of monofluorophosphate, difluorophosphate, fluorosulfonate, and an imide salt is believed to exhibit effect that is more than a simple addition of the battery internal resistance suppressing effects provided by these additions, but is synergy of these effects.

The compound that does not have an unsaturated bond-containing aliphatic substituent but has a Si—Si bond forms a low-resistance coating on the negative electrode, whereas at least one compound selected from the group consisting of monofluorophosphate, difluorophosphate, fluorosulfonate, and an imide salt has the effect of suppressing the resistance of the positive electrode. It is speculated that a part of the negative electrode coating provided by the first effect diffuses toward the positive electrode side, and enhances the second effect whereby the resistance of the positive electrode is suppressed.

<1-1. Electrolyte>

The electrolyte used in the nonaqueous electrolytic solution of the present invention is not limited, and any known electrolyte may be used and contained in the intended nonaqueous electrolytic solution secondary battery. When the nonaqueous electrolytic solution of the present invention is used for a nonaqueous electrolytic solution secondary battery, the electrolyte is preferably a lithium salt.

Specific examples of the electrolyte include:

inorganic lithium salts such as $LiClO_4$, $LiAsF_6$, $LiPF_6$, $Li_2CO_3$, and $LiBF_4$;

fluorine-containing organic lithium salts such as $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiPF_4(CF_3)_2$, $LiPF_4(C_2F_5)_2$, $LiPF_4(CF_3SO_2)_2$, $LiPF_4(C_2F_5SO_2)_2$, $LiBF_3(CF_3)$, $LiBF_3(C_2F_5)$, $LiBF_2(CF_3)_2$, $LiBF_2(C_2F_5)_2$, $LiBF_2(CF_3SO_2)_2$, and $LiBF_2(C_2F_5SO_2)_2$;

dicarboxylic acid-containing complex lithium salts such as lithium bis(oxalate)borate, lithium difluoro(oxalate)borate, lithium tris(oxalate)phosphate, lithium difluorobis(oxalate)phosphate, and lithium tetrafluoro(oxalate)phosphate; and sodium salts or potassium salts such as $KPF_6$, $NaPF_6$, $NaBF_4$, and $CF_3SO_3Na$.

Preferred are $LiPF_6$, $LiBF_4$, $LiCF_3SO_3$, $LiN(CF_3SO_2)_2$, $LiN(C_2F_5SO_2)_2$, and lithium bis(oxalate)borate. Particularly preferred are $LiPF_6$ and $LiBF_4$.

The electrolyte may be used either alone, or two or more electrolytes may be used in any combination and proportion. It is preferable to use two specific inorganic lithium salts, or use an inorganic lithium salt with a fluorine-containing organic lithium salt, because it suppresses gas generation during continuous charging, or deterioration after high-temperature storage.

It is particularly preferable to use $LiPF_6$ and $LiBF_4$ in combination, or use an inorganic lithium salt such as $LiPF_6$ and $LiBF_4$ in combination with a fluorine-containing organic lithium salt such as $LiCF_3SO_3$, $LiN(CF_3SO_2)_2$, and $LiN(C_2F_5SO_2)_2$.

When using $LiPF_6$ and $LiBF_4$ in combination, $LiBF_4$ is typically contained in preferably 0.01 mass % to 20 mass % of the total electrolyte. $LiBF_4$ has a low degree of dissociation, and may increase the resistance of the nonaqueous electrolytic solution when contained in excess proportions.

On the other hand, when an inorganic lithium salt such as $LiPF_6$ and $LiBF_4$ is used in combination with a fluorine-containing organic lithium salt such as $LiCF_3SO_3$, $LiN(CF_3SO_2)_2$, and $LiN(C_2F_5SO_2)_2$, the desirable proportion of the inorganic lithium salt in the total lithium salt is typically from 70 mass % to 99 mass %. Generally, the fluorine-containing organic lithium salts have larger molecular weights than the inorganic lithium salts. When contained in excess proportions, the resistance of the nonaqueous electrolytic solution may increase as the proportion of the nonaqueous solvent in the total nonaqueous electrolytic solution becomes smaller.

The lithium salt in the final composition of the nonaqueous electrolytic solution of the present invention may have any concentration, provided that it is not detrimental to the advantages of the present invention. The concentration of the lithium salt is typically 0.5 mol/L or more, preferably 0.6 mol/L or more, more preferably 0.8 mol/L or more, and typically 3 mol/L or less, preferably 2 mol/L or less, more preferably 1.5 mol/L or less. Excessively low concentrations may cause the nonaqueous electrolytic solution to have insufficient electric conductivity. When the concentration is in excess, the viscosity increases and the electric conductivity lowers, with the result that the performance of the nonaqueous electrolytic solution secondary battery using the nonaqueous electrolytic solution of the present invention may be lowered.

Particularly, when the main component of the nonaqueous solvent of the nonaqueous electrolytic solution is a carbonate compound such as alkylene carbonate and dialkyl carbonate, it is preferable to use $LiPF_6$ in combination with $LiBF_4$, because it suppresses the capacity deterioration due to continuous charging, though $LiPF_6$ may be used alone. When used in combination, the molar ratio of $LiBF_4$ with respect to $LiPF_6$ is typically 0.005 or more, preferably 0.01 or more, particularly preferably 0.05 or more, and typically 0.4 or less, preferably 0.2 or less. When the molar ratio is too large, the battery characteristics after high-temperature storage tend to lower. Conversely, when too small, it becomes difficult to obtain the effect of suppressing the gas generation and capacity deterioration due to continuous charging.

When the nonaqueous solvent of the nonaqueous electrolytic solution contains cyclic carboxylic acid ester compounds such as γ-butyrolactone and γ-valerolactone in 50 volume % or more, the proportion of $LiBF_4$ in the total lithium salt is preferably 50 mol % or more.

<1-2. Nonaqueous Solvent>

The nonaqueous solvent contained in the nonaqueous electrolytic solution of the present invention is not particularly limited, as long as it does not have adverse effects on the battery characteristics in the product battery. Preferably, the nonaqueous solvent is one or more solvents used for nonaqueous electrolytic solutions, as follows.

Examples of the nonaqueous solvent commonly used include chain and cyclic carbonates, chain and cyclic carboxylic acid esters, chain and cyclic ethers, phosphorus-containing organic solvents, and sulfur-containing organic solvents. The chain carbonates are not particularly limited. As an example of the commonly used chain carbonates, dialkyl carbonates are preferred, and the constituent alkyl group contains preferably 1 to 5 carbon atoms, particularly preferably 1 to 4 carbon atoms.

Specific examples include dimethyl carbonate, ethyl methyl carbonate, diethyl carbonate, methyl-n-propyl carbonate, ethyl-n-propyl carbonate, and di-n-propyl carbonate.

Of these, dimethyl carbonate, ethyl methyl carbonate, and diethyl carbonate are preferred from the standpoint of industrial availability, and various properties in the nonaqueous electrolytic solution secondary battery.

The cyclic carbonates are not particularly limited. As an example of the commonly used cyclic carbonates, cyclic carbonates with the alkylene group containing 2 to 6 carbon atoms, particularly 2 to 4 carbon atoms are preferred.

Specific examples include ethylene carbonate, propylene carbonate, and butylene carbonate (2-ethylethylene carbonate, cis and trans 2,3-dimethylethylene carbonate).

Of these, ethylene carbonate and propylene carbonate are preferred from the standpoint of various properties in the nonaqueous electrolytic solution secondary battery.

The chain carboxylic acid esters are not particularly limited. Examples of the commonly used chain carboxylic acid esters include methyl acetate, ethyl acetate, n-propyl acetate, i-propyl acetate, n-butyl acetate, i-butyl acetate, t-butyl acetate, methyl propionate, ethyl propionate, n-propyl propionate, i-propyl propionate, n-butyl propionate, i-butyl propionate, and t-butyl propionate.

Of these, methyl acetate, ethyl acetate, methyl propionate, and ethyl propionate are preferred from the standpoint of industrial availability, and various properties in the nonaqueous electrolytic solution secondary battery.

The cyclic carboxylic acid esters are not particularly limited. Examples of the commonly used cyclic carboxylic acid esters include γ-butyrolactone, γ-valerolactone, and δ-valerolactone.

Of these, γ-butyrolactone is preferred from the standpoint of industrial availability, and various properties in the nonaqueous electrolytic solution secondary battery.

The chain ethers are not particularly limited. Examples of the commonly used chain esters include dimethoxymethane, dimethoxyethane, diethoxymethane, diethoxyethane, ethoxymethoxymethane, and ethoxymethoxyethane.

Of these, dimethoxyethane and diethoxyethane are preferred from the standpoint of industrial availability, and various properties in the nonaqueous electrolytic solution secondary battery.

The cyclic ethers are not particularly limited. Examples of the commonly used cyclic ethers include tetrahydrofuran, 2-methyltetrahydrofuran, and tetrahydropyran.

The phosphorus-containing organic solvents are not particularly limited. Examples of the commonly used phosphorus-containing organic solvents include phosphoric acid esters such as trimethyl phosphate, triethyl phosphate, and triphenyl phosphate; phosphorous acid esters such as trimethyl phosphite, triethyl phosphite, and triphenyl phosphite; and phosphine oxides such as trimethylphosphine oxide, triethylphosphine oxide, and triphenylphosphine oxide.

The sulfur-containing organic solvents are not particularly limited. Examples of the commonly used sulfur-containing organic solvents include ethylene sulfite, 1,3-propane sultone, 1,4-butane sultone, methyl methanesulfonate, busulfan, sulfolane, sulfolene, dimethyl sulfone, diphenyl sulfone, methylphenyl sulfone, dibutyl disulfide, dicyclohexyl disulfide, tetramethylthiuram monosulfide, N,N-dimethylmethanesulfoneamide, and N,N-diethylmethanesulfoneamide.

Of these, chain and cyclic carbonates and chain and cyclic carboxylic acid esters are preferred from the standpoint of various properties in the nonaqueous electrolytic solution secondary battery. More preferred are ethylene carbonate, propylene carbonate, dimethyl carbonate, ethyl methyl carbonate, diethyl carbonate, ethyl acetate, methyl propionate, ethyl propionate, and γ-butyrolactone. Further preferred are ethylene carbonate, propylene carbonate, dimethyl carbonate, ethyl methyl carbonate, diethyl carbonate, ethyl acetate, methyl propionate, and γ-butyrolactone.

These may be used either alone or in a combination of two or more. Preferably, these are used in a combination of two or more. For example, it is preferable to use a high-dielectric-constant solvent of cyclic carbonate in combination with a low-viscosity solvent such as chain carbonate and chain ester.

An example of the preferred combinations of the nonaqueous solvents is a combination that contains a cyclic carbonate and a chain carbonate as its main components. Particularly preferred is a combination in which the total of the cyclic carbonate and the chain carbonate is 80 volume % or more, preferably 85 volume % or more, more preferably 90 volume % or more with respect to the total nonaqueous solvent, and in which the volume of the cyclic carbonate with respect to the total of the cyclic carbonate and the chain carbonate is 5 volume % or more, preferably 10 volume % or more, more preferably 15 volume % or more, and typically 50 volume % or less, preferably 35 volume % or less, more preferably 30 volume % or less. Using this combination of nonaqueous solvents is preferable, because it provides a good balance between the cycle characteristics and the high-temperature storage characteristics (particularly, the remaining capacity and high-load discharge capacity after high-temperature storage) of the product battery.

Specific examples of the preferred combination of cyclic carbonate and chain carbonate include a combination of ethylene carbonate and dimethyl carbonate, a combination of ethylene carbonate and diethyl carbonate, a combination of ethylene carbonate and ethyl methyl carbonate, a combination of ethylene carbonate, dimethyl carbonate, and diethyl carbonate, a combination of ethylene carbonate, dimethyl carbonate, and ethyl methyl carbonate, a combination of ethylene carbonate, diethyl carbonate, and ethyl methyl carbonate, and a combination of ethylene carbonate, dimethyl carbonate, diethyl carbonate, and ethyl methyl carbonate.

A combination of the ethylene carbonate-chain carbonate combination with propylene carbonate is also preferred. When propylene carbonate is contained, the volume ratio of ethylene carbonate and propylene carbonate is preferably 99:1 to 40:60, particularly preferably 95:5 to 50:50. Further, it is preferable that the proportion of the propylene carbonate in the total nonaqueous solvent be 0.1 volume % or more, preferably 1 volume % or more, more preferably 2 volume % or more, and typically 10 volume % or less, preferably 8 volume % or less, more preferably 5 volume % or less, because it can provide even more improved charge and discharge load characteristics while maintaining the properties of the ethylene carbonate and chain carbonate combination.

Combinations containing asymmetrical chain carbonates are further preferred. Particularly preferred are those containing ethylene carbonate, symmetrical chain carbonate, and asymmetrical chain carbonate (such as a combination of ethylene carbonate, dimethyl carbonate, and ethyl methyl carbonate, a combination of ethylene carbonate, diethyl carbonate, and ethyl methyl carbonate, and a combination of ethylene carbonate, dimethyl carbonate, diethyl carbonate, and ethyl methyl carbonate), or those further containing propylene carbonate, because these combinations provide a good balance between cycle characteristics and charge and discharge load characteristics. Of these, combinations containing ethyl methyl carbonate as the asymmetrical chain carbonate are preferred, and the alkyl group forming the dialkyl carbonate has preferably 1 to 2 carbon atoms.

Other examples of the preferred mixed solvent include those containing chain esters. Particularly preferred from the standpoint of improving the charge and discharge load characteristics of the battery are those containing chain esters in the mixed solvent of cyclic carbonate and chain carbonate. Particularly preferred as the chain esters are ethyl acetate, and methyl propionate. The volume of the chain ester in the nonaqueous solvent is typically 5% or more, preferably 8% or more, more preferably 15% or more, and typically 50% or less, preferably 35% or less, more preferably 30% or less, further preferably 25% or less.

Other examples of the preferred nonaqueous solvent include those in which one organic solvent selected from the group consisting of ethylene carbonate, propylene carbonate and butylene carbonate, and γ-butyrolactone and γ-valerolactone, or a mixed solvent containing two or more organic solvents selected from this group are contained in a proportion of 60 volume % or more with respect to the total. Preferably, such mixed solvents have a flash point of 50° C. or more, particularly preferably 70° C. or more. A nonaqueous electrolytic solution using such solvents involves less solvent evaporation and leaking even when used under high temperature. Generally, the balance between battery characteristics such as between cycle characteristics and charge and discharge load characteristics can improve with the nonaqueous solvent in which the total proportion of the ethylene carbonate and γ-butyrolactone in the nonaqueous solvent is 80 volume % or more, preferably 90 volume % or more, and the volume ratio of ethylene carbonate and γ-butyrolactone is 5:95 to 45:55, or in which the total of the ethylene carbonate and propylene carbonate is 80 volume % or more, preferably 90 volume % or more, and the volume ratio of ethylene carbonate and propylene carbonate is 30:70 to 80:20.

<1-3. Specific Si Compounds>

The "compound that does not have an unsaturated bond-containing aliphatic substituent but has a Si—Si bond" (hereinafter, also referred to as "specific Si compound") used in the present invention may be used either alone or in any combination of two or more. The following specifically describes the "specific Si compound" of the present invention.

The "specific Si compound" of the present invention is not particularly limited, as long as it is a compound that does not have an unsaturated bond-containing aliphatic substituent but has a Si—Si bond. However, from the viewpoints of industrial availability and solubility in the electrolytic solution, the specific Si compound is preferably a compound represent by the following general formula (4).

[Chemical Formula 6]

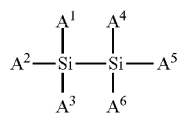

(4)

(A$^1$ to A$^6$ may be the same or different, and represent a hydrogen atom, a halogen atom, a hydrocarbon group of 1 to 10 carbon atoms that may have a heteroatom, or an optionally substituted hydrogen silicide group of 1 to 10 silicon atoms, A$^1$ to A$^6$ may bind to each other to form a ring. Note that none of A$^1$ to A$^6$ is an aliphatic substituent that has an unsaturated bond.)

A$^1$ to A$^6$ are preferably hydrocarbon groups of 1 to 10 carbon atoms, or hydrogen atoms, particularly preferably hydrocarbon groups of 1 to 10 carbon atoms. Preferred examples of the hydrocarbon group of 1 to 10 carbon atoms include a methyl group, an ethyl group, an n-propyl group, and i-propyl group, and n-butyl group, an i-propyl group, a t-butyl group, a phenyl group and a hydrogen atom. Particularly preferred examples include a methyl group, an ethyl group, a phenyl group and a hydrogen atom.

The reason the specific compound having a Si—Si bond used in the present invention does not have an aliphatic substituent having an unsaturated bond is to prevent the high-resistance coating formed by the self-polymerization of the aliphatic substituent from canceling the effect of the "specific Si compound" suppressing the battery internal resistance.

Preferred specific examples of the "specific Si compound" include compounds represented by the following formulae (a) to (q), of which (a), (b), (e), (g), (i) to (k), and (n) are more preferred, (a), (e), (j), (k), (n) are further preferred, and (a) hexamethyldisilane, (e) hexaethyldisilane, (j) 1,2-diphenyltetramethyldisilane, and (k) 1,1,2,2-tetraphenyldisilane are most preferred.

[Chemical Formula 7]

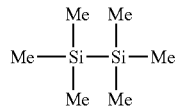

(a)

-continued

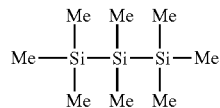

(b)

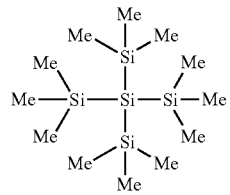

(c)

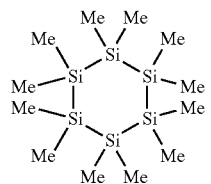

(d)

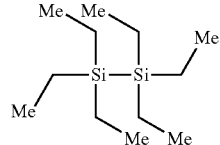

(e)

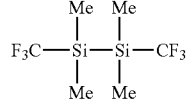

(f)

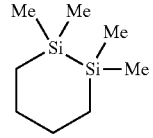

(g)

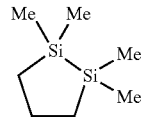

(h)

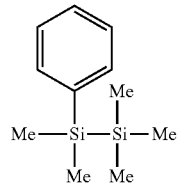

(i)

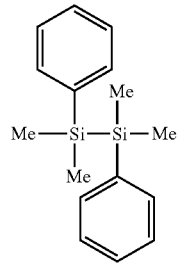

(j)

-continued (k)
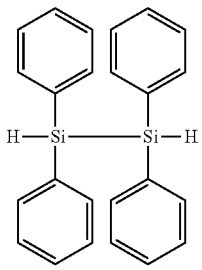

(l)
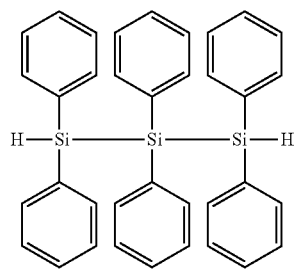

(m)
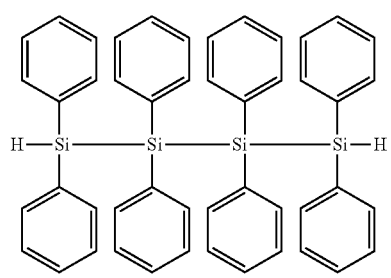

(n)
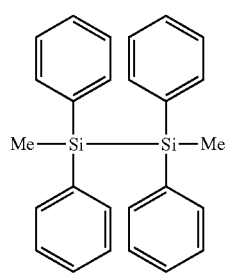

[Chemical Formula 8]

(o)
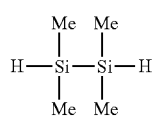

(p)
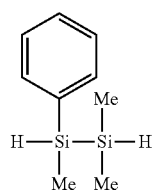

(q)
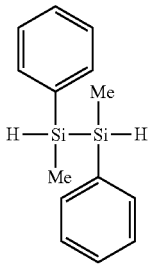

These compounds are preferred, because they are readily available in the industry, and can thus keep the manufacturing cost of the electrolytic solution low. Another reason is that these specific Si compounds can easily dissolve in the nonaqueous electrolytic solution, and can help effectively exhibit the effect of suppressing the battery internal resistance with the high-quality coating formed by the specific Si compounds.

When mixing the specific Si compound of the present invention in the electrolytic solution, the specific Si compound may be mixed in any amount, provided that it is not detrimental to the advantages of the present invention. The preferred lower limit is preferably 0.01 mass % or more, more preferably 0.1 mass % or more with respect to the total nonaqueous electrolytic solution. The preferred upper limit is preferably 10 mass % or less, more preferably 5 mass % or less, further preferably 2 mass % or less, most preferably 1 mass % or less with respect to the total nonaqueous electrolytic solution. These ranges are preferred, because unwanted reactions can be prevented while allowing the specific Si compound to sufficiently exhibit its effect.

<1-4. Carbonate Ester Having Unsaturated Bond, Compound of General Formula (1), Compound Having S=O Group, NCO Group-Containing Compound, Monofluorophosphate, Difluorophosphate, Fluorosulfonate, and Imide Salt>

The following specifically describes the carbonate ester having an unsaturated bond, the compound of general formula (1), the compound having a S=O group, and the NCO group-containing compound (hereinafter, also referred to simply as "specific compounds") used in the present invention. The following also specifically describes at least one compound selected from the group consisting of monofluorophosphate, difluorophosphate, fluorosulfonate, and an imide salt of the present invention (hereinafter, also referred to as "specific salts"). The specific compounds and the specific salts may be used either alone or in any combination of two or more.

(1-4-1. Carbonate Ester Having Unsaturated Bond)

The molecular weight of the carbonate ester having an unsaturated bond is not particularly limited, and the carbonate ester having an unsaturated bond may have any molecular weight, as long as it is not detrimental to the advantages of the present invention. The molecular weight of the carbonate ester having an unsaturated bond is typically 50 or more, preferably 80 or more, and typically 250 or less, preferably 150 or less. In these molecular weight ranges, the carbonate ester having an unsaturated bond can have desirable solubility for the nonaqueous electrolytic solution, and can help exhibit the foregoing effect more desirably.

The producing process of the carbonate ester having an unsaturated bond is not particularly limited, and any known process can be chosen to produce the carbonate ester having an unsaturated bond.

The carbonate ester having an unsaturated bond may be contained in the nonaqueous electrolytic solution of the present invention either alone, or two or more may be contained in any combination and proportion.

The amount of the carbonate ester having an unsaturated bond mixed with the nonaqueous electrolytic solution of the present invention is not particularly limited, and the carbonate ester having an unsaturated bond may be mixed in any amount, as long as it is not detrimental to the advantages of the present invention. Desirably, the carbonate ester having an unsaturated bond is contained in the nonaqueous electrolytic solution of the present invention at a concentration of typically 0.01 mass % or more, preferably 0.1 mass % or more, more preferably 0.3 mass % or more, and typically 70 mass % or less, preferably 50 mass % or less, more preferably 40 mass % or less.

In these ranges, the effect of improving cycle characteristics can develop more easily and sufficiently when the nonaqueous electrolytic solution of the present invention is used in nonaqueous electrolytic solution secondary batteries. Further, high-temperature storage characteristics and continuous charging characteristics also tend to improve, making it possible to suppress gas generation, and prevent capacity retention from being lowered.

The carbonate ester having an unsaturated bond according to the present invention is not particularly limited, and any carbonate ester having an unsaturated bond may be used, as long as it is a carbonate having a carbon-carbon unsaturated bond such as a carbon-carbon double bond, and a carbon-carbon triple bond. The carbonate ester having an unsaturated bond may have a halogen atom. The carbonate ester having an unsaturated bond also encompasses carbonates having an aromatic ring.

Examples of the carbonate ester having an unsaturated bond include vinylene carbonate derivatives, ethylene carbonate derivatives substituted with a substituent having an aromatic ring or a carbon-carbon unsaturated bond, phenyl carbonates, vinyl carbonates, and allyl carbonates.

Specific examples of the vinylene carbonate derivatives include vinylene carbonate, methylvinylene carbonate, 4,5-dimethylvinylene carbonate, phenylvinylene carbonate, 4,5-diphenylvinylene carbonate, and catechol carbonate.

Specific examples of the ethylene carbonate derivatives substituted with a substituent having an aromatic ring or a carbon-carbon unsaturated bond include vinylethylene carbonate, 4,5-divinylethylene carbonate, phenylethylene carbonate, 4,5-diphenylethylene carbonate, and ethynylethylene carbonate.

Specific examples of the phenyl carbonates include diphenyl carbonate, ethylphenyl carbonate, methylphenyl carbonate, and t-butylphenyl carbonate.

Specific examples of the vinyl carbonates include divinyl carbonate, and methylvinyl carbonate.

Specific examples of the allyl carbonates include diallyl carbonate, and allylmethyl carbonate.

Other preferred specific examples include methylpropargyl carbonate, dipropargyl carbonate, and compounds represented by the following formulae (B1) and (B2).

[Chemical Formula 9]

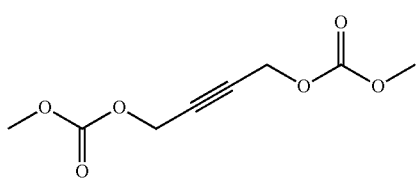

(B1)

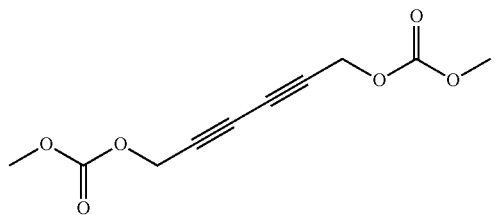

(B2)

Of these carbonate esters having an unsaturated bond, preferred are vinylene carbonate derivatives, and ethylene derivatives substituted with a substituent having an aromatic ring or a carbon-carbon unsaturated bond. Particularly, vinylene carbonate, 4,5-diphenylvinylene carbonate, 4,5-dimethylvinylene carbonate, vinylethylene carbonate, and ethynylethylene carbonate are preferably used, because these form a stable interface protective coating.

Particularly preferred among these preferred carbonate esters having an unsaturated bond are compounds represented by formulae (B3) to (B7), more particularly compounds represented by formulae (B3) and (B5).

[Chemical Formula 10]

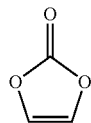

(B3)

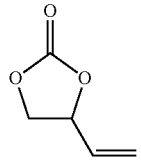

(B4)

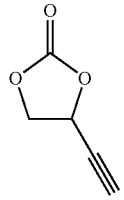

(B5)

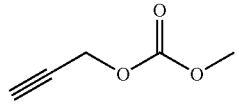

(B6)

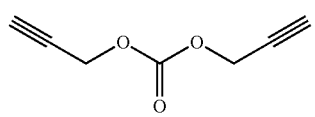

(B7)

(1-4-2. Compound of General Formula (1))

The molecular weight of the compound represented by the general formula (1) below as a specific compound is not particularly limited, and may be any molecular weight, as long as it is not detrimental to the advantages of the present invention. The molecular weight of the compound of general formula (1) is typically 100 or more, preferably 140 or more, and typically 400 or less, preferably 350 or less. In these molecular weight ranges, the solubility of the compound of the general formula (1) in the nonaqueous electrolytic solution can improve, and it becomes easier to obtain improved effects.

[Chemical Formula 11]

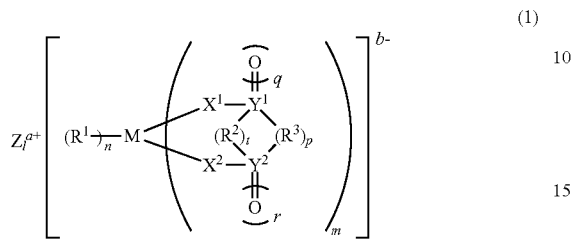

(1)

(M represents a transition metal, an element of group 13, 14, or 15 of the periodic table, or a hydrocarbon group of 1 to 6 carbon atoms that may have a heteroatom. When M is a transition metal or an element of group 13, 14, or 15 of the periodic table, $Z^{a+}$ is a metal ion, a proton, or an onium ion, and a represents 1 to 3, b represents 1 to 3, l represents b/a, m represents 1 to 4, n represents 1 to 8, t represents 0 to 1, p represents 0 to 3, q represents 0 to 2, and r represents 0 to 2. When M is a hydrocarbon group of 1 to 6 carbon atoms that may have a heteroatom, $Z^{a+}$ does not exist, a=b=l=n=0, m=1, t represents 0 to 1, p represents 0 to 3, q represents 0 to 2, and r represents 0 to 2.

$R^1$ represents a halogen atom, a hydrocarbon group of 1 to 20 carbon atoms that may have a heteroatom, or $X^3R^4$ ($R^1$ that exists in number n may bind to one another to form a ring), $R^2$ represents a direct bond, or a hydrocarbon group of 1 to 6 carbon atoms that may have a heteroatom, $X^1$, $X^2$, and $X^3$ each independently represent O, S, or $NR^5$, $R^3$, $R^4$, and $R^5$ each independently represent hydrogen, a hydrocarbon group of 1 to 10 carbon atoms that may have a heteroatom (a plurality of $R^3$ and $R^4$ may bind to one another to form a ring), and $Y^1$ and $Y^2$ each independently represent C, S, or Si. When $Y^1$ or $Y^2$ is C or Si, q or r is 0 or 1, and, when Y1 or Y2 is S, q and r are each 2.)

The producing process of the compound of the general formula (1) is not particularly limited, and any known process can be chosen to produce the compound of general formula (1).

The compound of general formula (1) may be contained in the nonaqueous electrolytic solution of the present invention either alone, or two or more may be contained in any combination and proportion.

The amount of the compound of general formula (1) mixed with the nonaqueous electrolytic solution of the present invention is not limited, and the compound of general formula (1) may be mixed in any amount, as long as it is not detrimental to the advantages of the present invention. Desirably, the compound of general formula (1) is contained in the nonaqueous electrolytic solution of the present invention at a concentration of typically 0.01 mass % or more, preferably 0.1 mass % or more, more preferably 0.2 mass % or more, and typically 70 mass % or less, preferably 50 mass % or less, more preferably 40 mass % or less.

In these ranges, the effect of improving cycle characteristics can develop more easily and sufficiently when the nonaqueous electrolytic solution of the present invention is used in nonaqueous electrolytic solution secondary batteries.

Further, high-temperature storage characteristics and continuous charging characteristics also tend to improve.

Specific preferred examples of the compound of general formula (1) include compounds represented by formulae (B8) to (B14), more preferably compounds represented by formulae (B9), (B11), and (B13).

[Chemical Formula 12]

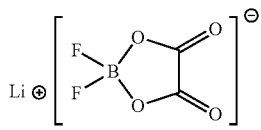

(B8)

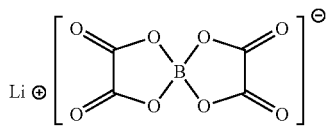

(B9)

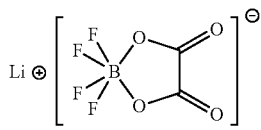

(B10)

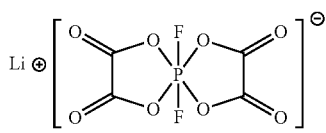

(B11)

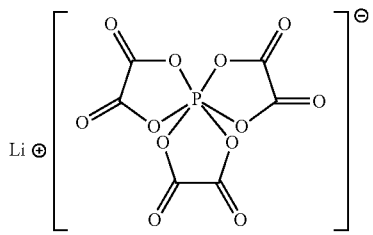

(B12)

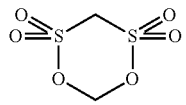

(B13)

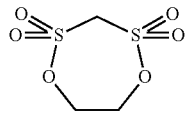

(B14)

(1-4-3. Compound Having S=O Group)

Examples of the specific compound having a S=O group include compounds represented by the following general formula (2).

[Chemical Formula 13]

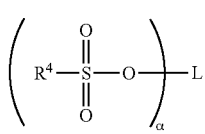

(2)

(L represents an optionally substituted organic group with valence number α, $R^4$ represents a halogen atom, a hydrocarbon group of 1 to 4 carbon atoms, or an alkoxy group. α is an integer of 1 or more, and, when α is 2 or more, a plurality of $R^4$ may be the same or different. $R^4$ and L may bind to each other to form a ring.)

The following describes sulfuric acid ester and sulfonic acid ester as specific examples of the compounds of general formula (2).

(1-4-3-1. Sulfuric Acid Ester)

The molecular weight of the specific compound sulfuric acid ester is not particularly limited, and may be any molecular weight, as long as it is not detrimental to the advantages of the present invention. The molecular weight of the sulfuric acid ester is typically 100 or more, preferably 120 or more, and typically 250 or less, preferably 180 or less. In these molecular weight ranges, the solubility of the sulfuric acid ester in the nonaqueous electrolytic solution can improve, and it becomes easier to obtain improved effects.

The producing process of the sulfuric acid ester is not particularly limited, and any known process may be chosen to produce the sulfuric acid ester.

The sulfuric acid ester may be contained in the nonaqueous electrolytic solution of the present invention either alone, or two or more may be contained in any combination and proportion.

The amount of the sulfuric acid ester mixed with the nonaqueous electrolytic solution of the present invention is not limited, and the sulfuric acid ester may be mixed in any amount, as long as it is not detrimental to the advantages of the present invention. Desirably, the sulfuric acid ester is contained in the nonaqueous electrolytic solution of the present invention at a concentration of typically 0.01 mass % or more, preferably 0.1 mass % or more, more preferably 0.2 mass % or more, and typically 70 mass % or less, preferably 50 mass % or less, more preferably 40 mass % or less.

In these ranges, the effect of improving cycle characteristics can develop more easily and sufficiently when the nonaqueous electrolytic solution of the present invention is used in nonaqueous electrolytic solution secondary batteries. Further, high-temperature storage characteristics and continuous charging characteristics also tend to improve.

Specific preferred examples of the sulfuric acid ester include compounds represented by formulae (B15) to (B22), more preferably compounds represented by formulae (B15), (B17), (B18), and (B22).

[Chemical Formula 14]

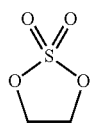
(B15)

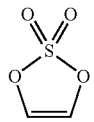
(B16)

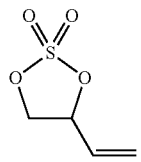
(B17)

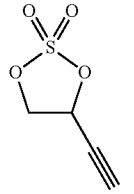
(B18)

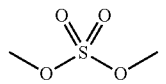
(B19)

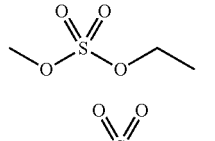
(B20)

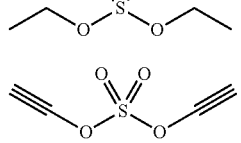
(B21)

(B22)

(1-4-3-2. Sulfonic Acid Ester)

The molecular weight of the specific compound sulfonic acid ester is not particularly limited, and may be any molecular weight, as long as it is not detrimental to the advantages of the present invention. The molecular weight of the sulfonic acid ester is typically 100 or more, preferably 120 or more, and typically 250 or less, preferably 150 or less. In these molecular weight ranges, the solubility of the sulfonic acid ester in the nonaqueous electrolytic solution can improve, and it becomes easier to obtain improved effects.

The producing process of the sulfonic acid ester is not particularly limited, and any known process may be chosen to produce the sulfonic acid ester.

The sulfonic acid ester may be contained in the nonaqueous electrolytic solution of the present invention either alone, or two or more may be contained in any combination and proportion.

The amount of the sulfonic acid ester mixed with the nonaqueous electrolytic solution of the present invention is not limited, and the sulfonic acid ester may be mixed in any amount, as long as it is not detrimental to the advantages of the present invention. Desirably, the sulfonic acid ester is contained in the nonaqueous electrolytic solution of the present invention at a concentration of typically 0.01 mass % or more, preferably 0.1 mass % or more, more preferably 0.2 mass % or more, and typically 70 mass % or less, preferably 50 mass % or less, more preferably 40 mass % or less.

In these ranges, the effect of improving cycle characteristics can develop more easily and sufficiently when the nonaqueous electrolytic solution of the present invention is used in nonaqueous electrolytic solution secondary batteries.

Further, high-temperature storage characteristics and continuous charging characteristics also tend to improve.

Specific preferred examples of the sulfonic acid ester include compounds represented by formulae (B23) to (B36), more preferably compounds represented by formulae (B23), (B24), (B27), (B28), and (B31) to (B36).

[Chemical Formula 15]

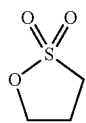

(B23)

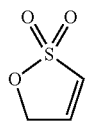

(B24)

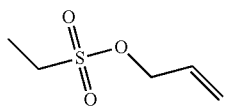

(B25)

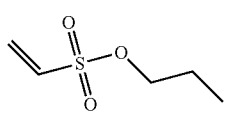

(B26)

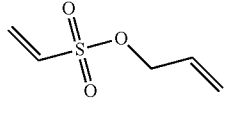

(B27)

(B28)

[Chemical Formula 16]

(B29)

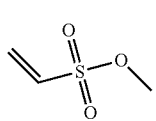

(B30)

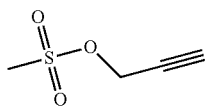

(B31)

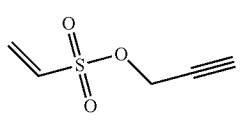

(B32)

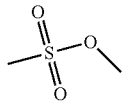

(B33)

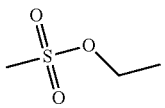

(B34)

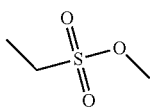

(B35)

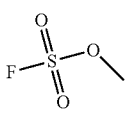

(B36)

(1-4-3. NCO Group-Containing Compound)

Examples of the NCO group-containing compound as a specific compound include compounds represented by the following general formula (3).

[Chemical Formula 17]

(3)

($R^5$ represents an organic group of 1 to 20 carbon atoms that may have a branched structure or an aromatic, and Q represents a hydrogen atom or an NCO group.)

The molecular weight of the NCO group-containing compound is not particularly limited, and may be any molecular weight, as long as it is not detrimental to the advantages of the present invention. The molecular weight of the NCO group-containing compound is typically 50 or more, preferably 70 or more, and typically 250 or less, preferably 220 less. In these molecular weight ranges, the solubility of the NCO group-containing compound in the nonaqueous electrolytic solution can improve, and it becomes easier to obtain improved effects.

The producing process of the NCO group-containing compound is not particularly limited, and any known process may be chosen to produce the NCO group-containing compound.

The NCO group-containing compound may be contained in the nonaqueous electrolytic solution of the present invention either alone, or two or more may be contained in any combination and proportion.

The amount of the NCO group-containing compound mixed with the nonaqueous electrolytic solution of the present invention is not limited, and the NCO group-containing compound may be mixed in any amount, as long as it is not detrimental to the advantages of the present invention. Desirably, the NCO group-containing compound is contained in the nonaqueous electrolytic solution of the present invention at a concentration of typically 0.01 mass % or more, preferably 0.05 mass % or more, more preferably 0.1 mass % or more, and typically 70 mass % or less, preferably 50 mass % or less, more preferably 40 mass % or less.

In these ranges, the effect of improving cycle characteristics can develop more easily and sufficiently when the nonaqueous electrolytic solution of the present invention is used in nonaqueous electrolytic solution secondary batteries.

Further, high-temperature storage characteristics and continuous charging characteristics also tend to improve.

Examples of the specific preferred NCO group-containing compound include compounds represented by formulae (B37) to (B45), more preferably compounds represented by (B41), (B42), (B43), and (B44) (hexamethylene diisocyanate).

[Chemical Formula 18]

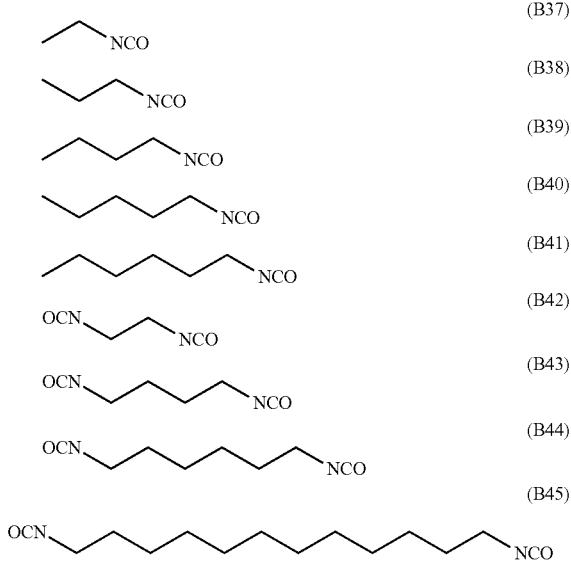

Preferred among the foregoing compounds are vinylene carbonate, vinylethylene carbonate, ethynylethylene carbonate, methylpropargyl carbonate, dipropargyl carbonate, lithium bis(oxalate)borate, lithium difluorooxalateborate, lithium tris(oxalate)phosphate, lithium difluorobis(oxalate) phosphate, lithium tetrafluorooxalatephosphate, ethynylethylene sulfate, propynyl vinyl sulfonate, hexamethylene diisocyanate, particularly vinylene carbonate, ethynylethylene carbonate, lithium bis(oxalate)borate, lithium difluorobis(oxalate)phosphate, and hexamethylene diisocyanate, because these compounds provide a relatively greater effect of improving cycle characteristics by formation of a coating on the negative electrode as compared to the effect of inducing an increase of internal resistance.

(1-4-6. Carbonate Ester Having Halogen Atom)

The molecular weight of the carbonate ester having a halogen atom is not particularly limited, and may be any molecular weight, as long as it is not detrimental to the advantages of the present invention. The molecular weight of the carbonate ester having a halogen atom is typically 50 or more, preferably 80 or more, and typically 250 or less, preferably 150 less. In these molecular weight ranges, the solubility of the carbonate ester having a halogen atom in the nonaqueous electrolytic solution can improve, and it becomes easier to obtain improved effects.

The producing process of the carbonate ester having a halogen atom is not particularly limited, and any known process may be chosen to produce the carbonate ester having a halogen atom.

The carbonate ester having a halogen atom may be contained in the nonaqueous electrolytic solution of the present invention either alone, or two or more may be contained in any combination and proportion.

The amount of the carbonate ester having a halogen atom mixed with the nonaqueous electrolytic solution of the present invention is not limited, and the carbonate ester having a halogen atom may be mixed in any amount, as long as it is not detrimental to the advantages of the present invention. Desirably, the carbonate ester having a halogen atom is contained in the nonaqueous electrolytic solution of the present invention at a concentration of typically 0.01 mass % or more, preferably 0.1 mass % or more, more preferably 0.3 mass % or more, and typically 70 mass % or less, preferably 50 mass % or less, more preferably 40 mass % or less.

In these ranges, the effect of improving cycle characteristics can develop more easily and sufficiently when the nonaqueous electrolytic solution of the present invention is used in nonaqueous electrolytic solution secondary batteries. Further, high-temperature storage characteristics and continuous charging characteristics also tend to improve, particularly making it possible to suppress gas generation, and prevent capacity retention from being lowered.

The carbonate having a halogen atom (hereinafter, also referred to simply as "halogenated carbonate") is not particularly limited, and any halogenated carbonate may be used, as long as it has a halogen atom.

Specific examples of the halogen atom include a fluorine atom, a chlorine atom, a bromine atom, and an iodine atom, of which a fluorine atom and a chlorine atom are preferred, and a fluorine atom is particularly preferred. The number of halogen atoms contained in the halogenated carbonate is not particularly limited either, as long as it is 1 or more. Typically, the number of halogen atoms is 6 or less, preferably 4 or less. When the halogenated carbonate has a plurality of halogen atoms, the halogen atoms may be the same or different.

Examples of the halogenated carbonate include ethylene carbonate derivatives, dimethyl carbonate derivatives, ethyl methyl carbonate derivatives, and diethyl carbonate derivatives.

Specific examples of the ethylene carbonate derivatives include monofluoroethylene carbonate, monochloroethylene carbonate, 4,4-difluoroethylene carbonate, 4,5-difluoroethylene carbonate, 4,4-dichloroethylene carbonate, 4,5-dichloroethylene carbonate, 4-fluoro-4-methylethylene carbonate, 4-chloro-4-methylethylene carbonate, 4,5-difluoro-4-methylethylene carbonate, 4,5-dichloro-4-methylethylene carbonate, 4-fluoro-5-methylethylene carbonate, 4-chloro-5-methylethylene carbonate, 4,4-difluoro-5-methylethylene carbonate, 4,4-dichloro-5-methylethylene carbonate, 4-(fluoromethyl)-ethylene carbonate, 4-(chloromethyl)-ethylene carbonate, 4-(difluoromethyl)-ethylene carbonate, 4-(dichloromethyl)-ethylene carbonate, 4-(trifluoromethyl)-ethylene carbonate, 4-(trichloromethyl)-ethylene carbonate, 4-(fluoromethyl)-4-fluoroethylene carbonate, 4-(chloromethyl)-4-chloroethylene carbonate, 4-(fluoromethyl)-5-fluoroethylene carbonate, 4-(chloromethyl)-5-chloroethylene carbonate, 4-fluoro-4,5-dimethylethylene carbonate, 4-chloro-4,5-dimethylethylene carbonate, 4,5-difluoro-4,5-dimethylethylene carbonate, 4,5-dichloro-4,5-dimethyl ethylene carbonate, 4,4-difluoro-5,5-dimethyl ethylene carbonate, and 4,4-dichloro-5,5-dimethyl ethylene carbonate.

Specific examples of the dimethyl carbonate derivatives include fluoromethyl methyl carbonate, difluoromethyl methyl carbonate, trifluoromethyl methyl carbonate, bis (fluoromethyl)carbonate, bis(difluoro)methyl carbonate, bis (trifluoro)methyl carbonate, chloromethyl methyl carbonate, dichloromethyl methyl carbonate, trichloromethyl methyl carbonate, bis(chloromethyl)carbonate, bis(dichloro)methyl carbonate, and bis(trichloro)methyl carbonate.

Specific examples of the ethyl methyl carbonate derivatives include 2-fluoroethyl methyl carbonate, ethylfluoromethyl carbonate, 2,2-difluoroethyl methyl carbonate, 2-fluoroethylfluoromethyl carbonate, ethyldifluoromethyl carbonate, 2,2,2-trifluoroethyl methyl carbonate, 2,2-difluoroethylfluoromethyl carbonate, 2-fluoroethyldifluoromethyl carbonate, ethyltrifluoromethyl carbonate, 2-chloroethylmethyl carbonate, ethylchloromethyl carbonate, 2,2-dichloroethylmethyl carbonate, 2-chloroethylchloromethyl carbonate, ethyldichloromethyl carbonate, 2,2,2-trichloroethylmethyl carbonate, 2,2-dichloroethylchloromethyl carbonate, 2-chloroethyldichloromethyl carbonate, and ethyltrichloromethyl carbonate.

Specific examples of the diethyl carbonate derivatives include ethyl-(2-fluoroethyl)carbonate, ethyl-(2,2-difluoroethyl)carbonate, bis(2-fluoroethyl)carbonate, ethyl-(2,2,2-trifluoroethyl)carbonate, 2,2-difluoroethyl-2'-fluoroethyl carbonate, bis(2,2-difluoroethyl)carbonate, 2,2,2-trifluoroethyl-2'-fluoroethyl carbonate, 2,2,2-trifluoroethyl-2',2'-difluoroethyl carbonate, bis(2,2,2-trifluoroethyl)carbonate, ethyl-(2-chloroethyl)carbonate, ethyl-(2,2-dichloroethyl) carbonate, bis(2-chloroethyl)carbonate, ethyl-(2,2,2-trichloroethyl)carbonate, 2,2-dichloroethyl-2'-chloroethyl carbonate, bis(2,2-dichloroethyl)carbonate, 2,2,2-trichloroethyl-2'-chloroethyl carbonate, 2,2,2-trichloroethyl-2',2'-dichloroethyl carbonate, and bis(2,2,2-trichloroethyl) carbonate.

Preferred among these halogenated carbonates are carbonates having a fluorine atom, more preferably ethylene carbonate derivatives having a fluorine atom. Particularly preferred are monofluoroethylene carbonate, 4,4-difluoroethylene carbonate, and 4,5-difluoroethylene carbonate, because these compounds form LiF having an interface protective function.

(1-4-7. Monofluorophosphate, Difluorophosphate, Fluorosulfonate, and Imide Salt)

Examples of the monofluorophosphate include lithium monofluorophosphate, sodium monofluorophosphate, potassium monofluorophosphate, magnesium monofluorophosphate, and calcium monofluorophosphate. Examples of the difluorophosphate include lithium difluorophosphate, sodium difluorophosphate, potassium difluorophosphate, magnesium difluorophosphate, and calcium difluorophosphate. Examples of the fluorosulfonate include lithium fluorosulfonate, sodium fluorosulfonate, potassium fluorosulfonate, magnesium fluorosulfonate, and calcium fluorosulfonate. Examples of the imide salt include LiN(FSO$_2$)$_2$, LiN(CF$_3$SO$_2$)$_2$, LiN(C$_2$F$_5$SO$_2$)$_2$, and LiN(CF$_3$SO$_2$)(C$_4$F$_9$SO$_2$). Preferred examples include compounds such as lithium monofluorophosphate, lithium difluorophosphate, lithium fluorosulfonate, LiN(FSO$_2$)$_2$, LiN(CF$_3$SO$_2$)$_2$, and LiN(C$_2$F$_5$SO$_2$)$_2$, as represented below by formulae (B46) to (B51). Compounds represented by formulae (B47) to (B50) are particularly preferred, because these compounds are highly soluble in the nonaqueous electrolytic solution, and help exhibit the effect of the specific salt more effectively. Further, because the salts have the lithium ions as cations, the intercalation and deintercalation reaction of the lithium ions in and out of the carbon material commonly used as the negative electrode can reversibly proceed in batteries such as the lithium ion secondary battery. This is advantageous in terms of not having particular adverse effects on the battery.

[Chemical Formula 19]

(B46)

(B47)

(B48)

(B49)

(B50)

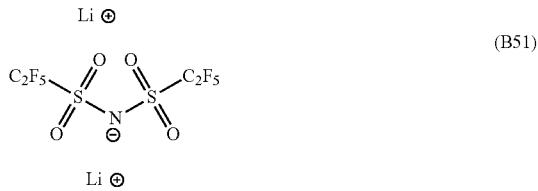

(B51)

When the specific salt of the present invention is mixed with the electrolytic solution, the specific salt may be mixed in any amount, as long as it is not detrimental to the advantages of the present invention. Typically, the specific salt is mixed in preferably 0.01 mass % or more, preferably 0.1 mass % or more, and typically 20 mass % or less, preferably 10 mass % or less with respect to the total nonaqueous electrolytic solution. These ranges are particularly desirable, because unnecessary reactions can be suppressed while allowing the specific salt to sufficiently exhibit its effect.

<1-5. Additive>

The nonaqueous electrolytic solution of the present invention may contain various additives to the extent that is not detrimental to the advantages of the present invention. When prepared with additives, any known additives may be used. Additives may be used either alone, or two or more additives may be used in any combination and proportion.

<1-5-1. Other Additives>

Additives other than the specific compound are described below. Examples of the additives other than the specific compound include overcharge preventing agents, and auxiliary agents for improving the capacity retention characteristics and cycle characteristics after high-temperature storage.

<1-5-1-1. Overcharge Preventing Agent>

Specific examples of the overcharge preventing agent include aromatic compounds, including toluene derivatives such as toluene and xylene; unsubstituted or alkyl-substituted biphenyl derivatives such as biphenyl, 2-methylbiphenyl, 3-methylbiphenyl, and 4-methylbiphenyl; unsubstituted or alkyl-substituted terphenyl derivatives such as o-terphenyl, m-terphenyl, and p-terphenyl; partially hydrogenated products of unsubstituted or alkyl-substituted terphenyl derivatives; cycloalkylbenzene derivatives such as cyclopentylbenzene and cyclohexylbenzene; alkylbenzene derivatives having tertiary carbon directly bonded to the benzene ring, such as cumene, 1,3-diisopropylbenzene, and 1,4-diisopropylbenzene; alkylbenzene derivatives having quaternary carbon directly bonded to the benzene ring, such as t-butylbenzene, t-amylbenzene, and t-hexylbenzene; and aromatic compounds having an oxygen atom, such as diphenyl ether and dibenzofuran.

These overcharge preventing agents may be used alone, or two or more may be used in any combination. When used in any combination, the combination may be between compounds of the same category or different categories presented above.

Specific examples of the combinations of compounds of different categories include a combination of toluene derivative and biphenyl derivative; a combination of toluene derivative and terphenyl derivative; a combination of toluene derivative and partially hydrogenated product of terphenyl derivative; a combination of toluene derivative and cycloalkylbenzene derivative; a combination of toluene derivative and alkylbenzene derivative having tertiary carbon directly bonded to the benzene ring; a combination of toluene derivative and alkylbenzene derivative having quaternary carbon directly bonded to the benzene ring; a combination of toluene derivative and aromatic compound having an oxygen atom; a combination of biphenyl derivative and terphenyl derivative; a combination of biphenyl derivative and partially hydrogenated product of terphenyl derivative; a combination of biphenyl derivative and cycloalkylbenzene derivative; a combination of biphenyl derivative and alkylbenzene derivative having tertiary carbon directly bonded to the benzene ring; a combination of biphenyl derivative and alkylbenzene derivative having quaternary carbon directly bonded to the benzene ring; a combination of biphenyl derivative and aromatic compound having an oxygen atom; a combination of terphenyl derivative and partially hydrogenated product of terphenyl derivative; a combination of terphenyl derivative and cycloalkylbenzene derivative; a combination of terphenyl derivative and alkylbenzene derivative having tertiary carbon directly bonded to the benzene ring; a combination of terphenyl derivative and alkylbenzene derivative having quaternary carbon directly bonded to the benzene ring; a combination of terphenyl derivative and aromatic compound having an oxygen atom; a combination of partially hydrogenated product of terphenyl derivative and cycloalkylbenzene derivative; a combination of partially hydrogenated product of terphenyl derivative and alkylbenzene derivative having tertiary carbon directly bonded to the benzene ring; a combination of partially hydrogenated product of terphenyl derivative and alkylbenzene derivative having quaternary carbon directly bonded to the benzene ring; a combination of partially hydrogenated product of terphenyl derivative and aromatic compound having an oxygen atom; a combination of cycloalkylbenzene derivative and alkylbenzene derivative having tertiary carbon directly bonded to the benzene ring; a combination of cycloalkylbenzene derivative and alkylbenzene derivative having quaternary carbon directly bonded to the benzene ring; a combination of cycloalkylbenzene derivative and aromatic compound having an oxygen atom; a combination of alkylbenzene derivative having tertiary carbon directly bonded to the benzene ring and alkylbenzene derivative having quaternary carbon directly bonded to the benzene ring; a combination of alkylbenzene derivative having tertiary carbon directly bonded to the benzene ring and aromatic compound having an oxygen atom; and a combination of alkylbenzene derivative having quaternary carbon directly bonded to the benzene ring and aromatic compound having an oxygen atom.

Specific examples of these combinations include a combination of biphenyl and o-terphenyl, a combination of biphenyl and m-terphenyl, a combination of biphenyl and partially hydrogenated product of terphenyl derivative, a combination of biphenyl and cumene, a combination of biphenyl and cyclopentylbenzene, a combination of biphenyl and cyclohexylbenzene, a combination of biphenyl and t-butylbenzene, a combination of biphenyl and t-amylbenzene, a combination of biphenyl and diphenyl ether, a combination of biphenyl and dibenzofuran, a combination of o-terphenyl and partially hydrogenated product of terphenyl derivative, a combination of o-terphenyl and cumene, a combination of o-terphenyl and cyclopentylbenzene, a combination of o-terphenyl and cyclohexylbenzene, a combination of o-terphenyl and t-butylbenzene, a combination of o-terphenyl and t-amylbenzene, a combination of o-terphenyl and diphenyl ether, a combination of o-terphenyl and dibenzofuran, a combination of m-terphenyl and partially hydrogenated product of terphenyl derivative, a combination of m-terphenyl and cumene, a combination of m-terphenyl and cyclopentylbenzene, a combination of m-terphenyl and cyclohexylbenzene, a combination of m-terphenyl and t-butylbenzene, a combination of m-terphenyl and t-amylbenzene, a combination of m-terphenyl and diphenyl ether, a combination of m-terphenyl and dibenzofuran, a combination of partially hydrogenated product of terphenyl derivative and cumene, a combination of partially hydrogenated product of terphenyl derivative and cyclopentylbenzene, a combination of partially hydrogenated product of terphenyl derivative and cyclohexylbenzene, a combination of partially hydrogenated product of terphenyl derivative and t-butylbenzene, a combination of partially hydrogenated product of terphenyl derivative and t-amylbenzene, a combination of partially hydrogenated product of terphenyl derivative and diphenyl ether, a combination of partially hydrogenated product of terphenyl derivative and dibenzofuran, a combination of cumene and cyclopentylbenzene, a combination of cumene and cyclohexylbenzene, a combination of cumene and t-butylbenzene, a combination of cumene and t-amylbenzene, a combination of cumene and diphenyl ether, a combination of cumene and dibenzofuran, a combination of cyclohexylbenzene and t-butylbenzene, a combination of cyclohexylbenzene and t-amylbenzene, a combination of cyclohexylbenzene and diphenyl ether, a combination of cyclohexylbenzene and dibenzofuran, a combination of t-butylbenzene and t-amylbenzene, a combination of t-butylbenzene and diphenyl ether, a combination of t-butylbenzene and dibenzofuran, a combination of t-amylbenzene and diphenyl ether, a combination of t-amylbenzene and dibenzofuran, and a combination of diphenyl ether and dibenzofuran.

When the nonaqueous electrolytic solution of the present invention contains the overcharge preventing agent, the overcharge preventing agent may be contained in any concentration, as long as it is not detrimental to the advantages of the present invention. Desirably, the overcharge preventing agent may be contained in typically 0.1 mass % or more and 5 mass % or less with respect to the total nonaqueous electrolytic solution.

It is preferable to contain the overcharge preventing agent in the nonaqueous electrolytic solution of the present invention to the extent that is not detrimental to the advantages of the present invention, because it improves the safety of the nonaqueous electrolytic solution secondary battery in case of overcharge as might occur when the battery is used for wrong purposes, or when the overcharge protecting circuit does not operate normally because of errors or other malfunctions in a charging device.

<1-5-1-2. Auxiliary Agent>

Specific examples of the auxiliary agent for improving the capacity retention characteristics and cycle characteristics after high-temperature storage include anhydrides of dicarboxylic acid such as succinic acid, maleic acid, and phthalic acid;

carbonate compounds that are not "specific carbonates", such as erythritan carbonate, and spiro-bis-dimethylene carbonate;

sulfur-containing compounds such as ethylene sulfite, 1,3-propane sultone, 1,4-butane sultone, methyl methanesulfonate, busulfan, sulfolane, sulfolene, dimethyl sulfone, diphenyl sulfone, methylphenyl sulfone, dibutyl disulfide, dicyclohexyl disulfide, tetramethylthiuram monosulfide, N,N-dimethylmethanesulfoneamide, and N,N-diethylmethanesulfoneamide;

nitrogen-containing compounds such as 1-methyl-2-pyrrolidinone, 1-methyl-2-piperidone, 3-methyl-2-oxazolidinone, 1,3-dimethyl-2-imidazolidinone, and N-methylsuccinimide; and hydrocarbon compounds such as heptane, octane, and cycloheptane.

[2. Nonaqueous Electrolytic Solution Secondary Battery]

The nonaqueous electrolytic solution secondary battery of the present invention includes a negative electrode and a positive electrode capable of storing and releasing ions, and the nonaqueous electrolytic solution of the present invention.

<2-1. Battery Configuration>

The nonaqueous electrolytic solution secondary battery of the present invention has the same configuration as conventionally known nonaqueous electrolytic solution secondary batteries, except for the configurations of the negative electrode and the nonaqueous electrolytic solution. Typically, the nonaqueous electrolytic solution secondary battery of the present invention is configured to include the positive electrode and the negative electrode laminated via a porous film (separator) impregnated with the nonaqueous electrolytic solution of the present invention, and a casing (outer package) housing the electrodes and the separator. As such, the nonaqueous electrolytic solution secondary battery of the present invention is not limited to a particular shape, and may have any of a cylindrical, a rectangular, a laminated, or a coin, and a large shape.

<2-2. Nonaqueous Electrolytic Solution>

The nonaqueous electrolytic solution of the present invention is used as the nonaqueous electrolytic solution. The nonaqueous electrolytic solution of the present invention may be used as a mixture with other nonaqueous electrolytic solutions, provided that it does not depart from the gist of the present invention.

<2-3. Negative Electrode>

The negative electrode active material used for the negative electrode is described below.

The negative electrode active material is not particularly limited, as long as it can store and release lithium ions electrochemically. Specific examples include carbonaceous materials, alloy materials, and lithium-containing metal composite oxide materials.

<2-3-1. Carbonaceous Material>

Preferred as the carbonaceous material used as the negative electrode active material is one selected from:

(2-3-1-1) natural graphite, (2-3-1-2) carbonaceous material obtained after one or more heat treatments of an artificial carbonaceous substance and an artificial graphite substance in a temperature range of 400° C. to 3,200° C., (2-3-1-3) carbonaceous material forming a negative electrode active material layer made of carbon materials having at least two different crystallinities, and/or in which there is a contact interface of carbon materials of different crystallinities, and (2-3-1-4) carbonaceous material forming a negative electrode active material layer made of carbon materials having at least two different orientations, and/or in which there is a contact interface of carbon materials of different orientations.

These materials are preferable, because they provide a good balance between initial irreversible capacity, and high current density charge and discharge characteristics.

The carbonaceous materials (2-3-1-1) to (2-3-1-4) may be used alone, or two or more may be used in any combination and proportion.

Specific examples of the artificial carbonaceous substance and artificial graphite substance (2-3-1-2) include natural graphite, coal cokes, petroleum cokes, coal pitches and petroleum pitches (or coal pitches and petroleum pitches after oxidation treatment), needle cokes, pitch cokes, and carbon materials as partially graphitized materials of needle cokes or pitch cokes, pyrolysis products of organic materials such as furnace black, acetylene black, and pitch carbon fibers, carbonizable organic materials and carbides thereof, solutions dissolving carbonizable organic materials in low-molecular organic solvents such as benzene, toluene, xylene, quinoline, and n-hexane, and carbides thereof Specific examples of the carbonizable organic materials include coal tar pitches, ranging from soft pitches to hard pitches, coal heavy oils (such as pyrolysis liquefaction oil), direct heavy oils from atmospheric residue and vacuum residue, crude oil, decomposed petroleum heavy oils (such as ethylene tar obtained as a by-product of the pyrolysis of products such as naphtha), aromatic hydrocarbon (such as acenaphthylene, decacyclene, anthracene, and phenanthrene), nitrogen atom-containing heterocyclic compounds (such as phenazine and acridine), sulfur atom-containing heterocyclic compounds (such as thiophene and bithiophene), polyphenylene (such as biphenyl and terphenyl), polyvinyl chloride, polyvinyl alcohol, polyvinyl butyral, insolubilized products of these, organic polymers such as (nitrogen-containing polyacnylonitrile, and polypyrrole), organic polymers (such as sulfur-containing polythiophene, and polystyrene), natural polymers of polysaccharides (such as cellulose, lignin, mannan, polygalacturonic acid, chitosan, and saccharose), thermoplastic resins (such as polyphenylene sulfide, and polyphenylene oxide), and heat-curable resins (such as furfuryl alcohol resin, phenol-formaldehyde resin, and imide resin).

<2-3-2. Configuration, Properties, and Preparation Method of Carbonaceous Negative Electrode>

It is desirable that the properties of the carbonaceous material, the negative electrode containing the carbonaceous material, the technique used to form the electrode, the collector, and the nonaqueous electrolytic solution secondary battery satisfy one of the following conditions (2-3-2-1) to (2-3-2-18), or more than one of these conditions at the same time.

(2-3-2-1) X-Ray Parameter

The d value (interlayer distance) of the lattice plane (002 plane) of the carbonaceous material as determined by X-ray diffraction according to the Gakushin method is typically 0.335 to 0.340 nm, preferably 0.335 to 0.338 nm, particularly preferably 0.335 to 0.337 nm. The crystallite size (Lc) as determined by X-ray diffraction according to the Gakushin method is typically 1.0 nm or more, preferably 1.5 nm or more, particularly preferably 2 nm or more.

Preferred as an amorphous carbon coating over a graphite surface is one in which the nucleus material is the graphite with a lattice plane (002 plane) d value of 0.335 to 0.338 nm as determined by X-ray diffraction, and in which a carbonaceous material having a larger d value of lattice plane (002 plane) than the nucleus material as determined X-ray diffraction is adhering to the graphite surface, wherein the nucleus material, and the carbonaceous material having a larger d value of lattice plane (002 plane) than the nucleus material as determined X-ray diffraction are contained in a weight ratio of 99/1 to 80/20. In this way, it is possible to produce a high-capacity negative electrode that does not easily undergo reaction with the electrolytic solution.

(2-3-2-2) Ash Content

The ash content in the carbonaceous material is preferably 1 mass % or less, more preferably 0.5 mass % or less, particularly preferably 0.1 mass % or less with respect to the total mass of the carbonaceous material. The lower limit is preferably 1 ppm or more. Above these ash content ranges by weight, there is a case where deterioration of battery performance by reaction with the nonaqueous electrolytic solution at the time of charge and discharge cannot be neglected. Below these ranges, production takes a long time and large energy, and facilities for preventing pollution. This may raise cost.

(2-3-2-3) Volume-Based Average Particle Size

The volume-based average particle size of the carbonaceous material is typically 1 μm or more, preferably 3 μm or more, further preferably 5 μm or more, particularly preferably 7 μm or more, and typically 100 μm or less, preferably 50 μm or less, more preferably 40 μm or less, further preferably 30 μm or less, particularly preferably 25 μm or less as determined as a volume-based average particle size (median size) by using a laser diffraction and scattering method. A volume-based average particle size below these ranges may cause an increase of irreversible capacity, which may lead to an initial battery capacity loss. Above the foregoing ranges, the coating applied in electrode production tends to have an uneven surface, which may have undesirable effects in battery production.

The volume-based average particle size is measured by dispersing a carbon powder in a 0.2 mass % aqueous solution (about 10 mL) of the surfactant polyoxyethylene (20) sorbitan monolaurate, using a laser diffraction and scattering particle size analyzer (Horiba Ltd.; LA-700). The median size measured as above is defined as the volume-based average particle size of the carbonaceous material of the present invention.

(2-3-2-4) Raman R-Value, Raman Half-Value Width

The Raman R value of the carbonaceous material is typically 0.01 or more, preferably 0.03 or more, further preferably 0.1 or more, and typically 1.5 or less, preferably 1.2 or less, further preferably 1 or less, particularly preferably 0.5 or less as measured by argon ion laser Raman spectroscopy.

A Raman R value above these ranges may produce excessively high particle surface crystallinity, leaving only a few sites for lithium entry between layers during charge and discharge. That is, charge acceptance may suffer. Further, when a high-density negative electrode is fabricated by pressing after coating the collector, crystals are likely to align in directions parallel to the electrode plate. This may lower the load characteristics. On the other hand, above the foregoing ranges, there are cases where the crystallinity of the particle surface lowers, and reactivity to the nonaqueous electrolytic solution increases. This may cause reduction of efficiency, and increase of gas generation.

The Raman half-value width of the carbonaceous material near 1,580 cm$^{-1}$ is not particularly limited, and is typically 10 cm$^{-1}$ or more, preferably 15 cm$^{-1}$ or more, and typically 100 cm$^{-1}$ or less, preferably 80 cm$^{-1}$ or less, further preferably 60 cm$^{-1}$ or less, particularly preferably 40 cm$^{-1}$ or less.

A Raman half-value width below these ranges produce excessively high particle surface crystallinity, leaving only a few sites for lithium entry between layers during charge and discharge. That is, charge acceptance may suffer. Further, when a high-density negative electrode is fabricated by pressing after coating the collector, crystals are likely to align in directions parallel to the electrode plate. This may lower the load characteristics. On the other hand, above the foregoing ranges, there are cases where the crystallinity of the particle surface lowers, and reactivity to the nonaqueous electrolytic solution increases. This may cause reduction of efficiency, and increase of gas generation.

Raman spectral measurement is performed with a Raman spectroscope (JASCO Corporation). Specifically, a sample is allowed to free fall into a measurement cell and fill the cell. The cell is then rotated within a plane perpendicular to a laser beam while irradiating the sample surface in the cell with an argon ion laser. The resulting Raman spectrum is then measured for intensity IA of peak PA near 1,580 cm$^{-1}$, and intensity IB of peak PB near 1,360 cm$^{-1}$, and the intensity ratio R (R=IB/IA) is calculated. The Raman R value so calculated is defined as the Raman R value of the carbonaceous material of the present invention. The half-value width of peak PA near 1580 cm$^{-1}$ of the resulting Raman spectrum is also measured, and this is defined as the Raman half-value width of the carbonaceous material of the present invention.

Raman measurement conditions are as follows.

Argon ion laser wavelength: 514.5 nm
Laser power on sample: 15 to 25 mW
Resolution: 10 to 20 cm$^{-1}$
Measurement range: 1,100 cm$^{-1}$ to 1,730 cm$^{-1}$
Raman R value, Raman half-value width Analysis: background treatment
Smoothing treatment: Convolution by simple average 5 points (2-3-2-5) BET Specific Surface Area The BET specific surface area of the carbonaceous material is typically 0.1 m2·g$^{-1}$ or more, preferably 0.7 m2·g$^{-1}$ or more, further preferably 1.0 m$^2$·g$^{-1}$ or more, particularly preferably 1.5 m$^2$·g$^{-1}$ or more, and typically 100 m$^2$·g$^{-1}$ or less, preferably 25 m$^2$·g$^{-1}$ or less, further preferably 15 m$^2$·g$^{-1}$ or less, particularly preferably 10 m$^2$·g$^{-1}$ or less as measured by using the BET method.

A BET specific surface area value below these ranges tends to have adverse effect on lithium acceptance during charge when the carbonaceous material is used as negative electrode material, and may cause the lithium to more likely to deposit on the electrode surface, possibly lowering stability. On the other hand, above these ranges, there are cases where the reactivity to the nonaqueous electrolytic solution increases and more gas is generated when the carbonaceous material is used as negative electrode material, making it difficult to obtain a desirable battery.

Specific surface area measurement using BET method is performed as follows. A sample is preliminarily dried at 350° C. for 15 minutes under the stream of nitrogen using a surface area measurement device (Ohkura Riken; fully automatic surface area measurement device), and measurement is taken by single-point nitrogen adsorption BET according to the gas flow method, using a nitrogen-helium mixed gas accurately adjusted to make the relative pressure value of nitrogen 0.3 against atmospheric pressure. The specific surface area so determined is defined as the BET specific surface area of the carbonaceous material of the present invention.

(2-3-2-6) Pore Size Distribution

The pore size distribution of the carbonaceous material is calculated by measuring a mercury intrusion amount. Desirably, a carbonaceous material having pore sizes equivalent of 0.01 μm or more and 1 μm or less has a pore size distribution of typically 0.01 $cm^3 \cdot g^{-1}$ or more, preferably 0.05 $cm^3 \cdot g^{-1}$ or more, more preferably 0.1 $cm^3 \cdot g^{-1}$ or more, and typically 0.6 $cm^3 \cdot g^{-1}$ or less, preferably 0.4 $cm^3 \cdot g^{-1}$ or less, more preferably 0.3 $cm^3 \cdot g^{-1}$ or less, the pore size being measured by mercury porosimetry (mercury intrusion technique) for pores created by, for example, spaces inside the particles of the carbonaceous material, irregularities formed by steps on particle surfaces, and contact surfaces between the particles.

Above these pore size distribution ranges, large amounts of binder may be necessary for electrode plate formation. Below these ranges, high current density charge and discharge characteristics may lower, and the relaxation effect of the electrode expansion and contraction may not be obtained at the charge and discharge.

The total pore volume determined by mercury porosimetry (mercury intrusion technique), corresponding to pores with the diameter of 0.01 μm or more and 100 μm or less is typically 0.1 $cm^3 \cdot g^{-1}$ or more, preferably 0.25 $cm^3 \cdot g^{-1}$ or more, further preferably 0.4 $cm^3 \cdot g^{-1}$ or more, and typically 10 $cm^3 \cdot g^{-1}$ or less, preferably 5 $cm^3 \cdot g^{-1}$ or less, further preferably 2 $cm^3 \cdot g^{-1}$ or less. With a total pore volume above these ranges, large amounts of binder may be necessary for electrode plate formation. Below these ranges, the dispersing effect of a thickener or a binder may not be obtained in electrode plate formation.

Average pore size is typically 0.05 μm or more, preferably 0.1 μm or more, further preferably 0.5 μm or more, and typically 50 μm or less, preferably 20 μm or less, further preferably 10 μm or less. With an average pore size above these ranges, large amounts of binder may be necessary. Below these ranges, high current density charge and discharge characteristics may lower.

Mercury intrusion amount measurement is performed by using a mercury porosimeter, specifically Autopore 9520 (Micromeritics). As a pretreatment, a sample (about 0.2 g) is sealed inside a powder cell, and deaerated for 10 minutes at room temperature in a vacuum (50 μmHg or less). Then, the pressure is reduced to 4 psia (about 28 kPa) to introduce mercury. The pressure is increased from 4 psia (about 28 kPa) to 40,000 psia (about 280 MPa) in a stepwise manner, and decreased to 25 psia (about 170 kPa). Here, the pressure is increased in at least 80 steps, and a mercury intrusion amount is measured in each step after a 10-second equilibration time.

Pore size distribution is calculated from the mercury intrusion curve obtained as above, using Washburn's equation. Note that the mercury surface tension ($\gamma$) is 485 dyne·$cm^{-1}$ (1 dyne=10 μN), and the contact angle ($\phi$) is 140°. The pore size at 50% cumulative pore volume is used as the average pore size.

(2-3-2-7) Circularity

The circularity of the carbonaceous material as measured as a degree of sphericity should preferably fall in the ranges below. The circularity is defined as circularity=(the circumference of an equivalent circle having the same area as a particle projection shape)/(the actual circumference of the particle projection shape), and the circularity of 1 provides a theoretically true sphere.

The circularity of the particles with a carbonaceous material particle size of 3 to 40 μm becomes more desirable as it approaches 1, and is preferably 0.1 or more, specifically 0.5 or more, more preferably 0.8 or more, further preferably 0.85 or more, particularly preferably 0.9 or more.

The high current density charge and discharge characteristics improve as the circularity increases. Below these circularity ranges, the chargeability of the negative electrode active material lowers, and the resistance between particles increases. This may lower the short-time high current density charge and discharge characteristics.

The circularity is measured by using a flow-type particle image analyzer (for example, FPIA manufactured by Sysmex Industrial Corporation). About 0.2 g of a sample is dispersed in a 0.2 mass % aqueous solution (about 50 mL) of the surfactant polyoxyethylene(20) sorbitan monolaurate, and the dispersion is irradiated with an ultrasonic wave of 28 kHz at an output of 60 W for 1 minute. Subsequently, a detection range is designated to be 0.6 to 400 μm, and measurement is made for particles having a particle size of 3 to 40 μm. The resulting circularity is defined as the circularity of the carbonaceous material of the present invention.

A method of improving circularity is not particularly limited, and a method that provides a sphere by spheronization treatment is preferred, because it makes the shape of the particle space more uniform in the electrode unit. Examples of the spheronization treatment include a method of mechanically making the shape more spherical by imparting shear force or compressive force, and a method of mechanical or physical treatment in which a plurality of fine particles are granulated with a binder or by the adhesion force of the particles themselves.

(2-3-2-8) True Density

The true density of the carbonaceous material is typically 1.4 g·$cm^{-3}$ or more, preferably 1.6 g·$cm^{-3}$ or more, further preferably 1.8 g·$cm^{-3}$ or more, particularly preferably 2.0 g·$cm^{-3}$ or more, and typically 2.26 g·$cm^{-3}$ or less. A true density below these ranges may make the carbon crystallinity too low, and increase the initial irreversible capacity. Note that the upper limits of the foregoing ranges are the theoretical upper limits of the true density of graphite.

The true density of the carbonaceous material is measured by using a liquid phase displacement method (pycnometer method) using butanol. The value so determined is defined as the true density of the carbonaceous material of the present invention.

(2-3-2-9) Tap Density

The tap density of the carbonaceous material is typically 0.1 g·$cm^{-3}$ or more, preferably 0.5 g·$cm^{-3}$ or more, further preferably 0.7 g·cm$^{-3}$ or more, particularly preferably 0.9 g·cm$^{-3}$ or more, and preferably 2 g·cm$^{-3}$ or less, further preferably 1.8 g·cm$^{-3}$ or less, particularly preferably 1.6 g·cm$^{-3}$ or less.

A tap density below these ranges makes it difficult to increase charge density when the material is used as the negative electrode, and a high-capacity battery may not be obtained. Above these ranges, the space between the particles in the electrode becomes too few, and it may become difficult to provide conductivity between the particles, making it difficult to obtain desirable battery characteristics.

For tap density measurement, a sample is dropped into a 20-cm$^3$ tapping cell through a 300-μm sieve until the sample fills to the top of the cell. The sample is then tapped 1,000 times at a stroke length of 10 mm, using a powder density measurement device (for example, Tap Denser; Seishin Enterprise Co., Ltd.). The tap density is then calculated from the resulting volume and the sample weight. The tap density so calculated is defined as the tap density of the carbonaceous material of the present invention.

(2-3-2-10) Orientation Ratio

The orientation ratio of the carbonaceous material is typically 0.005 or more, preferably 0.01 or more, further preferably 0.015 or more, and typically 0.67 or less. An orientation ratio below these ranges may lower the high-density charge and discharge characteristics. Note that the upper limits of the foregoing ranges are the theoretical upper limits of the orientation ratio of the carbonaceous material.

The orientation ratio is measured by the X-ray diffraction of a sample after pressure molding. A sample (0.47 g) is charged into a molding machine (diameter 17 mm), and molded by being compressed at 58.8 MN·m$^{-2}$. For X-ray diffraction, the resulting product is set in a measurement sample holder in a manner that makes the sample surface in flush with the holder surface. From the peak intensities of the (110) diffraction and the (004) diffraction of the carbon, the peak intensity ratio (110) diffraction peak intensity/(004) diffraction peak intensity is calculated. The orientation ratio so calculated is defined as the orientation ratio of the carbonaceous material of the present invention.

X-ray diffraction measurement conditions are as follows. 2θ represents diffraction angle.
 target: Cu (Kα rays) graphite monochrometer
 slit
  divergence slit=0.5 degrees
  receiving slit=0.15 mm
  scattering slit=0.5 degrees
 measurement range and step angle/measurement time:
  (110) plane: 75 degrees 2θ≤80 degrees 1 degree/60 sec
  (004) plane: 52 degrees 2θ≤57 degrees 1 degree/60 sec (2-3-2-11) Aspect Ratio (Powder)

The aspect ratio of the carbonaceous material is typically 1 or more, and typically 10 or less, preferably 8 or less, further preferably 5 or less. An aspect ratio above these ranges may cause lineation, and a uniform coated surface may not be obtained at electrode plate formation, lowering the high current density charge and discharge characteristics. Note that the lower limits of the foregoing ranges are the theoretical lower limits of the aspect ratio of the carbonaceous material.

Aspect ratio measurement is performed by scanning electron microscopy of the carbonaceous material particles. Any 50 graphite particles fixed to an end surface of a metal having a thickness of 50 microns or less are selected, and a stage to which the sample is fixed is rotated and tilted to measure each particle for diameter A (the largest diameter of the carbonaceous material particles) and diameter B (the smallest diameter orthogonal to diameter A) by three-dimensional observation. The mean value of A/B is then determined. The aspect ratio (A/B) so determined is defined as the aspect ratio of the carbonaceous material of the present invention.

(2-3-2-12) Mixing of Secondary Material

Mixing of secondary materials means containing two or more carbonaceous materials of different properties in the negative electrode and/or negative electrode active material. Here, "properties" refers to one or more properties selected from the group consisting of X-ray diffraction parameter, median size, aspect ratio, BET specific surface area, orientation ratio, Raman R value, tap density, true density, pore distribution, circularity, and ash content.

Particularly preferred examples of the mixing of secondary materials include asymmetric volume-based particle size distribution about the median size, containing two or more carbonaceous materials of different Raman R values, and different X-ray parameters.

An example of the effect of mixing secondary materials is the reduction of electrical resistance by the inclusion of carbonaceous material as conductive materials, examples of which include graphite such as natural graphite and artificial graphite, carbon black such as acetylene black, and amorphous carbon such as needle coke.

When mixing conductive material as secondary material, the conductive material may be mixed alone, or two or more conductive materials may be mixed in any combination and proportion. The mixture ratio of the conductive material to the carbonaceous material is typically 0.1 mass % or more, preferably 0.5 mass % or more, further preferably 0.6 mass % or more, and typically 45 mass % or less, preferably 40 mass % or less. The conductivity improving effect may not be easily obtained with a mixture ratio below these ranges. Above these ranges, the initial irreversible capacity may increase.

(2-3-2-13) Electrode Production

Any known method can be used for electrode production, provided that it is not detrimental to the advantages of the present invention. For example, the electrode can be formed by adding a binder, a solvent, and optional materials such as a thickener, a conductive material, and a filler to the negative electrode active material, and the resulting slurry is coated over the collector, which is then pressed after being dried.

The thickness of the negative electrode active material layer on one side immediately before the battery nonaqueous electrolytic solution injection step is typically 15 μm or more, preferably 20 μm or more, further preferably 30 μm or more, and typically 150 μm or less, preferably 20 μm or less, further preferably 100 μm or less. A negative electrode active material thickness above these ranges may lower the high current density charge and discharge characteristics because of the difficulty permeating the nonaqueous electrolytic solution to regions in the vicinity of the collector interface. Below these ranges, the volume ratio of the collector to the negative electrode active material increases, and the battery capacity may decrease. The negative electrode active material may be prepared as a sheet electrode by roll molding, or a pellet electrode by compression molding.

(2-3-2-14) Collector

The collector holding the negative electrode active material may be any known collector. Examples of the negative electrode collector include metallic materials such as copper, nickel, stainless steel, and nickel-plated steel, of which copper is particularly preferred for processability and cost.

When made of metallic material, the collector may have a shape of, for example, a metal foil, a metal column, a metal coil, a metal plate, a metallic thin film, an expended metal, a punched metal, or a metal foam. Particularly preferred are metallic thin films, more preferably copper foils, further preferably press-rolled copper foils made by press rolling, and electrolytic copper foils made by using the electrolysis technique. Any one of these can be used as the collector.

When the copper foil has a thickness below 25 µm, copper alloys (such as phosphor bronze, titanium copper, Corson alloy, and Cu—Cr—Zr alloy) stronger than pure copper may be used.

The collector made of copper foils produced by press rolling can preferably be used for small cylindrical batteries, because the copper foil collector, with its copper crystals arranged in the press roll direction, does not easily crack even when the negative electrode is tightly or sharply rolled.

The electrolytic copper foil is obtained, for example, by dipping a metallic drum in a nonaqueous electrolytic solution dissolving copper ions, and current is flown while rotating the solution to cause the copper to deposit on the drum surface. The metal can then be detached to obtain the foil. The copper formed by electrolysis may be deposited on the surface of the press roll copper foil. One or both surfaces of the copper foil may be subjected to a roughening treatment or a surface treatment (for example, such as a chromate treatment down to a thickness of several nanometers to about 1 micrometer, and surface preparation using Ti and the like).

Other properties desired of the collector substrate include the following.

(2-3-2-14-1) Average Surface Roughness (Ra)

The average surface roughness (Ra) of the surface forming the negative electrode active material thin film of the collector substrate, specified by the method described in JIS B0601-1994, is not particularly limited, and is typically 0.05 µm or more, preferably 0.1 µm or more, further preferably 0.15 µm or more, and typically 1.5 µm or less, preferably 1.3 µm or less, further preferably 1.0 µm or less. With a collector substrate average surface roughness (Ra) in these ranges, desirable charge and discharge cycle characteristics can be expected. Further, the area of the interface with the negative electrode active material thin film increases, and the adhesion to the negative electrode active material thin film improves. The upper limit of average surface roughness (Ra) is not particularly limited, and is typically 1.5 µm or less, because foils with an average surface roughness (Ra) exceeding 1.5 µm is not commonly available as a foil of practical thickness.

(2-3-2-14-2) Tensile Strength

Tensile strength is the quotient obtained by dividing the maximum tensile force required to fracture a test piece by the test piece cross sectional area. The tensile strength used in the present invention is measured by using a device and a method similar to those described in JIS Z2241 (metallic material tensile testing method).

The tensile strength of the collector substrate is not particularly limited, and is typically 100 N·mm$^{-2}$ or more, preferably 250 N·mm$^{-2}$ or more, further preferably 400 N·mm$^{-2}$ or more, particularly preferably 500 N·mm$^{-2}$ or more. Preferably, the tensile strength should be as high as possible; however, from the viewpoint of industrial availability, the typical value of tensile strength is 1,000 N·mm$^{-2}$ or less. With a collector substrate having high tensile strength, cracking of the collector substrate resulting from the expansion and contraction of the negative electrode active material thin film due to charge and discharge can be suppressed, and desirable cycle characteristics can be obtained.

(2-3-2-14-3) 0.2% Bearing Force 0.2% Bearing force is the magnitude of the load required to cause 0.2% plastic (permanent) distortion, and it means that 0.2% deformation remains even after the removal of the applied load of this magnitude. 0.2% Bearing force is measured by using a device and a method similar to those used for the tensile strength measurement.

The 0.2% bearing force of the collector substrate is not particularly limited, and is typically 30 N·mm$^{-2}$ or more, preferably 150 N·mm$^{-2}$ or more, particularly preferably 300 N·mm$^{-2}$ or more. The value of 0.2% bearing force should be as high as possible. However, it is desirable that the 0.2% bearing force is typically 900 N·mm$^{-2}$ or less from the viewpoint of industrial availability. With a collector substrate of a high 0.2% bearing force, the plastic deformation of the collector substrate resulting from the expansion and contraction of the negative electrode active material thin film due to charge and discharge can be suppressed, and desirable cycle characteristics can be obtained.

(2-3-2-14-4) Collector Thickness

The collector may have any thickness, and the collector thickness is typically 1 µm or more, preferably 3 µm or more, further preferably 5 µm or more, and typically 1 mm or less, preferably 100 µm or less, further preferably 50 µm or less. A metal coating thickness less than 1 µm lowers strength, and may make the coating application difficult. A thickness above 100 µm may cause deformation in the shape of battery, such as rolling. The collector may be meshed.

(2-3-2-15) Thickness Ratio of Collector and Negative Electrode Active Material Layer The thickness ratio of the collector and the negative electrode active material layer is not particularly limited, and the value of "(the thickness of the negative electrode active material layer on one side immediately before the nonaqueous electrolytic solution injection)/(collector thickness)" is preferably 150 or less, further preferably 20 or less, particularly preferably 10 or less, and preferably 0.1 or more, further preferably 0.4 or more, particularly preferably 1 or more.

A thickness ratio of the collector and the negative electrode active material layer above the foregoing ranges may cause the collector to generate heat by Joule heating during high current density charge and discharge. Below the foregoing ranges, the volume ratio of the collector with respect to the negative electrode active material may increase, and the battery capacity may be reduced.

(2-3-2-16) Electrode Density

The electrode structure of the electrode formed from the negative electrode active material is not particularly limited, and the density of the negative electrode active material present on the collector is preferably 1 g·cm$^{-3}$ or more, further preferably 1.2 g·cm$^{-3}$ or more, particularly preferably 1.3 g·cm$^{-3}$ or more, and preferably 2 g·cm$^{-3}$ or less, more preferably 1.9 g·cm$^{-3}$ or less, further preferably 1.8 g·cm$^{-3}$ or less, particularly preferably 1.7 g·cm$^{-3}$ or less. When the density of the negative electrode active material present on the collector is above the foregoing ranges, the negative electrode active material particles may be destroyed. This may lead to deterioration of high current density charge and discharge characteristics by the increased initial irreversible capacity, and the poor permeation of the nonaqueous electrolytic solution in the vicinity of the collector/negative electrode active material interface. Below the foregoing ranges, the conductivity between the negative electrode active materials decreases and the battery resistance increases, with the result that the capacity per unit volume may decrease.

(2-3-2-17) Binder

The binder used to bind the negative electrode active material is not particularly limited, as long as the binder is a stable material against the solvent used for the production of the nonaqueous electrolytic solution and the electrode.

Specific examples include resin polymers such as polyethylene, polypropylene, polyethylene terephthalate, polymethylmethacrylate, aromatic polyamide, cellulose, and nitrocellulose; rubber polymers such as SBR (styrene•butadiene rubber), isoprene rubber, butadiene rubber, fluororubber, NBR (acrylonitrile•butadiene rubber), and ethylene•propylene rubber; styrene•butadiene•styrene block copolymer and hydrogenation products thereof; thermoplastic elastomer polymers such as EPDM (ethylene•propylene•diene ternary copolymer), styrene•ethylene•butadiene•styrene copolymer, styrene•isoprene•styrene block copolymer and hydrogenation products thereof; soft resin polymers such as syndiotactic-1,2-polybutadiene, polyvinyl acetate, ethylene•vinyl acetate copolymer, and propylene•α-olefin copolymer; fluoropolymers such as polyvinylidene fluoride, polytetrafluoroethylene, fluorinatepolyvinylidene fluoride, and polytetrafluoroethylene•ethylene copolymer; and polymer compositions having alkali metal ion (particularly lithium ions) ion conductivity. These may be used alone, or two or more may be used in any combination and proportion.

The solvent used to form the slurry is not particularly limited, as long as it is a solvent capable of dissolving or dispersing the negative electrode active material, the binder, and the optionally used thickener and conductive material. The solvent may be a water-based solvent or an organic solvent.

Examples of the water-based solvent include water, and alcohol. Examples of the organic solvent include N-methylpyrrolidone (NMP), dimethylformamide, dimethylacetoamide, methyl ethyl ketone, cyclohexanone, methyl acetate, methyl acrylate, diethyltriamine, N,N-dimethylaminopropylamine, tetrahydrofuran (THF), toluene, acetone, diethyl ether, dimethylacetoamide, hexamethylphosphoramide, dimethyl sulfoxide, benzene, xylene, quinoline, pyridine, methylnaphthalene, and hexane.

When the water-based solvent is used, it is preferable to contain a dispersant or the like with the thickener, and form the slurry with a latex such as SBR. These solvents may be used alone, or two or more may be used in any combination and proportion.

The proportion of the binder with respect to the negative electrode active material is preferably 0.1 mass % or more, further preferably 0.5 mass % or more, particularly preferably 0.6 mass % or more, and preferably 20 mass % or less, more preferably 15 mass % or less, further preferably 10 mass % or less, particularly preferably 8 mass % or less. When the proportion of the binder with respect to the negative electrode active material exceeds the foregoing ranges, the binder proportion that does not contribute to battery capacity increases, and the battery capacity may decrease. Below the foregoing ranges, the strength of the negative electrode may decrease.

When the rubber polymer as represented by SBR is contained as a main component, the proportion of the binder with respect to the negative electrode active material is typically 0.1 mass % or more, preferably 0.5 mass % or more, further preferably 0.6 mass % or more, and typically 5 mass % or less, preferably 3 mass % or less, further preferably 2 mass % or less.

When the fluoropolymer as represented by polyvinylidene fluoride is contained as a main component, the proportion with respect to the negative electrode active material is typically 1 mass % or more, preferably 2 mass % or more, further preferably 3 mass % or more, and typically 15 mass % or less, preferably 10 mass % or less, further preferably 8 mass % or less.

Typically, the thickener is used to adjust the viscosity of the slurry. The thickener is not particularly limited. Specific examples include carboxymethylcellulose, methylcellulose, hydroxymethylcellulose, ethylcellulose, polyvinyl alcohol, oxidized starch, phosphorylated starch, casein, and salts thereof. These may be used alone, or two or more may be used in any combination and proportion.

When using a thickener, the proportion of the thickener with respect to the negative electrode active material is typically 0.1 mass % or more, preferably 0.5 mass % or more, further preferably 0.6 mass % or more, and typically 5 mass % or less, preferably 3 mass % or less, further preferably 2 mass % or less. Ease of coating may suffer greatly when the proportion of the thickener with respect to the negative electrode active material is below these ranges. Above the foregoing ranges, the proportion of the negative electrode active material in the negative electrode active material layer decreases, which may cause the problem of low battery capacity, or may increase the resistance between the negative electrode active materials.

(2-3-2-18) Electrode Plate Orientation Ratio

The electrode plate orientation ratio is typically 0.001 or more, preferably 0.005 or more, further preferably 0.01 or more, and typically 0.67 or less. An electrode plate orientation ratio below these ranges may lower the high-density charge and discharge characteristics. Note that the upper limits of the foregoing ranges are the theoretical upper limits of the electrode plate orientation ratio of the carbonaceous material.

The electrode plate orientation ratio is measured by the X-ray diffraction measurement of the negative electrode active material orientation ratio for the negative electrode pressed to the target density. The specific technique is not particularly limited. In a standard method, the peaks of the carbon (110) diffraction and (004) diffraction by X-ray diffraction are fitted for peak separation using the asymmetrical Pearson VII profile function, and the integral intensity is calculated for each peak of the (110) diffraction and the (004) diffraction. From the resulting integral intensities, the ratio represented by (110) diffraction integral intensity/(004) diffraction integral intensity is calculated. The negative electrode active material orientation ratio of the electrode so calculated is defined as the electrode plate orientation ratio of the carbonaceous material of the present invention.

X-ray diffraction measurement conditions are as follows. 2θ represents diffraction angle.
    target: Cu (Kα rays) graphite monochrometer
    slit
        divergence slit=1 degree
        receiving slit=0.1 mm
        scattering slit=1 degree measurement range and step angle/measurement time:
- (110) plane: 76.5 degrees 2θ≤78.5 degrees 0.01 degree/3 sec
- (004) plane: 53.5 degrees 2θ≤56.0 degrees 0.01 degree/3 sec sample preparation: electrode is fixed to a glass place with a 0.1 mm-thick double-sided tape.

<2-3-3. Metallic Compound Material, and Configuration, Properties, and Preparation Method of Negative Electrode Using Metallic Compound Material>

The metallic compound material used as the negative electrode active material is not particularly limited, and may be any of a simple substance metal or an alloy forming a lithium alloy, and compounds such as the oxide, carbide, nitride, silicide, sulfide, and phosphide thereof, provided that lithium can be stored and released. Examples of such metallic compounds include compounds containing metals such as Ag, Al, Ba, Bi, Cu, Ga, Ge, In, Ni, P, Pb, Sb, Si, Sn, Sr, and Zn. Preferred among the foregoing materials are simple substance metals or alloys forming a lithium alloy, more preferably materials containing group 13 or 14 metal and metalloid elements (e.g., elements other than carbon), further preferably simple substance metal silicon (Si), tin (Sn), or lead (Pb) (in the following, these three elements are also referred to as "specific metallic elements") or alloys containing these atoms, or compounds of these metals (specific metallic elements). These may be used alone, or two or more may be used in any combination and proportion.

Examples of the negative electrode active material having at least one atom selected from the specific metallic elements include simple substance metal of any one of the specific metallic elements, an alloy of two or more of the specific metallic elements, an alloy of one or more of the specific metallic elements and one or more other metallic elements, and compounds such as compounds containing one or more specific metallic elements, or composite compounds such as the oxide, carbide, nitride, silicide, sulfide, and phosphide of such compounds. The battery can have high capacity when these simple substance metals, alloys, and metallic compounds are used as the negative electrode active material.

Other examples include compounds in which composite compounds such as above are bonded to several different elements, such as simple substance metals, alloys, and non-metallic elements, in a complex manner. More specifically, for example, in the case of silicon or tin, an alloy of these elements and metals that do not act as the negative electrode may be used. Further, in the case of tin for example, it is possible to use complex compounds containing 5 to 6 different elements in a combination of tin, a non-silicon metal that acts as the negative electrode, a metal that does not act as the negative electrode, and a non-metallic element.

Among these negative electrode active materials, preferred examples include any one of the specific metallic elements as a simple substance metal, an alloy of two or more of the specific metallic elements, and oxides, carbides, and nitrides of the specific metallic elements, particularly preferably silicon and/or tin as simple substance metals, alloys thereof, and oxides, carbides, and nitrides thereof from the viewpoints of capacity per unit weight, and environmental load, because these materials have large capacity per unit weight in the product battery. It is also preferable to use the following compounds containing silicon and/or tin, because these compounds, despite the inferior capacity per unit weight to that offered by the simple substance metals or alloys, excel in cycle characteristics.

Silicon and/or tin oxide with the silicon- and/or tin-to-oxygen element ratio of typically 0.5 or more, preferably 0.7 or more, further preferably 0.9 or more, and typically 1.5 or less, preferably 1.3 or less, further preferably 1.1 or less Silicon and/or tin nitride with the silicon- and/or tin-to-nitrogen element ratio of typically 0.5 or more, preferably 0.7 or more, further preferably 0.9 or more, and typically 1.5 or less, preferably 1.3 or less, further preferably 1.1 or less Silicon and/or tin carbide with the silicon- and/or tin-to-carbon element ratio of typically 0.5 or more, preferably 0.7 or more, further preferably 0.9 or more, and typically 1.5 or less, preferably 1.3 or less, further preferably 1.1 or less Note that the negative electrode active materials may be used alone, or two or more may be used in any combination and proportion.

The negative electrode in the nonaqueous electrolytic solution secondary battery of the present invention may be produced by using any known method. Specifically, the negative electrode may be produced, for example, by using a method in which the negative electrode active material is roller molded into a sheet electrode after adding a binder, a conductive material, and the like, or a method that uses compression molding to form a pellet electrode. Typically, a method is used in which a thin film layer (negative electrode active material layer) that contains the negative electrode active material is formed on a collector for negative electrodes (hereinafter, also referred to as "negative electrode collector"), using a technique such as coating, vapor deposition, sputtering, and plating. In this case, materials such as a binder, a thickener, a conductive material, and a solvent are added to the negative electrode active material to form a slurry material, and this is applied onto the negative electrode collector. After drying, the whole is pressed to increase density and form the negative electrode active material layer on the negative electrode collector.

Examples of the negative electrode collector material include steel, a copper alloy, nickel, a nickel alloy, and stainless steel. Preferred is a copper foil from the standpoint of ease of processing into a thin film, and cost.

The thickness of the negative electrode collector is typically 1 μm or more, preferably 5 μm or more, and typically 100 μm or less, preferably 50 μm or less. When the negative electrode collector is too thick, the capacity of the battery as a whole may become excessively low. When too thin, it may pose difficulties in handling.

In order to improve the bonding with the negative electrode active material layer formed on the surface, it is preferable that the surface of the negative electrode collector be subjected to a roughening treatment in advance. Examples of the surface roughening method include a blast treatment, press rolling using a roughening roller, mechanical polishing that polishes the collector surface with a wire brush or the like equipped with, for example, an abrasive particle-bearing coated abrasive, a grinding stone, an emery wheel, or a steel wire, electrolytic polishing, and chemical polishing.

In order to reduce the weight of the negative electrode collector and improve the energy density of the battery per weight, a perforated negative electrode collector, such as an expended metal or a punched metal may also be used. This type of negative electrode collector can freely adjust its weight by varying the percentage of the aperture. Further, by forming the negative electrode active material layer on the both sides of the perforated negative electrode collector, the riveting effect can be provided through the holes, and the negative electrode active material layer does not easily detach. However, when the percentage of the aperture is too high, the contact area between the negative electrode active material layer and the negative electrode collector decreases, and the bonding strength may become weak.

The slurry forming the negative electrode active material layer is produced typically by adding a binder, a thickener, and the like to the negative electrode material. As used herein, "negative electrode material" refers to a material as a mixture of the negative electrode active material and a conductive material.

The preferred content of the negative electrode active material in the negative electrode material is typically 70 mass % or more, particularly 75 mass % or more, and typically 97 mass % or less, particularly 95 mass % or less. When the negative electrode active material content is too small, the capacity of the secondary battery using the negative electrode tends to be insufficient. When too large, the content of the binder and the like becomes relatively smaller, and the strength of the resulting negative electrode tends to be insufficient. When using two or more negative electrode active materials, the total amount of the negative electrode active materials satisfies the foregoing ranges.

Examples of the conductive materials used for the negative electrode include metallic materials such as copper and nickel; and carbon materials such as graphite and carbon black. These may be used alone, or two or more may be used in any combination and proportion. It is preferable to use carbon material as the conductive material, because the carbon material also serves as the active material. The preferred content of the conductive material in the negative electrode material is typically 3 mass % or more, particularly 5 mass % or more, and typically 30 mass % or less, particularly 25 mass % or less. When the conductive material content is too small, conductivity tends to be insufficient. When too large, the content of the negative electrode active material and the like becomes relatively smaller, and the battery capacity and strength tend to be insufficient. When using two or more conductive materials, the total amount of the conductive materials satisfies the foregoing ranges.

The binder used for the negative electrode may be any binder, provided that it is safe to the solvent and the electrolytic solution used for electrode production. Examples include polyvinylidene fluoride, polytetrafluoroethylene, polyethylene, polypropylene, styrene•butadiene rubber•isoprene rubber, butadiene rubber, ethylene-acrylic acid copolymer, and ethylene•methacrylic acid copolymer. These may be used alone, or two or more may be used in any combination and proportion. The preferred binder content is typically 0.5 parts by weight or more, particularly 1 weight part or more, and typically 10 parts by weight or less, particularly 8 parts by weight or less with respect to 100 parts by weight of the negative electrode material. When the binder content is too small, the strength of the resulting negative electrode tends to be insufficient. When too large, the content of the negative electrode active material and the like becomes relatively smaller, and the battery capacity and conductivity tend to be insufficient. When using two or more binders, the total amount of the binders satisfies the foregoing ranges.

Examples of the thickeners used for the negative electrode include carboxymethylcellulose, methylcellulose, hydroxymethylcellulose, ethylcellulose, polyvinyl alcohol, oxidized starch, phosphorylated starch, and casein. These may be used alone, or two or more may be used in any combination and proportion. The thickener is used as required. When used, the preferred thickener content in the negative electrode active material layer is typically 0.5 mass % or more, and 5 mass % or less.

The slurry forming the negative electrode active material layer is prepared by optionally mixing a conductive material, a binder, and a thickener with the negative electrode active material, using a water-based solvent or an organic solvent as a dispersion medium. The water-based solvent is typically water. However, it is also possible to use non-water solvents such as alcohols (e.g., ethanol), and cyclic amides (e.g., N-methylpyrrolidone) in a proportion of about 30 mass % or less with respect to water. Typical examples of the organic solvent include cyclic amides such as N-methylpyrrolidone, linear amides such as N,N-dimethylformamide, and N,N-dimethylacetamide, aromatic hydrocarbons such as anisole, toluene, and xylene, and alcohols such as butanol, and cyclohexanol. Preferred are cyclic amides such as N-methylpyrrolidone, and linear amides such as N,N-dimethylformamide, and N,N-dimethylacetamide. These may be used alone, or two or more may be used in any combination and proportion.

The viscosity of the slurry is not particularly limited, as long as it can be applied to the collector. The viscosity may be appropriately adjusted to enable coating by varying, for example, the solvent amount during the preparation of the slurry.

The negative electrode active material layer is formed upon drying and pressing the slurry applied to the negative electrode collector. The coating technique is not particularly limited, and known methods per se may be used. The drying technique is not particularly limited either, and known techniques such as natural drying, heat drying, and vacuum drying may be used.

The electrode structure of the electrode formed from the negative electrode active material is not particularly limited, and the density of the active material present on the collector is preferably 1 g·cm$^{-3}$ or more, further preferably 1.2 g·cm$^{-3}$ or more, particularly preferably 1.3 g·cm$^{-3}$ or more, and preferably 2 g·cm$^{-3}$ or less, more preferably 1.9 g·cm$^{-3}$ or less, further preferably 1.8 g·cm$^{-3}$ or less, particularly preferably 1.7 g·cm$^{-3}$ or less.

When the density of the active material present on the collector is above the foregoing ranges, the active material particles may be destroyed. This may lead to deterioration of high current density charge and discharge characteristics by the increased initial irreversible capacity, and the poor permeation of the nonaqueous electrolytic solution in the vicinity of the collector/active material interface. Below the foregoing ranges, there are cases where the conductivity between the active materials decreases and the battery resistance increases, causing the capacity per unit volume to decrease.

<2-3-4. Lithium-Containing Metal Composite Oxide Material, and Configuration, Properties, and Preparation Method of Negative Electrode Using Lithium-Containing Metal Composite Oxide Material>

The lithium-containing metal composite oxide material used as the negative electrode active material is not particularly limited, as long as it can store and release lithium. However, lithium-containing composite metal oxide materials containing titanium are preferred, and composite oxides of lithium and titanium (hereinafter, also referred to as "lithium-titanium composite oxides") are particularly preferred. Specifically, it is particularly preferable to use a lithium-titanium composite oxide having a spinel structure by containing it in the nonaqueous electrolytic solution secondary battery negative electrode active material, because this greatly reduces output resistance.

It is also preferable to use composite oxides in which the lithium and titanium in the lithium-titanium composite oxide are substituted with other metallic elements, for example, at least one element selected from the group consisting of Na, K, Co, Al, Fe, Ti, Mg, Cr, Ga, Cu, Zn, and Nb.

Preferably, the metal oxide is a lithium-titanium composite oxide represented by general formula (3), and $0.7 \leq x \leq 1.5$, $1.5 \leq y \leq 2.3$, $0 \leq z \leq 1.6$ in the general formula (3). In this way, the structure at the time of doping and undoping of lithium ions can be stabilized.

$$Li_xTi_yM_zO_4 \quad (3)$$

[In the general formula (3), M represents at least one element selected from the group consisting of Na, K, Co, Al, Fe, Ti, Mg, Cr, Ga, Cu, Zn, and Nb.]

Particularly preferred as the compositions of the general formula (3) are structures in which
(a) $1.2 \leq x \leq 1.4$, $1.5 \leq y \leq 1.7$, $z=0$
(b) $0.9 \leq x \leq 1.1$, $1.9 \leq y \leq 2.1$, $z=0$
(c) $0.7 \leq x \leq 0.9$, $2.1 \leq y \leq 2.3$, $z=0$.

This provides a desirable battery performance balance.

The particularly preferred representative compositions of the foregoing compounds are (a) $Li_{4/3}Ti_{5/3}O_4$, (b) $Li_1Ti_2O_4$, and (c) $Li_{4/5}Ti_{11/5}O_4$. In structures with $Z \neq 0$, for example, $Li_{4/3}Ti_{4/3}Al_{1/3}O_4$ is preferable.

In addition to the foregoing requirements, the lithium-titanium composite oxide as the negative electrode active material of the present invention satisfies preferably at least one of the properties, shapes, and other conditions described in sections (2-3-4-1) to (2-3-4-13) below, particularly preferably two or more of these conditions at the same time.

(2-3-4-1) BET Specific Surface Area

The BET specific surface area of the lithium-titanium composite oxide used as the negative electrode active material is preferably 0.5 $m^2 \cdot g^{-1}$ or more, more preferably 0.7 $m^2 \cdot g^{-1}$ or more, further preferably 1.0 $m^2 \cdot g^{-1}$ or more, particularly preferably 1.5 $m^2 \cdot g^{-1}$ or more, and preferably 200 $m^2 \cdot g^{-1}$ or less, more preferably 100 $m^2 \cdot g^{-1}$ or less, further preferably 50 $m^2 \cdot g^{-1}$ or less, particularly preferably 25 $m^2 \cdot g^{-1}$ or less as measured by using the BET method.

A BET specific surface area below these ranges may decrease the reaction area in contact with the nonaqueous electrolytic solution when the lithium-titanium composite oxide is used as the negative electrode material, and the output resistance may increase. Above these ranges, the crystal surfaces or the end surface portions of the titanium-containing metal oxide may increase, causing strains in the crystals. In this case, irreversible capacity becomes not negligible, and the desired battery may not be obtained.

Specific surface area measurement using BET method is performed as follows. A sample is preliminarily dried at 350° C. for 15 minutes under the stream of nitrogen using a surface area measurement device (Ohkura Riken; fully automatic surface area measurement device), and measurement is taken by single-point nitrogen adsorption BET according to the gas flow method, using a nitrogen-helium mixed gas accurately adjusted to make the relative pressure value of nitrogen 0.3 against atmospheric pressure. The specific surface area so determined is defined as the BET specific surface area of the lithium-titanium composite oxide of the present invention.

(2-3-4-2) Volume-Based Average Particle Size

The volume-based average particle size (secondary particle size when the primary particles are aggregated and form secondary particles) of the lithium-titanium composite oxide is defined by the volume-based average particle size (median size) determined by using a laser diffraction and scattering method.

The volume-based average particle size of the lithium-titanium composite oxide is typically 0.1 μm or more, preferably 0.5 μm or more, further preferably 0.7 μm or more, and typically 50 μm or less, preferably 40 μm or less, further preferably 30 μm or less, particularly preferably 25 μm or less.

The volume-based average particle size measurement is performed by dispersing a carbon powder in a 0.2 mass % aqueous solution (10 mL) of the surfactant polyoxyethylene (20) sorbitan monolaurate, using a laser diffraction and scattering particle size analyzer (Horiba Ltd.; LA-700). The median size so determined is defined as the volume-based average particle size of the carbonaceous material of the present invention.

When the volume average particle size of the lithium-titanium composite oxide is below the foregoing ranges, large amounts of binder will be necessary for the electrode production, and the battery capacity may decrease as a result. Above the foregoing ranges, the coating applied in electrode plate production tends to have an uneven surface, which may have undesirable effects in battery production.

(2-3-4-3) Average Primary Particle Diameter

When the primary particles aggregate and form secondary particles, the average primary particle diameter of the lithium-titanium composite oxide is typically 0.01 μm or more, preferably 0.05 μm or more, further preferably 0.1 μm or more, particularly preferably 0.2 μm or more, and typically 2 μm or less, preferably 1.6 μm or less, further preferably 1.3 μm or less, particularly preferably 1 μm or less. When the volume-based average primary particle diameter is above these ranges, formation of spherical secondary particles becomes difficult. This may have adverse effects on powder chargeability, or greatly decrease the specific surface area, increasing the possibility of battery performance drop, such as in output characteristics. Below the foregoing ranges, the crystals often become underdeveloped, and the performance of the secondary battery may decrease, such as in reversibility of charge and discharge.

The primary particle size is measured by scanning electron microscopy (SEM). Specifically, the value of the longest slice of the primary particles on the left and right of the boundary on a horizontal straight line is determined for arbitrary 50 primary particles in an image taken at a magnification (for example, 10,000 to 100,000 times) that allows for particle observation. The mean value of these measurements is then calculated.

(2-3-4-4) Shape

The lithium-titanium composite oxide particles may have conventional shapes, such as agglomerate, polyhedron, sphere, oval sphere, plate, needle, and column. Preferably, the primary particles aggregate and form secondary particles, and the secondary particles have a spherical to oval sphere shapes.

In the electrochemical element, the active material in the electrode generally undergoes expansion and contraction due to charge and discharge. The incurred stress often causes deterioration, such as destruction of the active material, and disconnection in the conduction path. It is therefore more preferable, in terms of relaxing the stress of expansion and contraction and preventing deterioration, that the active material is of secondary particles formed by the aggregation of the primary particles, rather than simply being primary particles alone.

Further, spherical or oval sphere particles are more preferable than particles of equiaxial orientation such as plate-shaped particles, because the former involves less orientation in the molding of the electrode, and less expansion and contraction of the electrode during charge and discharge. Spherical or oval sphere particles are also preferable, because these can easily be mixed in a uniform fashion with the conductive material in electrode production.

(2-3-4-5) Tap Density

The tap density of the lithium-titanium composite oxide is preferably 0.05 g·cm$^{-3}$ or more, more preferably 0.1 g·cm$^{-3}$ or more, further preferably 0.2 g·cm$^{-3}$ or more, particularly preferably 0.4 g·cm$^{-3}$ or more, and preferably 2.8 g·cm$^{-3}$ or less, further preferably 2.4 g·cm$^{-3}$ or less, particularly preferably 2 g·cm$^{-3}$ or less. A tap density below these ranges makes it difficult to increase charge density when the material is used as the negative electrode. Further, because of the reduced contact area between the particles, there are cases where the resistance between particles increases and causes an increase of output resistance. Above these ranges, there are cases where the space between the particles in the electrode becomes too few, and the number of nonaqueous electrolytic solution channels decreases, with the result that the output resistance increase.

For tap density measurement, a sample is dropped into a 20-cm$^3$ tapping cell through a 300-μm sieve until the sample fills to the top of the cell. The sample is then tapped 1,000 times at a stroke length of 10 mm, using a powder density measurement device (for example, Tap Denser; Seishin Enterprise Co., Ltd.). The tap density is then calculated from the resulting volume and the sample weight. The tap density so calculated is defined as the tap density of the lithium-titanium composite oxide of the present invention.

(2-3-4-6) Circularity

The circularity of the lithium-titanium composite oxide as measured as a degree of sphericity should preferably fall in the ranges below. The circularity is defined as circularity=(the circumference of an equivalent circle having the same area as a particle projection shape)/(the actual circumference of the particle projection shape), and the circularity of 1 provides a theoretically true sphere.

The circularity of the lithium-titanium composite oxide becomes more desirable as it approaches 1, and is typically 0.10 or more, preferably 0.80 or more, further preferably 0.85 or more, particularly preferably 0.90 or more. The high current density charge and discharge characteristics improve as the circularity increases. Thus, below these circularity ranges, there are cases where the chargeability of the negative electrode active material lowers, and the resistance between particles increases, lowering the short-time high current density charge and discharge characteristics.

The circularity is measured by using a flow-type particle image analyzer (for example, FPIA manufactured by Sysmex Industrial Corporation). About 0.2 g of a sample is dispersed in a 0.2 mass % aqueous solution (about 50 mL) of the surfactant polyoxyethylene(20) sorbitan monolaurate, and the dispersion is irradiated with an ultrasonic wave of 28 kHz at an output of 60 W for 1 minute. Subsequently, a detection range is designated to be 0.6 to 400 μm, and measurement is made for particles having a particle size of 3 to 40 μm. The resulting circularity is defined as the circularity of the lithium-titanium composite oxide of the present invention.

(2-3-4-7) Aspect Ratio

The aspect ratio of the lithium-titanium composite oxide is typically 1 or more, and typically 5 or less, preferably 4 or less, further preferably 3 or less, particularly preferably 2 or less. An aspect ratio above these ranges may cause lineation, and a uniform coated surface may not be obtained at electrode plate formation, lowering the short-time high current density charge and discharge characteristics. Note that the lower limits of the foregoing ranges are the theoretical lower limits of the aspect ratio of the lithium-titanium composite oxide.

Aspect ratio measurement is performed by scanning electron microscopy of the lithium-titanium composite oxide particles. Any 50 particles fixed to an end surface of a metal having a thickness of 50 μm or less are selected, and a stage to which the sample is fixed is rotated and tilted to measure each particle for diameter A (the largest diameter of the particles) and diameter B (the smallest diameter orthogonal to diameter A) by three-dimensional observation. The mean value of A/B is then determined. The aspect ratio (A/B) so determined is defined as the aspect ratio of the lithium-titanium composite oxide of the present invention.

(2-3-4-8) Negative Electrode Active Material Producing Method

The method used to produce the lithium-titanium composite oxide is not particularly limited, as long as it does not depart from the gist of the present invention. Among a number of methods available, a method commonly used in inorganic compound production can be used.

In an exemplary method, a titanium raw material substance such as titanium oxide is uniformly mixed with a lithium source such as LiOH, Li$_2$CO$_3$, and LiNO$_3$, optionally with raw material substances of other elements. The mixture is then calcined at high temperature to obtain the active material.

Various methods are considered available for the production of spherical or oval-sphere active materials. In an exemplary method, a titanium raw material substance such as titanium oxide, and optionally a raw material substance of other element are dissolved in a solvent such as water, or pulverized and dispersed in such a solvent. The pH is adjusted while stirring the mixture, and a spherical precursor is produced and collected. After drying the product as required, a lithium source such as LiOH, Li$_2$CO$_3$, and LiNO$_3$ is added, and the product is calcined at high temperature to obtain the active material.

In another example, a titanium raw material substance such as titanium oxide, and optionally a raw material substance of other element are dissolved in a solvent such as water, or pulverized and dispersed in such a solvent. The mixture is then dry molded with a spray dryer and the like to obtain a spherical to oval-sphere precursor. After adding a lithium source such as LiOH, Li$_2$CO$_3$, and LiNO$_3$, the product is calcined at high temperature to obtain the active material.

In yet another example, a titanium raw material substance such as titanium oxide, a lithium source such as LiOH, Li$_2$CO$_3$, and LiNO$_3$, and optionally a raw material substance of other element are dissolved in a solvent such as water, or pulverized and dispersed in such a solvent. The mixture is then dry molded with a spray dryer and the like to obtain a spherical to oval-sphere precursor, and the product is calcined at high temperature to obtain the active material.

In these steps, non-titanium elements, for example, such as Al, Mn, Ti, V, Cr, Mn, Fe, Co, Li, Ni, Cu, Zn, Mg, Ga, Zr, C, Si, Sn, and Ag may exist in the titanium-containing metal oxide structure, and/or in contact with the titanium-containing oxide. By containing these elements, the activation voltage of the battery, and battery capacity can be controlled.

(2-3-4-9) Electrode Production

Any known method can be used for electrode production. For example, the electrode can be formed by adding a binder, a solvent, and optional materials such as a thickener, a conductive material, and a filler to the negative electrode active material, and the resulting slurry is coated over the collector, which is then pressed after being dried.

The thickness of the negative electrode active material layer on one side immediately before the battery nonaqueous electrolytic solution injection step is typically 15 µm or more, preferably 20 µm or more, more preferably 30 µm or more. The upper limit is desirably 150 µm or less, preferably 120 µm or less, more preferably 100 µm or less.

A negative electrode active material thickness above these ranges may lower the high current density charge and discharge characteristics because of the difficulty permeating the nonaqueous electrolytic solution to regions in the vicinity of the collector interface. Below these ranges, the volume ratio of the collector to the negative electrode active material may increases, and the battery capacity may decrease. The negative electrode active material may be prepared as a sheet electrode by roll molding, or a pellet electrode by compression molding.

(2-3-4-10) Collector

The collector holding the negative electrode active material may be any known collector. Examples of the negative electrode collector include metallic materials such as copper, nickel, stainless steel, and nickel-plated steel, of which copper is particularly preferred for processability and cost.

When made of metallic material, the collector may have a shape of, for example, a metal foil, a metal column, a metal coil, a metal plate, a metallic thin film, an expended metal, a punched metal, or a metal foam. Particularly preferred are metal foil films containing copper (Cu) and/or aluminum (Al), more preferably copper foils and aluminum foils, further preferably press-rolled copper foils made by press rolling, and electrolytic copper foils made by using the electrolysis technique. Any one of these can be used as the collector.

When the copper foil has a thickness below 25 µm, copper alloys (such as phosphor bronze, titanium copper, Corson alloy, and Cu—Cr—Zr alloy) stronger than pure copper may be used. The aluminum foil can preferably be used, because the aluminum foil, with its small specific gravity, can reduce the battery weight.

The collector made of copper foils produced by press rolling can preferably be used for small cylindrical batteries, because the copper foil collector, with its copper crystals arranged in the press roll direction, does not easily crack even when the negative electrode is tightly or sharply rolled.

The electrolytic copper foil is obtained, for example, by dipping a metallic drum in a nonaqueous electrolytic solution dissolving copper ions, and current is flown while rotating the solution to cause the copper to deposit on the drum surface. The metal can then be detached to obtain the foil. The copper formed by electrolysis may be deposited on the surface of the press roll copper foil. One or both surfaces of the copper foil may be subjected to a roughening treatment or a surface treatment (for example, such as a chromate treatment down to a thickness of several nanometers to about 1 micrometer, and surface preparation using Ti and the like).

Other properties desired of the collector substrate include the following.

(2-3-4-10-1) Average Surface Roughness (Ra)

The average surface roughness (Ra) of the surface forming the active material thin film of the collector substrate, specified by the method described in JIS B0601-1994, is not particularly limited, and is typically 0.01 µm or more, preferably 0.03 µm or more, and typically 1.5 µm or less, preferably 1.3 µm or less, further preferably 1.0 µm or less.

With a collector substrate average surface roughness (Ra) in these ranges, desirable charge and discharge cycle characteristics can be expected. Further, the area of the interface with the active material thin film increases, and the adhesion to the negative electrode active material thin film improves. The upper limit of average surface roughness (Ra) is not particularly limited, and is typically 1.5 µm or less, because foils with an average surface roughness (Ra) exceeding 1.5 µm is not commonly available as a foil of practical thickness.

(2-3-4-10-2) Tensile Strength

Tensile strength is the quotient obtained by dividing the maximum tensile force required to fracture a test piece by the test piece cross sectional area. The tensile strength used in the present invention is measured by using a device and a method similar to those described in JIS Z2241 (metallic material tensile testing method).

The tensile strength of the collector substrate is not particularly limited, and is typically 50 N·mm$^{-2}$ or more, preferably 100 N·mm$^{-2}$ or more, further preferably 150 N·mm$^{-2}$ or more. Preferably, the tensile strength should be as high as possible; however, from the viewpoint of industrial availability, the typical value of tensile strength is desirably 1,000 N·mm$^{-2}$ or less.

With a collector substrate having high tensile strength, cracking of the collector substrate resulting from the expansion and contraction of the active material thin film due to charge and discharge can be suppressed, and desirable cycle characteristics can be obtained.

(2-3-4-10-3) 0.2% Bearing Force 0.2% Bearing force is the magnitude of the load required to cause 0.2% plastic (permanent) distortion, and it means that 0.2% deformation remains even after the removal of the applied load of this magnitude. 0.2% Bearing force is measured by using a device and a method similar to those used for the tensile strength measurement.

The 0.2% bearing force of the collector substrate is not particularly limited, and is typically 30 N·mm$^{-2}$ or more, preferably 100 N·mm$^{-2}$ or more, particularly preferably 150 N·mm$^{-2}$ or more. The 0.2% bearing force should be as high as possible. However, it is desirable that the 0.2% bearing force is typically 900 N·mm$^{-2}$ or less from the viewpoint of industrial availability.

With a collector substrate of a high 0.2% bearing force, the plastic deformation of the collector substrate resulting from the expansion and contraction of the active material thin film due to charge and discharge can be suppressed, and desirable cycle characteristics can be obtained.

(2-3-4-10-4) Collector Thickness

The collector may have any thickness, and the collector thickness is typically 1 µm or more, preferably 3 µm or more, further preferably 5 µm or more, and typically 1 mm or less, preferably 100 µm or less, further preferably 50 µm or less. A metal coating thickness less than 1 µm lowers strength, and may make the coating application difficult. A thickness above 100 µm may cause deformation in the shape of battery, such as rolling. The metallic thin film may be meshed.

(2-3-4-11) Thickness Ratio of Collector and Active Material Layer

The thickness ratio of the collector and the active material layer is not particularly limited, and the value of "(the thickness of the active material layer on one side immediately before the nonaqueous electrolytic solution injection)/(collector thickness)" is typically 150 or less, preferably 20 or less, further preferably 10 or less, and typically 0.1 or more, preferably 0.4 or more, further preferably 1 or more.

A thickness ratio of the collector and the negative electrode active material layer above the foregoing ranges may cause the collector to generate heat by Joule heating during the high current density charge and discharge. Below the foregoing ranges, the volume ratio of the collector with respect to the negative electrode active material may increase, and the battery capacity may be reduced.

(2-3-4-12) Electrode Density

The electrode structure of the electrode formed from the negative electrode active material is not particularly limited, and the density of the active material present on the collector is preferably 1 g·cm$^{-3}$ or more, more preferably 1.2 g·cm$^{-3}$ or more, further preferably 1.3 g·cm$^{-3}$ or more, particularly preferably 1.5 g·cm$^{-3}$ or more, and preferably 3 g·cm$^{-3}$ or less, more preferably 2.5 g·cm$^{-3}$ or less, further preferably 2.2 g·cm$^{-3}$ or less, particularly preferably 2 g·cm$^{-3}$ or less.

When the density of the active material present on the collector is above the foregoing ranges, the adhesion between the collector and the negative electrode active material may become weak, and the electrode and the active material may be detached from each other. Below the foregoing ranges, the conductivity between the negative electrode active materials may decrease, and the battery resistance may increase.

(2-3-4-13) Binder

The binder used to bind the negative electrode active material is not particularly limited, as long as the binder is a stable material against the solvent used for the production of the nonaqueous electrolytic solution and the electrode.

Specific examples include resin polymers such as polyethylene, polypropylene, polyethylene terephthalate, polymethylmethacrylate, polyimide, aromatic polyamide, cellulose, and nitrocellulose; rubber polymers such as SBR (styrene•butadiene rubber), isoprene rubber, butadiene rubber, fluororubber, NBR (acrylonitrile•butadiene rubber), and ethylene•propylene rubber; styrene•butadiene•styrene block copolymer and hydrogenation products thereof; thermoplastic elastomer polymers such as EPDM (ethylene•propylene•diene ternary copolymer), styrene•ethylene•butadiene•styrene copolymer, styrene•isoprene•styrene block copolymer and hydrogenation products thereof; soft resin polymers such as syndiotactic-1,2-polybutadiene, polyvinyl acetate, ethylene•vinyl acetate copolymer, and propylene•α-olefin copolymer; fluoropolymers such as polyvinylidene fluoride, polytetrafluoroethylene, fluorinatepolyvinylidene fluoride, and polytetrafluoroethylene•ethylene copolymer; and polymer compositions having alkali metal ion (particularly lithium ions) ion conductivity. These may be used alone, or two or more may be used in any combination and proportion.

The solvent used to form the slurry is not particularly limited, as long as it is a solvent capable of dissolving or dispersing the negative electrode active material, the binder, and the optionally used thickener and conductive material. The solvent may be a water-based solvent or an organic solvent.

Examples of the water-based solvent include water, and alcohol. Examples of the organic solvent include N-methylpyrrolidone (NMP), dimethylformamide, dimethylacetoamide, methyl ethyl ketone, cyclohexanone, methyl acetate, methyl acrylate, diethyltriamine, N,N-dimethylaminopropylamine, tetrahydrofuran (THF), toluene, acetone, dimethyl ether, dimethylacetoamide, hexamellylphosphoramide, dimethyl sulfoxide, benzene, xylene, quinoline, pyridine, methylnaphthalene, and hexane. When the water-based solvent is used, it is preferable to add a dispersant or the like with the thickener, and form the slurry with a latex such as SBR. These may be used alone, or two or more may be used in any combination and proportion.

The proportion of the binder with respect to the negative electrode active material is typically 0.1 mass % or more, preferably 0.5 mass % or more, further preferably 0.6 mass % or more, and typically 20 mass % or less, preferably 15 mass % or less, further preferably 10 mass % or less, particularly preferably 8 mass % or less.

When the proportion of the binder with respect to the negative electrode active material exceeds the foregoing ranges, the binder proportion that does not contribute to battery capacity increases, and the battery capacity may decrease. Below the foregoing ranges, the strength of the negative electrode may decrease, which may have undesirable effects in battery production.

When the rubber polymer as represented by SBR is contained as a main component, the proportion of the binder with respect to the active material is typically 0.1 mass % or more, preferably 0.5 mass % or more, further preferably 0.6 mass % or more, and typically 5 mass % or less, preferably 3 mass % or less, further preferably 2 mass % or less.

When the fluoropolymer as represented by polyvinylidene fluoride is contained as a main component, the proportion with respect to the active material is 1 mass % or more, preferably 2 mass % or more, further preferably 3 mass % or more, and typically 15 mass % or less, preferably 10 mass % or less, further preferably 8 mass % or less.

Typically, the thickener is used to adjust the viscosity of the slurry. The thickener is not particularly limited. Specific examples include carboxymethylcellulose, methylcellulose, hydroxymethylcellulose, ethylcellulose, polyvinyl alcohol, oxidized starch, phosphorylated starch, casein, and salts thereof. These may be used alone, or two or more may be used in any combination and proportion.

When using a thickener, the proportion of the thickener with respect to the negative electrode active material is 0.1 mass % or more, preferably 0.5 mass % or more, further preferably 0.6 mass % or more, and typically 5 mass % or less, preferably 3 mass % or less, further preferably 2 mass % or less. Ease of coating may suffer greatly when the proportion of the thickener with respect to the negative electrode active material is below these ranges. Above the foregoing ranges, the proportion of the negative electrode active material in the active material layer decreases, which may cause the problem of low battery capacity, or may increase the resistance between the negative electrode active materials.

<2-4 Positive Electrode>

The positive electrode used for the nonaqueous electrolytic solution secondary battery of the present invention is described below.

<2-4-1 Positive Electrode Active Material>

The following describes the positive electrode active material used for the positive electrode.

(2-4-1-1) Composition

The positive electrode active material is not particularly limited, as long as it can electrochemically store and release lithium ions. A preferred example is a substance containing lithium and at least one transition metal. Specific examples include lithium transition metal composite oxides, and lithium-containing transition metal phosphoric acid compounds.

Preferred examples of the transition metal of the lithium transition metal composite oxides include V, Ti, Cr, Mn, Fe, Co, Ni, and Cu. Specific examples include lithium•cobalt composite oxides such as $LiCoO_2$, lithium•nickel composite oxides such as $LiNiO_2$, lithium•manganese composite oxides such as $LiMnO_2$, $LiMn_2O_4$, and $Li_2MnO_4$, and lithium transition metal composite oxides in which some of the major transition metal atoms are substituted with other metals such as Al, Ti, V, Cr, Mn, Fe, Co, Li, Ni, Cu, Zn, Mg, Ga, Zr, and Si.

Specific examples of such substituted lithium transition metal composite oxides include $LiNi_{0.5}Mn_{0.5}O_2$, $LiNi_{0.85}CO_{0.10}Al_{0.05}O_2$, $LiNi_{0.33}CO_{0.33}Mn_{0.33}O_2$, $LiMn_{1.8}Al_{0.2}O_4$, and $LiMn_{1.5}Ni_{0.5}O_4$.

Preferred examples of the transition metal of the lithium-containing transition metal phosphoric acid compounds include V, Ti, Cr, Mn, Fe, Co, Ni, and Cu. Specific examples include iron phosphates such as $LiFePO_4$, $Li_3Fe_2(PO_4)_3$, and $LiFeP_2O_7$, cobalt phosphates such as $LiCoPO_4$, and lithium transition metal phosphoric acid compounds in which some of the major transition metal atoms are substituted with other metals such as Al, Ti, V, Cr, Mn, Fe, Co, Li, Ni, Cu, Zn, Mg, Ga, Zr, Nb, and Si.

(2-4-1-2) Surface Coating

A substance of a composition different from the primary substance forming the positive electrode active material (hereinafter, also referred to as "surface adhering substance") may be used as a coating adhering to the surface of the positive electrode active material. Examples of the surface adhering substance include oxides such as aluminum oxide, silicon oxide, titanium oxide, zirconium oxide, magnesium oxide, calcium oxide, boron oxide, antimony oxide, and bismuth oxide; sulfates such as lithium sulfate, sodium sulfate, potassium sulfate, magnesium sulfate, calcium sulfate, and aluminum sulfate; and carbonates such as lithium carbonate, calcium carbonate, and magnesium carbonate.

Various methods can be used to cause the surface adhering substance to adhere to the positive electrode active material surface, including, for example, a method in which the surface adhering substance is dissolved or suspended in a solvent, and dried after being added to the positive electrode active material through impregnation, a method in which a surface adhering substance precursor is dissolved or suspended in a solvent, and allowed to undergo reaction by means of, for example, heating after being added to the positive electrode active material through impregnation, and a method in which the surface adhering substance is added to a positive electrode active material precursor, and calcined simultaneously.

The mass of the surface adhering substance adhering to the surface of the positive electrode active material is typically 0.1 ppm or more, preferably 1 ppm or more, further preferably 10 ppm or more, and typically 20% or less, preferably 10% or less, further preferably 5% or less with respect to the mass of the positive electrode active material.

The surface adhering substance can suppress the oxidation reaction of the nonaqueous electrolytic solution at the positive electrode active material surface, and can improve battery life. The foregoing ranges are preferable, because the surface adhering substance cannot sufficiently develop its effect below these ranges, and may inhibit the entry and exit of lithium ions and increase resistance above the foregoing ranges.

(2-4-1-3) Shape

The positive electrode active material particles may have conventional shapes, such as agglomerate, polyhedron, sphere, oval sphere, plate, needle, and column. Preferably, the primary particles aggregate and form secondary particles, and the secondary particles have a spherical or an oval sphere shape.

In the electrochemical element, the active material in the electrode generally undergoes expansion and contraction due to charge and discharge. The incurred stress often causes deterioration, such as destruction of the active material, and disconnection in the conduction path. It is therefore more preferable, in terms of relaxing the stress of expansion and contraction and preventing deterioration, that the active material is of secondary particles formed by the aggregation of the primary particles, rather than simply being primary particles alone.

Further, spherical or oval sphere particles are more preferable than particles of equiaxial orientation such as plate-shaped particles, because the former involves less orientation in the molding of the electrode, and less expansion and contraction of the electrode during charge and discharge. Spherical or oval sphere particles are also preferable, because these can easily be mixed in a uniform fashion with the conductive material in electrode production.

(2-4-1-4) Tap Density

The tap density of the positive electrode active material is typically 1.3 g·cm$^{-3}$ or more, preferably 1.5 g·cm$^{-3}$ or more, further preferably 1.6 g·cm$^{-3}$ or more, particularly preferably 1.7 g·cm$^{-3}$ or more, and typically 2.5 g·cm$^{-3}$ or less, preferably 2.4 g·cm$^{-3}$ or less.

A high-density positive electrode active material layer can be formed by using a metal composite oxide powder of high tap density. When the tap density of the positive electrode active material is below the foregoing ranges, the amount of the dispersion medium needed for the positive electrode active material layer formation, and the required amounts of conductive material and binder increase. This may limit the charging rate of the positive electrode active material in the positive electrode active material layer, and the battery capacity. Generally, the tap density should be as large as possible, and the upper limit is not particularly limited. However, below the foregoing ranges, there are cases where the diffusion of the lithium ions using the nonaqueous electrolytic solution as a medium in the positive electrode active material layer becomes rate-limiting, and lowers the load characteristics.

For tap density measurement, a sample is dropped into a 20-cm$^3$ tapping cell through a 300-μm sieve until the sample fills to the cell volume. The sample is then tapped 1,000 times at a stroke length of 10 mm, using a powder density measurement device (for example, Tap Denser; Seishin Enterprise Co., Ltd.). The tap density is then calculated from the resulting volume and the sample weight. The tap density so calculated is defined as the tap density of the positive electrode active material of the present invention.

(2-4-1-5) Median Size d50

The median size d50 of the positive electrode active material particles (secondary particle size when the primary particles aggregate and form secondary particles) may also be measured by using a laser diffraction/scattering particle size distribution measurement device.

The median size d50 is typically 0.1 μm or more, preferably 0.5 μm or more, further preferably 1 μm or more, particularly preferably 3 μm or more, and typically 20 μm or less, preferably 18 μm or less, further preferably 16 μm or less, particularly preferably 15 μm or less. With a median size d50 below these ranges, a high bulk density product may not be obtained. Above the foregoing ranges, diffusion of lithium in the particles takes time, which may lower battery characteristics, or may cause lineation during the battery positive electrode production, specifically in forming a slurry of the active material with a conductive material, a binder, and the like, and applying the slurry in the form of a thin film.

Chargeability in the positive electrode production can further improve when two or more positive electrode active materials of different median sizes d50 are mixed in any proportion.

For median size d50 measurement, a 0.1 mass % sodium hexametaphosphate aqueous solution is used as a dispersion medium, and measurement is made at a measurement refractive index of 1.24 after 5 minutes of ultrasonic dispersion, using a particle size analyzer (LA-920; Horiba Ltd.).

(2-4-1-6) Average Primary Particle Diameter

When the primary particles aggregate and form secondary particles, the average primary particle diameter of the positive electrode active material is typically 0.01 μm or more, preferably 0.05 μm or more, more preferably 0.08 μm or more, particularly preferably 0.1 μm or more, and typically 3 μm or less, preferably 2 μm or less, more preferably 1 μm or less, particularly preferably 0.6 μm or less. When the average primary particle diameter is above these ranges, formation of spherical secondary particles becomes difficult. This may have adverse effects on powder chargeability, or may greatly decrease the specific surface area, increasing the possibility of battery performance drop, such as in output characteristics. Below the foregoing ranges, the crystals often become underdeveloped, and the performance of the secondary battery may decrease, such as in reversibility of charge and discharge.

The average primary particle diameter is measured by scanning electron microscopy (SEM). Specifically, the value of the longest slice of the primary particles on the left and right of the boundary on a horizontal straight line is determined for arbitrary 50 primary particles in an image taken at a 10,000 times magnification. The mean value of these measurements is then calculated.

(2-4-1-7) BET Specific Surface Area

The BET specific surface area of the positive electrode active material is typically 0.2 $m^2 \cdot g^{-1}$ or more, preferably 0.3 $m^2 \cdot g^{-1}$ or more, further preferably 0.4 $m^2 \cdot g^{-1}$ or more, and typically 4.0 $m^2 \cdot g^{-1}$ or less, preferably 2.5 $m^2 \cdot g^{-1}$ or less, further preferably 1.5 $m^2 \cdot g^{-1}$ or less as measured by using the BET method. A BET specific surface area below these ranges tends to lower battery performance. Above the foregoing ranges, it may become difficult to increase tap density, and ease of coating may suffer in the positive electrode active material formation.

BET specific surface area is measured by using a surface area measurement device (Ohkura Riken; fully automatic surface area measurement device). A sample is preliminarily dried at 150° C. for 30 minutes under the stream of nitrogen, and measurement is taken by single-point nitrogen adsorption BET according to the gas flow method, using a nitrogen-helium mixed gas accurately adjusted to make the relative pressure value of nitrogen 0.3 against atmospheric pressure. The specific surface area so determined is defined as the BET specific surface area of the positive electrode active material of the present invention.

(2-4-1-8) Positive Electrode Active Material Producing Method

The method used to produce the positive electrode active material is not particularly limited, as long as it does not depart from the gist of the present invention. Among a number of methods available, a method commonly used in inorganic compound production can be used.

Various methods are considered available for the production of spherical to oval-sphere active materials. In an exemplary method, a transition metal raw material substance such as transition metal nitrate, and sulfate, and optionally a raw material substance of other element are dissolved in a solvent such as water, or pulverized and dispersed in such a solvent. The pH is adjusted while stirring the mixture, and a spherical precursor is produced and collected. After drying the product as required, a lithium source such as LiOH, $Li_2CO_3$, and $LiNO_3$ is added, and the product is calcined at high temperature to obtain the active material.

In another example, a transition metal raw material substance such as transition metal nitrate, sulfate, hydroxide, and oxide, and optionally a raw material substance of other element are dissolved in a solvent such as water, or pulverized and dispersed in such a solvent. The mixture is then dry molded with a spray dryer and the like to obtain a spherical to oval-sphere precursor. After adding a lithium source such as LiOH, $Li_2CO_3$, and $LiNO_3$, the product is calcined at high temperature to obtain the active material.

In yet another example, a transition metal raw material substance such as transition metal nitrate, sulfate, hydroxide, and oxide, a lithium source such as LiOH, $Li_2CO_3$, and $LiNO_3$, and optionally a raw material substance of other element are dissolved in a solvent such as water, or pulverized and dispersed in such a solvent. The mixture is then dry molded with a spray dryer and the like to obtain a spherical to oval-sphere precursor, and the product is calcined at high temperature to obtain the active material.

<2-4-2 Electrode Structure and Electrode Producing Method>

The configuration of the positive electrode and the method of production thereof used in the present invention are described below.

(2-4-2-1) Positive Electrode Producing Method

The positive electrode is produced by forming a positive electrode active material particle- and binder-containing positive electrode active material layer on the collector. Any known method can be used to produce the positive electrode that uses the positive electrode active material. As specific examples of producing the positive electrode, the positive electrode active material, a binder, and optional materials such as a conductive material and a thickener are dry mixed into a form of a sheet, and press bonded to the positive electrode collector, or a slurry prepared by dissolving or dispersing these materials in a liquid medium is applied to the positive electrode collector, and dried to form the positive electrode active material layer on the collector.

The content of the positive electrode active material in the positive electrode active material layer is typically 10 mass % or more, preferably 30 mass % or more, particularly preferably 50 mass % or more, and typically 99.9 mass % or less, preferably 99 mass % or less. When the positive electrode active material content in the positive electrode active material layer is below these ranges, the electrical capacitance may become insufficient. Above these ranges, the strength of the positive electrode may become insufficient. In the present invention, the positive electrode active material powder may be used alone, or two or more positive electrode active material powders of different compositions or different powder properties may be used in any combination and proportion.

(2-4-2-2) Conductive Material

The conductive material may be any known conductive material. Specific examples include metallic materials such as copper and nickel; graphites such as natural graphite, and artificial graphite; carbon black such as acetylene black; and carbonaceous materials such as amorphous carbon of needle coke. These may be used alone, or two or more may be used in any combination and proportion.

The conductive material is used by being contained in the positive electrode active material layer in typically 0.01 mass % or more, preferably 0.1 mass % or more, more preferably 1 mass % or more, and typically 50 mass % or less, preferably 30 mass % or less, more preferably 15 mass % or less. When the content is below these ranges, the conductivity may become insufficient. Above these ranges, the battery capacity may suffer.

(2-4-2-3) Binder

The binder used for the production of the positive electrode active material layer is not particularly limited, as long as the binder is a stable material against the solvent used in the production of the nonaqueous electrolytic solution and the electrode.

In the case of coating, the binder may be a material that can be dissolved or dispersed in the liquid medium used for electrode production. Specific examples include resin polymers such as polyethylene, polypropylene, polyethylene terephthalate, polymethylmethacrylate, aromatic polyamide, cellulose, and nitrocellulose; rubber polymers such as SBR (styrene•butadiene rubber), NBR (acrylonitrile•butadiene rubber), fluororubber, isoprene rubber, butadiene rubber, and ethylene•propylene rubber; thermoplastic elastomer polymers such as styrene•butadiene•styrene block copolymer and hydrogenation products thereof, EPDM (ethylene•propylene•diene ternary copolymers), styrene•ethylene•butadiene•ethylene copolymer, styrene•isoprene•styrene block copolymer and hydrogenation products thereof; soft resin polymers such as syndiotactic-1,2-polybutadiene, polyvinyl acetate, ethylene•vinyl acetate copolymer, and propylene•α-olefin copolymer; fluoropolymers such as polyvinylidene fluoride (PVdF), polytetrafluoroethylene, fluorinatepolyvinylidene fluoride, and polytetrafluoroethylene•ethylene copolymer; and polymer compositions having alkali metal ion (particularly lithium ions) ion conductivity. These may be used alone, or two or more may be used in any combination and proportion.

The proportion of the binder in the positive electrode active material layer is typically 0.1 mass % or more, preferably 1 mass % or more, further preferably 3 mass % or more, and typically 80 mass % or less, preferably 60 mass % or less, further preferably 40 mass % or less, particularly preferably 10 mass % or less. When the binder proportion is below these ranges, there are cases where the positive electrode active material cannot be held sufficiently, and the mechanical strength of the positive electrode decreases, with the result that battery performance such as cycle characteristics lowers. Above these ranges, battery capacity or conductivity may decrease.

(2-4-2-4) Liquid Medium

The liquid medium used to form the slurry is not particularly limited, as long as it is a solvent capable of dissolving or dispersing the positive electrode active material, the conductive material, the binder, and the optionally used thickener. The liquid medium may be a water-based solvent or an organic solvent.

Examples of the water-based medium include water, and a mixed medium of alcohol and water. Examples of the organic medium include hydrocarbons such as hexane; aromatic hydrocarbons such as benzene, toluene, xylene, and methylnaphthalene; heterocyclic compounds such as quinoline, and pyridine; ketones such as acetone, methyl ethyl ketone, and cyclohexanone; esters such as methyl acetate, and methyl acrylate; amines such as diethylenetriamine, and N,N-dimethylaminopropylamine; ethers such as diethyl ether, and tetrahydrofuran (THF); amides such as N-methylpyrrolidone (NMP), dimethylformamide, and dimethylacetoamide; and aprotic polar solvents such as hexamethylphosphoramide, and dimethyl sulfoxide. These may be used alone, or two or more may be used in any combination and proportion.

(2-4-2-5) Thickener

When water-based medium is used as the liquid medium for forming the slurry, it is preferable to form the slurry with a thickener and a latex such as styrene-butadiene rubber (SBR). Typically, the thickener is used to adjust the viscosity of the slurry.

The thickener is not limited, as long as it is not detrimental to the advantages of the present invention. Specific examples include carboxymethylcellulose, methylcellulose, hydroxymethylcellulose, ethylcellulose, polyvinyl alcohol, oxidized starch, phosphorylated starch, casein, and salts thereof. These may be used alone, or two or more may be used in any combination and proportion.

When using a thickener, the proportion of the thickener with respect to the active material is typically 0.1 mass % or more, preferably 0.5 mass % or more, more preferably 0.6 mass % or more, and typically 5 mass % or less, preferably 3 mass % or less, more preferably 2 mass % or less. Below these ranges, ease of coating may suffer greatly. Above these ranges, the proportion of the active material in the positive electrode active material layer decreases, which may cause the problem of low battery capacity, or may increase the resistance between the positive electrode active materials.

(2-4-2-6) Compaction

Preferably, the positive electrode active material layer obtained after coating and drying is compacted by methods such as hand pressing and roller pressing to increase the charge density of the positive electrode active material. The density of the positive electrode active material layer is preferably 1 g·cm$^{-3}$ or more, further preferably 1.5 g·cm$^{-3}$ or more, particularly preferably 2 g·cm$^{-3}$ or more, and preferably 4 g·cm$^{-3}$ or less, further preferably 3.5 g·cm$^{-3}$ or less, particularly preferably 3 g·cm$^{-3}$ or less.

A positive electrode active material layer density above these ranges may lower the charge and discharge characteristics, particularly high current density charge and discharge characteristics, because of the difficulty permeating the nonaqueous electrolytic solution to regions in the vicinity of the collector/active material interface. Below these ranges, the conductivity between the active materials may decrease, and battery resistance may increase.

(2-4-2-7) Collector

The material of the positive electrode collector is not particularly limited, and any known material may be used. Specific examples include metallic materials such as aluminum, stainless steel, nickel plate, titanium, and tantalum; and carbonaceous materials such as carbon cloth, and carbon paper. Metallic materials are preferred, and aluminum is particularly preferred.

In the case of metallic material, the collector may have a form of, for example, a metal foil, a metal column, a metal coil, a metal plate, a metallic thin film, an expended metal, a punched metal, and a metal foam. In the case of carbonaceous material, the collector may have a form of, for example, a carbon plate, a carbon thin film, and a carbon column. Preferred is a form of a metallic thin film. The thin film may be meshed, as appropriate.

The collector may have any thickness, and is typically 1 µm or more, preferably 3 µm or more, further preferably 5 µm or more, and typically 1 mm or less, preferably 100 µm or less, further preferably 50 µm or less. A thin film thinner than these ranges may fail to provide a sufficient strength as a collector. Ease of handling may be lost with a thin film thicker than the foregoing ranges.

<2-5. Separator>

A separator is typically interposed between the positive electrode and the negative electrode to prevent shorting. In this case, the nonaqueous electrolytic solution of the present invention is typically used by being impregnated in the separator.

The material and shape of the separator are not particularly limited, and any known materials and shapes may be used, provided that they are not detrimental to the advantages of the present invention. For example, a resin, a glass fiber, and an inorganic product formed of a stable material against the nonaqueous electrolytic solution of the present invention are used, and products having a form of a porous sheet or a nonwoven fabric with excellent liquid retention are preferably used.

Examples of the materials of the resin separator and the and glass fiber separator include polyolefins (such as polyethylene, and polypropylene), polytetrafluoroethylene, polyethersulfone, and a glass filter. A glass filter and polyolefin are preferred, and polyolefin is further preferred. These materials may be used alone, or two or more may be used in any combination and proportion.

The separator may have any thickness, and is typically 1 µm or more, preferably 5 µm or more, further preferably 10 µm or more, and typically 50 µm or less, preferably 40 µm or less, further preferably 30 µm or less. With a separator thickness below these ranges, insulation and mechanical strength may suffer. Above these ranges, battery performance such as rate characteristics, and the energy density of the nonaqueous electrolytic solution secondary battery as a whole may decrease.

When a porous products such as a porous sheet and a nonwoven fabric is used as the separator, the separator may have any percentage of the pores, and the percentage pore is typically 20% or more, preferably 35% or more, further preferably 45% or more, and typically 90% or less, preferably 85% or less, further preferably 75% or less. When the percentage pore is below these ranges, the film resistance tends to increase, and the rate characteristics tend to suffer. Above these ranges, the mechanical strength of the separator, and insulation tend to decrease.

The separator may have any average pore size, and the average pore size of the separator is typically 0.5 µm or less, preferably 0.2 µm or less, and typically 0.05 µm or more. When the average pore size is above these ranges, shorting is likely to occur. Below these ranges, there are cases where the film resistance increases, and the rate characteristics decrease.

Examples of the inorganic materials include oxides such as alumina and silicon dioxide, nitrides such as aluminum nitride and silicon nitride, and sulfates such as barium sulfate and calcium sulfate. Particulate or fibrous inorganic materials are preferably used.

The separator may have a form of a thin film, for example, such as a form of a nonwoven fabric, a woven fabric, and a microporous film. In the case of the thin-film separator, the separator preferably has a pore size of 0.01 to 1 µm, and a thickness of 5 to 50 µm. Aside from the independent thin film form, the separator may be one in which a composite porous layer containing particles of the inorganic material is formed on the surface of the positive electrode and/or negative electrode by using a resin binder. For example, an alumina particles with a 90% particle size of less than 1 µm may be used to form porous layers on the both surfaces of the positive electrode by using a fluororesin binder.

<2-6. Battery Design>

[Electrode Group]

The electrode group may be a laminate structure of the positive electrode plate and the negative electrode plate with the separator in between, or a wound structure of the positive electrode plate and the negative electrode plate with the separator in between. The volume proportion of the electrode group in the battery (hereinafter, "electrode group occupancy") is typically 40% or more, preferably 50% or more, and typically 90% or less, preferably 80% or less. Battery capacity decreases when the electrode group occupancy is below these ranges. Above these ranges, void space becomes smaller, and may cause battery components to expand or the vapor pressure of the liquid component of the electrolyte to increase. The resulting inner pressure increase may lower battery characteristics such as the repeated charge and discharge performance, and high-temperature storage characteristics, and may activate the gas release valve provided to release the inner pressure to outside.

[Collector Structure]

The collector structure is not particularly limited. However, in order to more effectively improve discharge characteristics with the nonaqueous electrolytic solution of the present invention, it is preferable to have a structure with which the resistance at the wired portions and joint portions can be reduced. By reducing the internal resistance in this manner, the effect of using the nonaqueous electrolytic solution of the present invention becomes more desirable.

When the electrode group has a laminate structure such as above, the structure preferably involves welding of a bundle of the metal core portions of the electrode layers to the terminal. Because the internal resistance increases when the single electrode area has a large area, it is also preferable to reduce resistance by providing a plurality of terminals in the electrode. When the electrode group has a wound structure, a plurality of lead structures may be provided for each of the positive electrode and the negative electrode, and these structures may be bundled to the terminal to reduce internal resistance.

[Outer Packaging Case]

The material of the outer packaging case is not particularly limited, as long as it is a stable material against the nonaqueous electrolytic solution to be used. Specifically, examples thereof include metals such as nickel-plated steel plate, stainless steel, aluminum or aluminum alloys, and magnesium alloys; and laminate films of a resin and an aluminum foil. Of these, in view of weight saving, a metal of aluminum or an aluminum alloy, or a laminate film is preferred.

In the outer packaging case using a metal, there may be mentioned one forming an encapsulated sealed structure by welding metals to each other by laser welding, resistance welding, or ultrasonic welding, or one forming a crimped structure through a resin-made gasket using the above metal. In the outer packaging case using the above laminate film, there may be mentioned one forming an encapsulated sealed structure by heat-sealing resin layers each other. For increasing sealing ability, a resin different from the resin used as the laminate film may intervene between the above resin layers. Particularly, in the case where the resin layers are heat-sealed through a collecting terminal to form a sealed structure, the jointing is jointing of a metal with a resin, so that a resin having a polar group or a modified resin into which a polar group is introduced is preferably used as an intervening resin.

[Protection Device]

The protection device may be, for example, PTC (Positive Temperature Coefficient) in which resistance increases when an abnormal heat is generated or an over current flows, a thermal fuse, a thermistor, a valve (current breaker valve) that shuts off the current flowing in a circuit through sharp increase of inner pressure or inner temperature of the battery at the time of the abnormal heat generation, or the like. As the above protection device, it is preferred to select one that does not act at usual use under a high current. More preferred is a design which does not result in abnormal heat generation or thermal runaway even when the protection device is not present.

[Outer Package]

The nonaqueous electrolytic solution secondary battery of the invention is usually composed by housing the above nonaqueous electrolytic solution, the negative electrode, the positive electrode, the separator, and the like in an outer package. The outer package is not particularly limited, and any known outer package may be used, provided that it is not detrimental to the advantages of the present invention.

Specifically, usually, for example, nickel-plated iron, stainless steel, aluminum or an alloy thereof, nickel, titanium, or the like is used, though any material may be used.

The outer package may have any shape, and may be, for example, cylindrical, rectangular, laminar, coin-shaped, or large-sized.

EXAMPLES

The present invention is described below in greater detail using Examples and Reference Examples. The present invention should not be construed as being limited to these Examples, unless the descriptions below depart from the gist of the invention. The structures of the specific Si compounds, the specific compounds, and the specific salts used are referred to by the formula numbers above.

[Production of Secondary Battery]

<Production of Positive Electrode>

Ninety parts by mass of lithium nickel manganese cobalt oxide ($LiNi_{1/3}Mn_{1/3}Co_{1/3}O_2$) used as positive electrode active material was mixed with 7 parts by mass of carbon black and 3 parts by mass of polyvinylidene fluoride, and the mixture was slurried by addition of N-methyl-2-pyrrolidone. The slurry was evenly applied to the both surface of a 15 μm-thick aluminum foil, dried, and pressed to produce the positive electrode in a manner that makes the density of the positive electrode active material layer 2.6 g·cm$^{-3}$.

<Production of Negative Electrode>

An aqueous dispersion of carboxymethylcellulose sodium (1 mass % carboxymethylcellulose sodium) as a thickener, and an aqueous dispersion of styrene-butadiene rubber (50 mass % styrene-butadiene rubber) as a binder were added to graphite, and mixed with a disperser to form a slurry. The slurry was evenly applied to one surface of a 12 μm-thick copper foil, dried, and pressed to produce the negative electrode in a manner that makes the density of the negative electrode active material layer 1.4 g·cm$^{-3}$. The graphite had a d50 value of 10.9 μm, a specific surface area of 3.41 m$^2$/g, and a tap density of 0.985 g/cm$^3$. The slurry was produced to make the weight ratio of graphite:carboxymethylcellulose sodium:styrene-butadiene rubber 98:1:1 in the dried negative electrode.

<Production of Nonaqueous Electrolytic Solution Secondary Battery>

The positive electrode, the negative electrode, and a polyethylene separator were laminated in order of the negative electrode, the separator, and the positive electrode. These battery elements were wrapped with a cylindrical aluminum laminate film, and vacuum sealed after injecting an electrolytic solution (described later) to produce a sheet-like nonaqueous electrolytic solution secondary battery. For improved adhesion between the electrodes, the sheet-like battery was pressurized between glass plates.

[Battery Evaluation]

<Initial Charge and Discharge Test>

In a 25° C. constant-temperature bath, the sheet-like nonaqueous electrolytic solution secondary battery was charged at 0.05 C for 10 hours, and, after a 6-hour rest period, charged to 4.1 V under 0.2 C constant current. After a 6-hour rest period, the battery was charged to 4.1 V under 0.2 C constant current-constant voltage, and discharged to 3.0 V under ⅓ C constant current. This was followed by two charge and discharge cycles of ⅓ C constant current-constant voltage charging to 4.1 V, and ⅓ C constant current discharge to 3.0 V. After ⅓ C constant current-constant voltage charging to 4.1 V, the battery was stored at 60° C. for 12 hours to stabilize. This was followed by five charge and discharge cycles of ⅓ C constant current-constant voltage charging to 4.1 V, and ⅓ C constant current discharge to 3.0 V at 25° C. The final discharge capacity was taken as initial capacity. Note that 1 C is the current value with which the total battery capacity discharges in 1 hour.

<Low-Temperature Discharge Characteristic Evaluation Test>

A battery charged to an electrical quantity equivalent of 50% initial capacity (hereinafter, this state of battery is also referred to as SOC 50%) was discharged at 0.3 C, 0.5 C, 1.0 C, 1.5 C, 2.0 C, and 2.5 C under a −30° C. environment, and the voltage after 2 seconds was measured. From the current-voltage curve obtained, the current value at 3 V was calculated, and the product of this current value and 3 V was taken as the initial low-temperature discharge characteristic.

<Cycle Characteristic Evaluation Test>

A battery after initial charge and discharge was subjected to 500 charge and discharge cycles of charging to 4.1 V under 2 C constant current, and discharge to 3.0 V under 1 C constant current at 60° C. The proportion of the discharge capacity after 500 cycles with respect the first cycle discharge capacity was taken as the cycle characteristic.

<Low-Temperature Discharge Characteristic Evaluation Test after 500 Cycles>

The battery after 500 cycles was adjusted to a voltage equivalent of SOC 50% of the initial capacity. The battery was then discharged at 0.3 C, 0.5 C, 1.0 C, 1.5 C, 2.0 C, and 2.5 C under a −30° C. environment, and the voltage after 2 seconds was measured. From the current-voltage curve obtained, the current value at 3 V was calculated, and the product of this current value and 3 V was taken as the post-cycle low-temperature discharge characteristic.

Example 1-1

Sufficiently dried LiPF$_6$ was dissolved in a mixture of ethylene carbonate, dimethyl carbonate, and ethyl methyl carbonate (volume ratio 3:3:4) under dry argon atmosphere in 1 mol/L of the total amount of the nonaqueous electrolytic solution (the electrolytic solution is also referred to as "reference electrolytic solution"). A specific Si compound (a) and a compound (B3) were added to the reference electrolytic solution in 0.5 mass % each with respect to the total amount of the nonaqueous electrolytic solution. The nonaqueous electrolytic solution so prepared was used to produce a battery using the foregoing methods, and the battery was measured for initial low-temperature discharge characteristic, cycle characteristic, and post-cycle low-temperature discharge characteristic. The results are presented in Table 1 as ratios with respect to the results obtained in Reference Example 10-1.

Example 1-2

An electrolytic solution was produced in the same manner as in Example 1-1, except that a compound (B5) was added to the electrolytic solution in 0.2 mass % instead of compound (B3). A battery was produced in the same manner as in Example 1-1, and was evaluated with respect to initial low-temperature discharge characteristic, cycle characteristic, and post-cycle low-temperature discharge characteristic. The results are presented in Table 1 as ratios with respect to the results obtained in Reference Example 1-10.

Example 1-3

An electrolytic solution was produced in the same manner as in Example 1-1, except that a compound (B9) was added to the electrolytic solution in 0.5 mass % instead of compound (B3). A battery was produced in the same manner as in Example 1-1, and was evaluated with respect to initial low-temperature discharge characteristic, cycle characteristic, and post-cycle low-temperature discharge characteristic. The results are presented in Table 1 as ratios with respect to the results obtained in Reference Example 1-10.

Example 1-4

An electrolytic solution was produced in the same manner as in Example 1-1, except that a compound (B10) was added to the electrolytic solution in 0.5 mass % instead of compound (B3). A battery was produced in the same manner as in Example 1-1, and was evaluated with respect to initial low-temperature discharge characteristic, cycle characteristic, and post-cycle low-temperature discharge characteristic. The results are presented in Table 1 as ratios with respect to the results obtained in Reference Example 1-10.

Example 1-5

An electrolytic solution was produced in the same manner as in Example 1-1, except that a compound (B11) was added to the electrolytic solution in 0.5 mass % instead of compound (B3). A battery was produced in the same manner as in Example 1-1, and was evaluated with respect to initial low-temperature discharge characteristic, cycle characteristic, and post-cycle low-temperature discharge characteristic. The results are presented in Table 1 as ratios with respect to the results obtained in Reference Example 1-10.

Example 1-6

An electrolytic solution was produced in the same manner as in Example 1-1, except that a compound (B44) was added to the electrolytic solution in 0.5 mass % instead of compound (B3). A battery was produced in the same manner as in Example 1-1, and was evaluated with respect to initial low-temperature discharge characteristic, cycle characteristic, and post-cycle low-temperature discharge characteristic. The results are presented in Table 1 as ratios with respect to the results obtained in Reference Example 1-10.

Example 1-7

An electrolytic solution was produced in the same manner as in Example 1-1, except that a compound (B36) was added to the electrolytic solution in 0.5 mass % instead of compound (B3). A battery was produced in the same manner as in Example 1-1, and was evaluated with respect to initial low-temperature discharge characteristic, cycle characteristic, and post-cycle low-temperature discharge characteristic. The results are presented in Table 1 as ratios with respect to the results obtained in Reference Example 1-10.

Example 1-8

An electrolytic solution was produced in the same manner as in Example 1-1, except that a compound (j) was added to the electrolytic solution in 1.0 mass % instead of compound (a). A battery was produced in the same manner as in Example 1-1, and was evaluated with respect to initial low-temperature discharge characteristic, cycle characteristic, and post-cycle low-temperature discharge characteristic. The results are presented in Table 1 as ratios with respect to the results obtained in Reference Example 1-10.

Example 1-9

An electrolytic solution was produced in the same manner as in Example 1-3, except that a compound (j) was added to the electrolytic solution in 1.0 mass % instead of compound (a). A battery was produced in the same manner as in Example 1-1, and was evaluated with respect to initial low-temperature discharge characteristic, cycle characteristic, and post-cycle low-temperature discharge characteristic. The results are presented in Table 1 as ratios with respect to the results obtained in Reference Example 1-10.

Reference Example 1-1

An electrolytic solution was produced in the same manner as in Example 1-1, except that compound (a) was not added to the electrolytic solution. A battery was produced in the same manner as in Example 1-1, and was evaluated with respect to initial low-temperature discharge characteristic, cycle characteristic, and post-cycle low-temperature discharge characteristic. The results are presented in Table 1 as ratios with respect to the results obtained in Reference Example 1-10.

Reference Example 1-2

An electrolytic solution was produced in the same manner as in Example 1-2, except that compound (a) was not added to the electrolytic solution. A battery was produced in the same manner as in Example 1-1, and was evaluated with respect to initial low-temperature discharge characteristic, cycle characteristic, and post-cycle low-temperature discharge characteristic. The results are presented in Table 1 as ratios with respect to the results obtained in Reference Example 1-10.

Reference Example 1-3

An electrolytic solution was produced in the same manner as in Example 1-3, except that compound (a) was not added to the electrolytic solution. A battery was produced in the same manner as in Example 1-1, and was evaluated with respect to initial low-temperature discharge characteristic, cycle characteristic, and post-cycle low-temperature discharge characteristic. The results are presented in Table 1 as ratios with respect to the results obtained in Reference Example 1-10.

Reference Example 1-4

An electrolytic solution was produced in the same manner as in Example 1-4, except that compound (a) was not added to the electrolytic solution. A battery was produced in the same manner as in Example 1-1, and was evaluated with respect to initial low-temperature discharge characteristic, cycle characteristic, and post-cycle low-temperature discharge characteristic. The results are presented in Table 1 as ratios with respect to the results obtained in Reference Example 1-10.

Reference Example 1-5

An electrolytic solution was produced in the same manner as in Example 1-5, except that compound (a) was not added to the electrolytic solution. A battery was produced in the same manner as in Example 1-1, and was evaluated with respect to initial low-temperature discharge characteristic, cycle characteristic, and post-cycle low-temperature discharge characteristic. The results are presented in Table 1 as ratios with respect to the results obtained in Reference Example 1-10.

Reference Example 1-6

An electrolytic solution was produced in the same manner as in Example 1-6, except that compound (a) was not added to the electrolytic solution. A battery was produced in the same manner as in Example 1-1, and was evaluated with respect to initial low-temperature discharge characteristic, cycle characteristic, and post-cycle low-temperature discharge characteristic. The results are presented in Table 1 as ratios with respect to the results obtained in Reference Example 1-10.

Reference Example 1-7

An electrolytic solution was produced in the same manner as in Example 1-7, except that compound (a) was not added to the electrolytic solution. A battery was produced in the same manner as in Example 1-1, and was evaluated with respect to initial low-temperature discharge characteristic, cycle characteristic, and post-cycle low-temperature discharge characteristic. The results are presented in Table 1 as ratios with respect to the results obtained in Reference Example 1-10.

Reference Example 1-8

An electrolytic solution was produced in the same manner as in Example 1-1, except that compound (B3) was not added to the electrolytic solution. A battery was produced in the same manner as in Example 1-1, and was evaluated with respect to initial low-temperature discharge characteristic, cycle characteristic, and post-cycle low-temperature discharge characteristic. The results are presented in Table 1 as ratios with respect to the results obtained in Reference Example 1-10.

Reference Example 1-9

An electrolytic solution was produced in the same manner as in Example 1-8, except that compound (B3) was not added to the electrolytic solution. A battery was produced in the same manner as in Example 1-1, and was evaluated with respect to initial low-temperature discharge characteristic, cycle characteristic, and post-cycle low-temperature discharge characteristic. The results are presented in Table 1 as ratios with respect to the results obtained in Reference Example 1-10.

Reference Example 1-10

By using the reference electrolytic solution, a battery was produced in the same manner as in Example 1-1, and measured for initial low-temperature discharge characteristic, cycle characteristic, and post-cycle low-temperature discharge characteristic. The initial low-temperature discharge characteristic, and the cycle characteristic were taken as 1.00. The post-cycle low-temperature discharge characteristic is presented as a ratio with respect to the initial low-temperature discharge characteristic.

TABLE 1

|   | Specific Si compound | Specific compound | Initial low-temperature discharge characteristic ratio | Cycle characteristic ratio | Post-cycle low-temperature discharge characteristic ratio |
|---|---|---|---|---|---|
| Ex. 1-1 | (a) | B3(VC) | 0.99 | 1.02 | 0.86 |
| Ex. 1-2 | (a) | B5(EEC) | 0.93 | 1.02 | 0.81 |
| Ex. 1-3 | (a) | B9(LiBOB) | 0.88 | 1.02 | 1.04 |
| Ex. 1-4 | (a) | B10(LiF$_4$OP) | 0.93 | 1.01 | 1.15 |
| Ex. 1-5 | (a) | B11(LiF$_2$OP) | 1.08 | 1.03 | 1.14 |
| Ex. 1-6 | (a) | B44(HMDI) | 0.72 | 1.05 | 0.82 |
| Ex. 1-7 | (a) | B36(MeFSO$_3$) | 1.11 | 0.97 | 0.97 |
| Ex. 1-8 | (j) | B3(VC) | 1.05 | 1.02 | 0.85 |
| Ex. 1-9 | (j) | B9(LiBOB) | 1.08 | 1.01 | 1.02 |
| Ref. Ex. 1-1 | — | B3(VC) | 0.95 | 1.02 | 0.77 |
| Ref. Ex. 1-2 | — | B5(EEC) | 0.88 | 1.01 | 0.69 |
| Ref. Ex. 1-3 | — | B9(LiBOB) | 0.83 | 1.01 | 0.95 |
| Ref. Ex. 1-4 | — | B10(LiF$_4$OP) | 0.93 | 1.01 | 1.01 |
| Ref. Ex. 1-5 | — | B11(LiF$_2$OP) | 1.03 | 1.01 | 0.89 |
| Ref. Ex. 1-6 | — | B44(HMDI) | 0.64 | 1.04 | 0.78 |

TABLE 1-continued

|  | Specific Si compound | Specific compound | Initial low-temperature discharge characteristic ratio | Cycle characteristic ratio | Post-cycle low-temperature discharge characteristic ratio |
|---|---|---|---|---|---|
| Ref. Ex. 1-7 | — | B36(MeFSO$_3$) | 0.98 | 0.55 | 0.72 |
| Ref. Ex. 1-8 | (a) | — | 1.07 | 0.97 | 0.97 |
| Ref. Ex. 1-9 | (j) | — | 1.05 | 0.97 | 0.97 |
| Ref. Ex. 1-10 | — | — | 1.00 | 1.00 | 0.79 |

Typically, a system containing an additive that cannot maintain cycle characteristics often fails to provide sufficient effects even with additives that improve cycle characteristics. However, it was found that the low-temperature discharge characteristic can greatly improve while maintaining the cycle characteristic improving effect of an additive (compound (B3)) by the specific combinations of the present invention, specifically by addition of the specific Si compounds of the present invention, as represented by compounds (a) and (j), to the electrolytic solution that contains the cycle characteristic improving additive as represented by compound (B3), as can be seen in Examples 1-1 and 1-8 in Table 1.

Reference Example 1-11

An electrolytic solution was produced in the same manner as in Example 1-1, except that 1,2-divinyltetramethyldisilane was added to the electrolytic solution in 1.0 mass % instead of compound (a). A battery was produced in the same manner as in Example 1-1, and was evaluated with respect to initial low-temperature discharge characteristic, cycle characteristic, and post-cycle low-temperature discharge characteristic. The results are presented in Table 2 as ratios with respect to the results obtained in Reference Example 1-10.

Reference Example 1-12

An electrolytic solution was produced in the same manner as in Reference Example 1-11, except that compound (B3) was not added to the electrolytic solution. A battery was produced in the same manner as in Example 1-1, and was evaluated with respect to initial low-temperature discharge characteristic, cycle characteristic, and post-cycle low-temperature discharge characteristic. The results are presented in Table 2 as ratios with respect to the results obtained in Reference Example 1-10.

As can be seen in Table 2, addition of 1,2-divinyltetramethyldisilane representing a Si compound other than the specific Si compound of the present invention tends to further lower the low-temperature discharge characteristic when used in combination with the specific compound of the present invention.

This is considered to be due to the increased resistance of the coating formed in excess by the easy progression of self-polymerization facilitated by the high self-polymerizing ability of the unsaturated bond-containing aliphatic substituent of the Si—Si compound as represented by 1,2-divinyltetramethyldisilane.

Using the specific Si compound of the present invention in combination with the specific compound improved the cycle characteristic more effectively than when the specific compound was added alone, as shown in Examples 1-2, 1-3, and 1-6 in Table 1. The same results were observed in Examples 1-10 and 1-11 below.

Example 1-10

An electrolytic solution was produced in the same manner as in Example 1-1, except that compound (k) was added to the electrolytic solution in 0.5 mass % instead of compound (a). A battery was produced, and evaluated for cycle characteristic in the same manner as in Example 1-1. The result is presented in Table 3 as a ratio with respect to the result obtained in Reference Example 1-10.

Example 1-11

An electrolytic solution was produced in the same manner as in Example 1-2, except that compound (k) was added to the electrolytic solution in 0.5 mass % instead of compound (a). A battery was produced, and evaluated for cycle characteristic in the same manner as in Example 1-1. The result is presented in Table 3 as a ratio with respect to the result obtained in Reference Example 1-10.

TABLE 2

|  | Si compound other than specific Si compound | Specific compound | Initial low-temperature discharge characteristic ratio | Cycle characteristic ratio | Post-cycle low-temperature discharge characteristic ratio |
|---|---|---|---|---|---|
| Ref. Ex. 1-11 | 1,2-divinyltetramethyldisilane | B3(VC) | 0.70 | 1.00 | 0.72 |
| Ref. Ex. 1-12 | 1,2-divinyltetramethyldisilane | — | 0.87 | 1.00 | 0.89 |

Reference Example 1-13

An electrolytic solution was produced in the same manner as in Example 1-10, except that compound (B3) was not added to the electrolytic solution. A battery was produced, and evaluated for cycle characteristic in the same manner as in Example 1-1. The result is presented in Table 3 as a ratio with respect to the result obtained in Reference Example 1-10.

TABLE 3

| | Specific Si compound | Specific compound | Cycle characteristic ratio |
|---|---|---|---|
| Ex. 1-10 | (k) | B3(VC) | 1.04 |
| Ex. 1-11 | (k) | B5(EEC) | 1.03 |
| Ref. Ex. 1-13 | (k) | — | 1.01 |

As can be seen in Table 3, the phenomena observed in Examples 1-2, 1-3, and 1-6 were also observed in Examples 1-10 and 1-11 in which the specific Si compound (k) was used. Specifically, the use the specific Si compound of the present invention in combination with the specific compound improved the cycle characteristic more than when these compounds were used alone or when neither was contained. The extent of improvement was more than a simple addition of the effect of each compound. This is believed to be due to the formation of a quality coating by the mixing of the coatings derived from the specific Si compound and the specific compound, different from the coating formed by each of these compound.

Example 1-12

An electrolytic solution was produced in the same manner as in Example 1-1, except that monofluoroethylene carbonate was added to the electrolytic solution in 0.5 mass % instead of compound (B3). A battery was produced, and evaluated for initial low-temperature discharge characteristic, cycle characteristic, and post-cycle low-temperature discharge characteristic in the same manner as in Example 1-1. The results are presented in Table 4 as ratios with respect to the results obtained in Reference Example 1-10.

Example 1-13

An electrolytic solution was produced in the same manner as in Example 1-12, except that compound (j) was added to the electrolytic solution in 1.0 mass % instead of compound (a). A battery was produced, and evaluated for initial low-temperature discharge characteristic, cycle characteristic, and post-cycle low-temperature discharge characteristic in the same manner as in Example 1-1. The results are presented in Table 4 as ratios with respect to the results obtained in Reference Example 1-10.

Reference Example 1-14

Production of Positive Electrode

Lithium cobalt oxide ($LiCoO_2$; positive electrode active material; 94 mass %), acetylene black (conductive material; 3 mass %), and polyvinylidene fluoride (PVdF; binder; 3 mass %) were mixed in an N-methylpyrrolidone solvent, and slurried. The slurry was applied to the both surfaces of a 15 μm-thick aluminum foil in 90% of the negative electrode by volume. The whole was press rolled in a thickness of 85 μm using a press, and cut into a size of the active material layer (a width of 65 mm, and a length of 150 mm). This was cut into an active material width of 30 mm and length of 40 mm to obtain the positive electrode. The positive electrode was used after being dried under reduced pressure at 80 degrees Celsius for 12 hours.

[Production of Negative Electrode]

Non-carbon materials silicon (73.2 parts by weight) and copper (8.1 parts by weight), and an artificial graphite powder (KS-6; Timcal; 12.2 parts by weight) were used as negative electrode active materials. An N-methylpyrrolidone solution (54.2 parts by weight) containing 12 parts by weight of polyvinylidene fluoride (poly(vinylidene fluoride); hereinafter, "PVDF"), and N-methylpyrrolidone (50 parts by weight) were added to the negative electrode active materials, and mixed with a disperser to form a slurry. The slurry was evenly applied to a negative electrode collector copper foil having a thickness of 18 μm to prepare a negative electrode. The whole was pressed to make the electrode density about 1.5 g·$cm^{-3}$, and cut into an active material size (a width of 30 mm, and a length of 40 mm) to obtain a negative electrode (silicon alloy negative electrode). The negative electrode was used after being dried under reduced pressure at 60 degrees Celsius for 12 hours. For convenience, the notation "Si" is used in Table 4.

[Production of Electrolytic Solution]

Sufficiently dried $LiPF_6$ was dissolved in a mixture of monofluoroethylene carbonate and diethyl carbonate (volume ratio 2:8) under dry argon atmosphere in 1 mol/L. Compound (a) was added to the solution in 0.5 mass % to prepare a nonaqueous electrolytic solution. The nonaqueous electrolytic solution so prepared was used to produce a battery using the foregoing methods, and the battery was measured for initial low-temperature discharge characteristic, cycle characteristic, and post-cycle low-temperature discharge characteristic. The results are presented in Table 4 as ratios with respect to the results obtained in Reference Example 1-16.

Reference Example 1-15

An electrolytic solution was produced in the same manner as in Example 1-12, except that compound (a) was not added to the electrolytic solution. A battery was produced, and evaluated for initial low-temperature discharge characteristic, cycle characteristic, and post-cycle low-temperature discharge characteristic in the same manner as in Example 1-1. The results are presented in Table 4 as ratios with respect to the results obtained in Reference Example 1-10.

Reference Example 1-16

An electrolytic solution was produced in the same manner as in Reference Example 1-14, except that compound (a) was not added to the electrolytic solution. A battery was produced, and evaluated for initial low-temperature discharge characteristic, cycle characteristic, and post-cycle low-temperature discharge characteristic in the same manner as in Reference Example 1-14. The initial low-temperature discharge characteristic, and the cycle characteristic were taken as 1.00. The post-cycle low-temperature discharge characteristic is presented as a ratio with respect to the initial low-temperature discharge characteristic.

TABLE 4

| | Negative electrode | Specific Si compound | Specific compound | Initial low-temperature discharge characteristic ratio | Cycle characteristic ratio | Post-cycle low-temperature discharge characteristic ratio |
|---|---|---|---|---|---|---|
| Ex. 1-12 | Carbon | (a) | Monofluoroethylene carbonate | 1.05 | 1.01 | 0.91 |
| Ex. 1-13 | Carbon | (j) | Monofluoroethylene carbonate | 1.10 | 1.01 | 0.91 |
| Ref. Ex. 1-14 | Si | (a) | Monofluoroethylene carbonate | 1.00 | 0.88 | 0.81 |
| Ref. Ex. 1-15 | Carbon | — | Monofluoroethylene carbonate | 1.04 | 1.01 | 0.87 |
| Ref. Ex. 1-16 | Si | — | Monofluoroethylene carbonate | 1.00 | 1.00 | 1.00 |

As can be seen in Table 4, characteristics improved only when the carbonaceous material was used for the negative electrode. Characteristics did not improve when the negative electrode was Si-based material (Reference Example 1-14), even when the specific Si compound of the present invention, and a carbonate ester having a halogen atom as represented by monofluoroethylene carbonate were contained.

Example 2-1

Production of Secondary Battery

<Production of Positive Electrode>
Ninety parts by mass of lithium nickel manganese cobalt oxide (LiNi$_{1/3}$Mn$_{1/3}$Co$_{1/3}$O$_2$) used as positive electrode active material was mixed with 7 parts by mass of carbon black and 3 parts by mass of polyvinylidene fluoride, and the mixture was slurried by addition of N-methyl-2-pyrrolidone. The slurry was evenly applied to the both surface of a 15 µm-thick aluminum foil, dried, and pressed to produce the positive electrode in a manner that makes the density of the positive electrode active material layer 2.6 g·cm$^{-3}$.

<Production of Negative Electrode>
An aqueous dispersion of carboxymethylcellulose sodium (1 mass % carboxymethylcellulose sodium) as a thickener, and an aqueous dispersion of styrene-butadiene rubber (50 mass % styrene-butadiene rubber) as a binder were added to graphite, and mixed with a disperser to form a slurry. The slurry was evenly applied to one surface of a 12 µm-thick copper foil, dried, and pressed to produce the negative electrode in a manner that makes the density of the negative electrode active material layer 1.4 g·cm$^{-3}$. The graphite had a d50 value of 10.9 µm, a specific surface area of 3.41 m$^2$/g, and a tap density of 0.985 g/cm$^3$. The slurry was produced to make the weight ratio of graphite:carboxymethylcellulose sodium:styrene-butadiene rubber 98:1:1 in the dried negative electrode.

<Production of Nonaqueous Electrolytic Solution Secondary Battery>
The positive electrode, the negative electrode, and a polyethylene separator were laminated in order of the negative electrode, the separator, and the positive electrode. These battery elements were wrapped with a cylindrical aluminum laminate film, and vacuum sealed after injecting an electrolytic solution (described later) to produce a sheet-like nonaqueous electrolytic solution secondary battery. For improved adhesion between the electrodes, the sheet-like battery was pressurized between glass plates.

[Battery Evaluation]
<Initial Charge and Discharge Test>
In a 25° C. constant-temperature bath, the sheet-like nonaqueous electrolytic solution secondary battery was charged at 0.05 C for 10 hours, and, after a 6-hour rest period, charged to 4.1 V under 0.2 C constant current. After a 6-hour rest period, the battery was charged to 4.1 V under 0.2 C constant current-constant voltage, and discharged to 3.0 V ⅓ C under constant current. This was followed by two charge and discharge cycles of ⅓ C constant current-constant voltage charging to 4.1 V, and ⅓ C constant current discharge to 3.0 V. After ⅓ C constant current-constant voltage charging to 4.1 V, the battery was stored at 60° C. for 12 hours to stabilize. This was followed by five charge and discharge cycles of ⅓ C constant current-constant voltage charging to 4.1 V, and ⅓ C constant current discharge to 3.0 V at 25° C. The final discharge capacity was taken as initial capacity. Note that 1 C is the current value with which the total battery capacity discharges in 1 hour.
<Low-Temperature Discharge Characteristic Evaluation Test>
A battery charged to an electrical quantity equivalent of 50% initial capacity (hereinafter, this state of battery is also referred to as SOC 50%) was discharged at 0.3 C, 0.5 C, 1.0 C, 1.5 C, 2.0 C, and 2.5 C under a −30° C. environment, and the voltage after 2 seconds was measured. From the current-voltage curve obtained, the current value at 3 V was calculated, and the product of this current value and 3 V was taken as the initial low-temperature discharge characteristic.

Example 2-1

Sufficiently dried LiPF$_6$ was dissolved in a mixture of ethylene carbonate, dimethyl carbonate, and ethyl methyl carbonate (volume ratio 3:3:4) under dry argon atmosphere in 1 mol/L of the total amount of the nonaqueous electrolytic solution (the electrolytic solution is also referred to as "reference electrolytic solution"). A compound (a) and a compound (B47) were added to the reference electrolytic solution in 0.5 mass % each to prepare a nonaqueous electrolytic solution. The nonaqueous electrolytic solution so prepared was used to produce a battery using the foregoing methods, and the battery was measured for low-temperature discharge characteristic. The result is presented in Table 5 as a ratio with respect to the result obtained in Reference Example 2-6.

Example 2-2

An electrolytic solution was produced in the same manner as in Example 2-1, except that compound (B48) was added to the electrolytic solution in 2.0 mass % instead of compound (B47). A battery was produced, and evaluated for low-temperature discharge characteristic in the same manner as in Example 2-1. The result is presented in Table 5 as a ratio with respect to the result obtained in Reference Example 2-6.

Example 2-3

An electrolytic solution was produced in the same manner as in Example 2-1, except that compound (B49) was added to the electrolytic solution in 0.5 mass % instead of compound (B47). A battery was produced, and evaluated for low-temperature discharge characteristic in the same manner as in Example 2-1. The result is presented in Table 5 as a ratio with respect to the result obtained in Reference Example 2-6.

Example 2-4

An electrolytic solution was produced in the same manner as in Example 2-1, except that compound (j) was added to the electrolytic solution in 1.0 mass % instead of compound (a). A battery was produced, and evaluated for low-temperature discharge characteristic in the same manner as in Example 2-1. The result is presented in Table 5 as a ratio with respect to the result obtained in Reference Example 2-6.

Example 2-5

An electrolytic solution was produced in the same manner as in Example 2-4, except that compound (B49) was added to the electrolytic solution in 0.5 mass % instead of compound (B47). A battery was produced, and evaluated for low-temperature discharge characteristic in the same manner as in Example 2-1. The result is presented in Table 5 as a ratio with respect to the result obtained in Reference Example 2-6.

Reference Example 2-1

An electrolytic solution was produced in the same manner as in Example 2-1, except that compound (B47) was not added to the electrolytic solution. A battery was produced, and evaluated for low-temperature discharge characteristic in the same manner as in Example 2-1. The result is presented in Table 5 as a ratio with respect to the result obtained in Reference Example 2-6.

Reference Example 2-2

An electrolytic solution was produced in the same manner as in Example 2-4, except that compound (B47) was not added to the electrolytic solution. A battery was produced, and evaluated for low-temperature discharge characteristic in the same manner as in Example 2-1. The result is presented in Table 5 as a ratio with respect to the result obtained in Reference Example 2-6.

Reference Example 2-3

An electrolytic solution was produced in the same manner as in Example 2-1, except that compound (a) was not added to the electrolytic solution. A battery was produced, and evaluated for low-temperature discharge characteristic in the same manner as in Example 2-1. The result is presented in Table 5 as a ratio with respect to the result obtained in Reference Example 2-6.

Reference Example 2-4

An electrolytic solution was produced in the same manner as in Example 2-2, except that compound (a) was not added to the electrolytic solution. A battery was produced, and evaluated for low-temperature discharge characteristic in the same manner as in Example 2-1. The result is presented in Table 5 as a ratio with respect to the result obtained in Reference Example 2-6.

Reference Example 2-5

An electrolytic solution was produced in the same manner as in Example 2-3, except that compound (a) was not added to the electrolytic solution. A battery was produced, and evaluated for low-temperature discharge characteristic in the same manner as in Example 2-1. The result is presented in Table 5 as a ratio with respect to the result obtained in Reference Example 2-6.

Reference Example 2-6

A battery was produced, and evaluated for low-temperature discharge characteristic in the same manner as in Example 2-1, using the reference electrolytic solution. The low-temperature discharge characteristic was taken as 1.00, as presented in Table 5.

TABLE 5

| | Specific Si compound | Specific salt | Low-temperature discharge characteristic ratio |
|---|---|---|---|
| Ex. 2-1 | (a) | B47 | 1.30 |
| Ex. 2-2 | (a) | B48 | 1.19 |
| Ex. 2-3 | (a) | B49 | 1.13 |
| Ex. 2-4 | (j) | B47 | 1.26 |
| Ex. 2-5 | (j) | B49 | 1.17 |
| Ref. Ex. 2-1 | (a) | — | 1.07 |
| Ref. Ex. 2-2 | (j) | — | 1.05 |
| Ref. Ex. 2-3 | — | B47 | 1.13 |
| Ref. Ex. 2-4 | — | B48 | 1.07 |
| Ref. Ex. 2-5 | — | B49 | 1.02 |
| Ref. Ex. 2-6 | — | — | 1.00 |

As can be seen in Reference Examples 2-1 to 2-5 in Table 5, it was found that the low-temperature discharge characteristic can improve by adding the specific Si compounds of the present invention, as represented by compounds (a) and (j), and the specific salts of the present invention, as represented by compounds (B47) to (B49). It was also found that the low-temperature discharge characteristic improved not by the simple addition of the effect of each compound, but by the specific synergy of these compounds, as can be seen in Examples 2-1 to 2-5.

Reference Example 2-7

An electrolytic solution was produced in the same manner as in Example 2-1, except that 1,2-divinyltetramethyldisilane was added to the electrolytic solution in 1.0 mass % instead of the compound (a). A battery was produced, and evaluated for low-temperature discharge characteristic in the same manner as in Example 2-1. The result is presented in Table 6 as a ratio with respect to the result obtained in Reference Example 2-6.

Reference Example 2-8

An electrolytic solution was produced in the same manner as in Example 2-7, except that compound (B47) was not added to the electrolytic solution. A battery was produced, and evaluated for low-temperature discharge characteristic in the same manner as in Example 2-1. The result is presented in Table 6 as a ratio with respect to the result obtained in Reference Example 2-6.

TABLE 6

| | Si compound other than specific Si compound | Specific salt | Low-temperature discharge characteristic ratio |
|---|---|---|---|
| Ref. Ex. 2-7 | 1,2-divinyltetramethyl disilane | B47 | 1.05 |
| Ref. Ex. 2-8 | 1,2-divinyltetramethyl disilane | — | 0.87 |

As can be seen in Table 6, addition of 1,2-divinyltetramethyldisilane representing a Si compound other than the specific Si compound of the present invention tends to lower the low-temperature discharge characteristic when used in combination with the specific salt of the present invention.

This is considered to be due to the increased resistance of the coating formed in excess by the easy progression of self-polymerization facilitated by the high self-polymerizing ability of the unsaturated bond-containing aliphatic substituent of the Si—Si compound as represented by 1,2-divinyltetramethyldisilane.

While the invention has been described in detail with reference to specific examples thereof, it will be apparent to one skilled in the art that various changes and modifications can be made therein without departing from the spirit and scope thereof. The present application is based on Japanese Patent Application No. 2011-18561 filed on Jan. 31, 2011, and Japanese Patent Application No. 2011-24873 filed on Feb. 8, 2011, the entire contents of which are incorporated herein by reference.

INDUSTRIAL APPLICABILITY

The nonaqueous electrolytic solution of the present invention can be used to produce a nonaqueous electrolytic solution secondary battery of excellent low-temperature discharge characteristic and/or cycle characteristic, and can preferably be used in a wide range of fields, including the field of electronic devices, in which nonaqueous electrolytic solution secondary batteries are used.

The nonaqueous electrolytic solution, and the nonaqueous electrolytic solution secondary battery of the present invention are not limited to a particular use, and can be used in a variety of known applications. Specific examples include laptop personal computers, stylus-operated personal computers, mobile personal computers, electronic book players, cell phones, portable facsimiles, portable copiers, portable printers, headphone stereos, video movies, liquid crystal televisions, handy cleaners, portable CDs, minidiscs, transceivers, electronic organizers, calculators, memory cards, portable tape recorders, radios, back-up power supplies, motors, automobiles, bikes, small motor vehicles, bicycles, illuminations, toys, gaming machines, watches, electric power tools, strobe lights, and cameras.

The invention claimed is:

1. A nonaqueous electrolytic solution secondary battery, comprising:
a positive electrode capable of storing and releasing metal ions;
a negative electrode consisting essentially of a carbonaceous material, a thickener, and a binder; and
a nonaqueous electrolytic solution,
wherein the nonaqueous electrolytic solution comprises a compound that does not have an aliphatic substituent having an unsaturated bond but has a Si—Si bond, and a carbonate ester having a halogen atom.

2. The secondary battery according to claim 1, wherein the carbonate ester having a halogen atom is at least one compound selected from monofluoroethylene carbonate, 4,4-difluoroethylene carbonate, and 4,5-difluoroethylene carbonate.

3. The secondary battery according to claim 1, wherein the compound that does not have an aliphatic substituent having an unsaturated bond but has a Si—Si bond is a compound of formula (4):

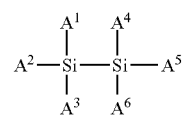

(4)

wherein $A^1$ to $A^6$ may be the same or different, and represent a hydrogen atom, a halogen atom, a hydrocarbon group of 1 to 10 carbon atoms that may have a heteroatom, or an optionally substituted hydrogen silicide group of 1 to 10 silicon atoms, and
wherein $A^1$ to $A^6$ may bind to one another to form a ring, where none of $A^1$ to $A^6$ is an aliphatic substituent having an unsaturated bond.

4. The secondary battery according to claim 1, wherein the compound that does not have an aliphatic substituent having an unsaturated bond but has a Si—Si bond is at least one selected from the group consisting of hexamethyldisilane, hexaethyldisilane, 1,2-diphenyltetramethyldisilane, and 1,1,2,2-tetraphenyldisilane.

5. The secondary battery according to claim 1, which comprises the compound that does not have an aliphatic substituent having an unsaturated bond but has a Si—Si bond in an amount of 0.01 mass % or more and 10 mass % or less.

6. The secondary battery according to claim 1, wherein the carbonaceous material is graphite.

7. The secondary battery according to claim 1, wherein the binder is present in the carbonaceous material in an amount of 0.1 to 20% by mass.

8. The secondary battery according to claim 1, wherein the thickener is present in the carbonaceous material in an amount of 0.1 to 5% by mass.

9. The secondary battery according to claim 1, wherein the carbonaceous material is graphite, the binder is present in the carbonaceous material in an amount of 0.1 to 20% by mass, and the thickener is present in the carbonaceous material in an amount of 0.1 to 5% by mass.

10. The secondary battery according to claim 1, wherein the negative electrode consists of a carbonaceous material, a thickener, and a binder.

11. The secondary battery according to claim 1, wherein the compound that does not have an aliphatic substituent having an unsaturated bond but has a Si—Si bond is at least one selected from the group consisting of hexamethyldisilane and 1,2-diphenyltetramethyldisilane, and the carbonate ester having a halogen atom is monofluoroethylene carbonate.

* * * * *